United States Patent [19]
Toide et al.

[11] Patent Number: 5,537,167
[45] Date of Patent: Jul. 16, 1996

[54] PROJECTION TYPE DISPLAY APPARATUS

[75] Inventors: Eiichi Toide; Fusaaki Yamada; Shinsuke Shikama; Toshihide Kaneko; Kan Kawahara; Shigeru Takeuchi; Toshitaka Tachibana, all of Nagaokakyo, Japan

[73] Assignee: Mitsubishi Denki Kabushiki Kaisha, Tokyo, Japan

[21] Appl. No.: 140,543

[22] Filed: Oct. 25, 1993

[30] Foreign Application Priority Data

| Oct. 26, 1992 | [JP] | Japan | 4-287672 |
| Jun. 14, 1993 | [JP] | Japan | 5-142029 |
| Aug. 5, 1993 | [JP] | Japan | 5-194782 |

[51] Int. Cl.⁶ .................................................. H04N 5/74
[52] U.S. Cl. ............................................ 353/100; 348/825
[58] Field of Search .................................. 353/101, 100, 353/94, 122, 119, 69; 348/749, 748, 745, 744, 776, 778, 779, 781, 785, 786, 805, 806, 825, 827

[56] References Cited

U.S. PATENT DOCUMENTS

| 4,609,945 | 9/1986 | Oguino | 348/745 |
| 5,250,968 | 10/1993 | Numata et al. | 353/122 |
| 5,298,984 | 3/1994 | Numata | 348/827 |

FOREIGN PATENT DOCUMENTS

| 4115878 | 11/1991 | Germany | 353/69 |
| 2143884 | 6/1990 | Japan . | |
| 241979 | 11/1990 | Japan . | |
| 4352141 | 12/1992 | Japan . | |
| 4352142 | 12/1992 | Japan . | |
| 4355742 | 12/1992 | Japan | 353/69 |

Primary Examiner—Christopher W. Fulton
Assistant Examiner—William C. Dowling

[57] ABSTRACT

A projection type display apparatus comprising three projection units for projecting red, green and blue images, each having a constitution wherein a holding member for holding a CRT and a holding member for holding a projection lens are separately constituted and these holding members are connected liquid-tightly by means of a soft packing sheet, while a space surrounded by the holding members and the packing sheet is filled with a coolant liquid.

15 Claims, 63 Drawing Sheets

PROJECTION TYPE DISPLAY APPARATUS

BACKGROUND OF THE INVENTION

1. Field of the invention

The present invention relates to a projection type display apparatus for enlarging and projecting picture images, generated by picture forming means comprising a cathode ray tube (CRT) and other devices, onto a screen by means of a projection optical system.

2. Description of Related Art

The constitution of a projection type display apparatus of a prior art will be described below with reference to FIG. 1 and FIG. 2. In these figures, numeral 1 denotes a CRT which is picture forming means, numeral 2 denotes a projection lens, numeral 6 denotes a coolant liquid, numeral 11 denotes a screen, numeral 12 denotes a spacer and numeral 13 denotes a packing.

The CRT 1 and the projection lens 2 are usually used in three sets for red, blue and green images, though only one set is shown in the drawing for the purpose of describing the operation of the projection type display apparatus of the prior art. A picture image generated on the CRT 1 is enlarged and projected onto the screen 11 by the projection lens 2 thereby to form an image thereon. The CRT 1 and the projection lens 2 are fixed on either side of a spacer 12 with the space surrounded thereby being filled with the coolant liquid 6. The coolant liquid 6 is sealed by means of the packing 13 to prevent it from leaking. The coolant liquid 6 has both cooling effect to suppress heat-up of the CRT 1 and optical coupling effect to prevent unnecessary reflection at the boundary between the glass member and the air layer. Thus the coolant liquid 6 plays an important role to obtain high brightness and high contrast.

Having the constitution and operation as described above, the projection type display apparatus of the prior art has such problems as described below.

As described before, a projection type display apparatus generally employs three projection units each having the CRT 1 comprising a cathode ray tube and other devices and the projection lens 2. FIG. 3 is a schematic drawing illustrative of the key portion of the projection type display apparatus, where the projection units UR, UG and UB for red, blue and green images are so arranged that the optical axes thereof cross each other at the center of the screen 11. The projection unit UG for green image emits light beams at right angles to the screen 11, and the projection units UR and UB for red and blue images emit light beams with a required convergence angle of $\theta_1$ to the screen 11.

In order for the image on the CRT 1 and the screen 11 to satisfy the correct relationship of image forming, it is necessary to incline the projection lens 2 and the CRT 1 at a correction angle $\theta_2$ which is determined by the following equation. In addition, relative distance between the CRT 1 and the projection lens 2 is changed to adjust the focusing on the periphery.

$$\tan \theta_2 = (n/m) \tan \theta_1 \quad (1)$$

where n denotes the refractive index of the coolant liquid and m denotes the magnification factor (screen size/CRT size) of the projection lens. The spacers 12 for red and blue images shown in FIG. 2 are fabricated with the CRT-mounting surface and the projection lens-mounting surface being inclined by the correction angle $\theta_2$ determined by the above equation.

Recently, demands have been increasing for projection type display apparatuses which are capable of changing the screen size in a wide range from 70 inches to around 300 inches in a single unit. However, because changing the screen size requires to change the magnification of the projection lens, it is necessary to change the correction angle $\theta_2$ between the CRT 1 and the projection lens 2 according to the screen size as shown in the equation (1). Because the spacer 12 is an integral body as shown in FIG. 2 in the conventional apparatus, however, it must be operated with fixed correction angle $\theta_2$. Consequently, correct image forming conditions cannot be maintained resulting in images out of focus in the periphery of the screen when the screen size is other than the design size.

There is a conventional apparatus devised to solve the above problem as shown in FIG. 4, wherein the holding member for mounting the CRT 1 and the projection lens 2 is separated into holding members 3 and 4 while sealing the coolant liquid only for the holding member 4 of the CRT 1, and light beam is emitted through a glass window 15. Although this construction has an effect of cooling the CRT, there is an air layer between the holding members 3 and 4 which inhibits optical coupling which has been another effect of the coolant liquid, resulting in the generation of a large amount of unnecessary reflecting light in the boundary with the air layer, thereby leading to significantly deteriorated contrast of the projected picture image.

To solve these problems, there has been proposed an apparatus having no air layer existing between the CRT 1 and the projection lens 2, which is capable of adjusting the relative angle and distance between these components.

FIG. 5 is a cross sectional drawing illustrative of the constitution of a projection unit composing a conventional projection type display apparatus, for example, disclosed in the Japanese Utility Model Application Publication H2-41979 (1990), and FIG. 6 shows the exploded perspective view thereof. Numeral 21 denotes a CRT or cathode ray tube, numeral 22 denotes a spacer block made of a material of good thermal conduction such as aluminum diecast. The spacer block 22 has a boss 22c having a threaded hole 22d on the side where the CRT 21 is mounted. Numeral 23 denotes a holding plate having a contact hole 23a which contacts with the external wall 21b of the CRT 21 and has a set hole 23b at each of the four corners. In order to press the holding plate 23 uniformly against the CRT 21, a post 24 with one end being in contact with each of the bosses 22c of the spacer lock after passing through the set hole 23b, and a spring 25 surrounding the post 24 with an end being in contact with the holding plate 23 are provided. The CRT 21 is clamped onto the spacer block 22 by the compressive force of the spring 25, by setting a screw 27 with a washer 26 through the post 24 and screwing it into the threaded hole 22d of the boss 22c. Numerals 36, 37, 38 denote a deflection yoke, a focus magnet and a CRT board, respectively mounted on the CRT 21.

On the other hand, a lens barrel 28a of the projection lens 28 is mounted by means of screws 35 on the side of the spacer block 22 opposite to the CRT. The space between the face 21c of the CRT 21 and the CRT mounting surface 22f of the spacer block 22, and the space between a lens surface 28b of the projection lens 28 and a lens mounting surface 22g of the spacer block 22 are provided with a CRT packing 29 and a lens packing 30, respectively, in order to keep the space 31 surrounded by the CRT 21, the projection lens 28 and the spacer block 22 liquid-tight.

Numeral 32 denotes a coolant liquid such as ethylene glycol which keeps the light emitted by the CRT 21 from returning to the fluorescent surface thereby to prevent the contrast of projected image from deteriorating and, at the same time, to transmit the heat generated on a face 21c of the CRT 21 during operation of the projector to the spacer block 22 thereby dissipating the heat to the outside. Numeral 33 denotes a tank which accommodates an excess of the coolant liquid 32 when it undergoes thermal expansion.

FIG. 7 is a cross sectional drawing illustrative of a projection unit composing a conventional projector, for example, disclosed in the Japanese Patent Application Laid-Open H4-352141 (1992), and FIG. 8 shows the cross section of a key section thereof. The CRT 21 is mounted liquid-tight via a first O-ring 52 fitted in an annular groove 51a provided at the periphery around an opening of a CRT frame 51 on the CRT 21 side thereof. And, the projection lens 28 is mounted liquid-tight via a second O-ring 54 fitted in an annular groove 53a provided at the periphery around an opening of a lens frame 53 on the lens side thereof.

Numeral 55 denotes a bellows which serves as a coupler, comprising a cylindrical bellows formed of an iron-based metallic material such as stainless steel which is energized in the axial direction, and is installed between the CRT frame 51 and the lens frame 53. The method of installation is as follows. The bellows 55 is provided with an annular member A 56 and an annular member B 57, each having a plurality of set holes 56a and 57a disposed at intervals along the periphery, which serve as mounting flanges and are welded on the respective ends of the bellows 55. The space within the bellows 55 is made liquid-tight by tightening screws 60 through the set holes 56a of the annular member A 56 via a third O-ring 58 fitted in an annular groove 51b provided at the periphery around an opening of the CRT frame 51 on the lens side thereof. Liquid-tight condition is obtained also by tightening the screws 60 through a set holes 57b of the annular member B 57 via a fourth O-ring 59 fitted in an annular groove 53b provided at the periphery around an opening of the lens frame 53 on the CRT side thereof.

Numeral 61 denotes a holding section which links a CRT block 81 whereon the CRT 21 is mounted on the CRT frame 51 via the first O-ring 52 and a lens block 82 whereon the projection lens 28 is mounted on the lens frame 53 via the second O-ring 54, forming an adjustment mechanism 98 which changes the relative angle and the distance between these members.

Now the operation will be described below. In the projector, which enlarges and projects the image generated by the CRT by means of the projection lens to form a large picture image, heat generated on the face 21c of the CRT 21 which reaches a very high temperature is transmitted via the coolant liquid 32 to the spacer block 22 made of aluminum of good thermal conductance and is dissipated therefrom. Therefore it is important to prevent the coolant liquid 32 from leaking, making it necessary to press the CRT 21 and the projection lens 28 against the mounting surfaces 22f and 22g of the spacer block 22 into tight contact, with the CRT packing 29 and the lens packing 30 being placed in the specified positions.

The coolant liquid 32, being made of a material such as ethylene glycol or silicon oil having a refractive index similar to that of glass, makes the light from the CRT 21 enter the projection lens 28 without refracting so that the deterioration of contrast is prevented, as well as providing the heat dissipation effect. Further, because the holding section 61 and the lens frame 53 shown in FIG. 7 are each provided with a spherical guide being formed thereon to allow relative rotary motion, the angle between the CRT 21 and the projection lens 28 can be changed by turning it.

Adjustments of the relative angle and distance are carried out by means of the adjustment mechanism 98.

FIG. 9 is a cross sectional drawing illustrative of the constitution of a projection type display apparatus disclosed in the Japanese Utility Model Application Laid-Open H2-143884 (1990). Numeral 203 in the drawing denotes a CRT mounting base having a substantially rectangular shape whereon a CRT 201 is mounted by means of an adhesive agent. Numeral 204 denotes a coupling frame having a substantially rectangular shape whereon a projection lens 202 is mounted with a packing 205 being interposed between thereof. The CRT 201 and the projection lens 202 are connected via the CRT mounting base 203 and the coupling frame 204 so that liquid-tightness is maintained. The CRT mounting base 203 and the coupling frame 204 are clamped with bolts 207 at four points with a packing 206 of substantially rectangular shape being interposed between thereof. A space 208 formed by the CRT 201, the projection lens 202, the CRT mounting base 203 and the coupling frame 204 is filled with a coolant liquid 209. Further, a part of the space 208 is made to serve as a bubble storage 208a to accommodate the change in the volume of the coolant liquid 209. In the conventional apparatus as described above, the relative angles between the CRT 201 and the projection lens 202 in the vertical and horizontal directions can be changed by adjusting the degree of tightening the bolts 207.

Projecting the image to focus on a point of the screen makes it necessary to set each projector unit at a proper convergence angle and correction angle. The conventional projection type display apparatus shown in FIG. 5 requires separate spacer blocks of three kinds to set proper values of convergence angle and correction angle for each projector unit, because the apparatus comprises the three projector units and has the CRT and the projection lens which are connected in a fixed structure. Moreover, production of a model of the apparatus having a different projection distance or a different screen size requires to manufacture a different spacer block which leads to longer design period and increased cost of dies. Furthermore, because the relative position of the CRT to the projection lens depends on the accuracy of machining the spacer block, high accuracy is required in machining the spacer block and it is difficult to correct the dimensional errors, once the apparatus has been assembled.

On the other hand, although the conventional apparatus disclosed in the Japanese Patent Application Laid-Open H4-352141 (1992) shown in FIG. 7 allows to change the relative angle between the CRT 21 and the projection lens 28, because the space 31 filled with the coolant liquid 32 is separated in the middle section by the bellows 55, four sealing members to keep the space 31 liquid-tight are required between the CRT 21 and the CRT block 81, between the projection lens 28 and the lens block 82, and between the CRT block 81, lens block 82 and bellows 55. This results in disadvantages of, in addition to the increase in cost, lower reliability such as higher likeliness of liquid leakage. Workability in assembly is also lowered because either the CRT frame 51 or the lens frame 53 interferes when fastening the bellows 55 with screws. And the bellows 55 made of a metal is poor in flexibility and has a disadvantage of being unable to change the inner volume even when the coolant liquid 32 expands due to heating of the CRT 21. Furthermore, installation of the bellows 55 requires longer distance between the CRT frame 51 and the lens frame 53.

The conventional apparatus shown in FIG. 9 has problems such as allowing to change the relative angle both in vertical and horizontal directions and the pressure exerted on the packing 206 becomes uneven from point to point when changing the relative angle, resulting in the possibility of deteriorated liquid-tightness.

SUMMARY OF THE INVENTION

One object of the invention is to provide a projection type display apparatus which is capable of freely changing the relative angle and distance between image forming means and a projection lens while maintaining the optical coupling by means of a coolant liquid.

Another object of the invention is to provide a projection type display apparatus equipped with only one kind of spacer block which serves all the three projector units of red, green and blue images, and is capable of accommodating models of different projection distances or different screen sizes, having high reliability and high workability of manufacture with low cost.

Further another object of the invention is to provide a projection type display apparatus wherein a space is formed over a large area between the image forming means, image forming means holding member, the projection lens, and a projection lens holding member, and high heat dissipation effect is obtained by keeping the coolant liquid directly in contact with the image forming means holding member and the projection lens holding member, and which is capable of simplifying the sealing structure for the space, having good sliding characteristic during adjustment of the relative angle and distance.

In the projection type display apparatus of the first invention, the image forming means and the projection lens are connected via liquid sealing means made of a soft material to keep the space between thereof liquid-tight, and the relative angle and distance between the image forming means and the projection lens can be freely changed and locked. As the magnification of the projection lens is changed according to changed screen size, optimum focusing is always obtained. Because there is no air layer provided between the image forming means and the projection lens which are completely optically coupled by the coolant liquid, images of high contrast can be obtained. Liquid sealing is provided at two points to provide liquid-tightness.

In the projection type display apparatus of the second invention, the image forming means and the projection lens are held by separate holding members which are connected via the liquid sealing means made of a soft material to keep the space between thereof liquid-tight. At least one of these holding members is provided with storage means to store the coolant liquid. This enables stable installation without undesirable pressure being exerted to the liquid, even when the volume of the coolant liquid changes due to the change in the relative angle and distance between the image forming means and the projection lens.

In the projection type display apparatus of the third invention, the image forming means and the projection lens are held by the separate holding members which are connected via the liquid sealing means made of a soft material to keep the space between thereof liquid-tight. At least one of these holding members is provided with a mechanism of adjusting the relative distance between the image forming means and the projection means. Therefore the positioning in the direction of optical axis can be made accurately and a clear image can be projected making the best use of the performance of the projection lens.

In the projection type display apparatus of the fourth invention, the image forming means and the projection lens are held by the separate holding members which are connected via the liquid sealing means made of a soft material to keep the space between thereof liquid-tight. At least one of these holding members is provided with a mechanism of adjusting the relative angle between the image forming means and the projection means. Therefore the angle of inclination can be adjusted accurately and a projected image which is clear even near the edge of the screen can be obtained.

In the projection type display apparatus of the fifth invention, the projector unit is divided into the image forming means and the lens block, with both blocks being connected liquid-tightly by means of a cylindrical packing sheet.

In the projection type display apparatus of the sixth invention, the cylindrical packing sheet has a bulging part being formed integrally on each end thereof. These bulging parts are fitted in the annular grooves provided on the image forming means and on the lens frame.

In the projection type display apparatus of the seventh invention, the cylindrical packing sheet has a bulging part being formed integrally on each end thereof. These bulging parts are filled into the annular grooves provided on the image forming means and on the lens frame, and both or one of the ends are fixed on the frame by bonding.

In the projection type display apparatus of the eighth invention, the filling portions of the cylindrical packing sheet are held by an annular plate.

In the projection type display apparatus of the ninth invention, the connection member is provided with a positioning mechanism which is capable of accommodating specified screen sizes and projection angles, making it possible to easily set the relative angle and distance between the image forming means and the projection lens.

In the projection type display apparatus of the tenth invention, a spacer having specified thickness and configuration which meet the screen size and the projection angle is installed between the image forming means and the projection lens, to determine the relative angle and distance between the image forming means and the projection lens.

The projection type display apparatus of the eleventh invention is provided with a positioning section which determines the position of interposing the space of the tenth invention.

In the projection type display apparatus of the twelfth invention, an adjustment mechanism is provided which is capable of freely changing the relative angle and distance between the image forming means and the projection lens to meet the given screen size and the projection angle.

In the projection type display apparatus of the thirteenth invention, the projection unit is divided into the image forming means and the lens block, and the image forming means block is made of aluminum for high heat dissipation effect as in the prior art, though the lens frame is made of molded plastic.

In the projection type display apparatus of the fourteenth invention, the lens frame is made of a molded plastic and a packing sheet is formed at the same time.

In the projection type display apparatus of the fifteenth invention, the projector unit is divided into the image forming means block and the lens block, and the lens frame and the lens barrel are made in an integral constitution.

In the projection type display apparatus of the sixteenth invention, apart from the connecting means to connect the image forming means block and the lens block which are divided, a mechanism is provided to freely rotatable support both blocks.

In the fifth through sixteenth inventions, because the projection unit is divided into the image forming means block and the lens block with both blocks being connected liquid-tightly by means of the cylindrical packing sheet, relative distance between the image forming means and the projection lens can be changed freely, making it possible to accommodate changes in the screen size and projection angle with a single projector unit. Consequently, providing a single projection unit suffices and it is not necessary to manufacture spacer blocks in three kinds, for red, green and blue images, or for different screen sizes and projection angles. Also because both blocks are connected with the cylindrical packing sheet, it can be installed even when there is only a narrow space between both blocks, thereby increasing the degree of freedom in the design of the apparatus.

While the annular packing sheet is used for connecting the image forming means and the image forming means frame, the projection lens and the lens frame are connected liquid-tightly by the end of the cylindrical packing sheet to reduce the number of the sealing points to three. This reduces the risk of liquid leakage and improves workability. Even when the coolant liquid expands by the heat generated by the image forming means, the packing sheet extends to change its inner capacity by the expanded volume to keep the inner pressure unchanged, thus improving the reliability and making the tank unnecessary.

The connecting means which connect the image forming means block and the lens block with a specified distance is provided with positioning holes, spacers or an adjustment mechanism for different screen sizes and projection angles, the relative angle and the distance between both blocks can be easily changed. The relative angle and the distance between the image forming means block and the lens block can also be easily changed in the presence of the coolant liquid filling the space.

Further, in addition to the connecting means which connect the image forming means block and the lens block, a mechanism of supporting both blocks movably and detachably is provided, and therefore the relative angle and the distance between the image forming means block and the lens block can also be easily changed in the presence of the coolant liquid filling the space, resulting in increased workability of manufacture.

In the projection type display apparatus of the seventeenth invention, the space between opposing surfaces of the first holding means which holds the image forming means and the second holding means which holds the projection lens, is sealed liquid-lightly with a ring-shaped elastic sealing material being interposed to allow relative movement of both holding means. The elastic sealing material is fitted into an annular groove which is formed on either the first holding means or the second holding means, and is slidably mounted on a spherical guide formed on either the first holding means or the second holding means.

The projection type display apparatus of the eighteenth invention has the constitution of the projection type display apparatus of the seventeenth invention except for the spherical guide being replaced with a cylindrical guide.

Because the elastic sealing material is fitted in the spherical guide or the cylindrical guide, adjustment of the inclination angle by means of the elastic sealing material is capable of adjusting the inclination angle in every direction including the vertical and horizontal directions. Degree of deformation of the elastic sealing material can also be kept substantially constant, thereby providing good sealing performance and sliding characteristic, with less influence on the liquid-tightness. And a liquid-tight space can be formed over a wide region including the space between the image forming means and the space between the first holding means and the second holding means, making it possible to dissipate heat through the coolant liquid which fills the space and through the first holding means and the second holding means to provide a greatly improved heat dissipation effect. This also makes the liquid-tight sealing structure greatly simplified, thereby improving the workability of assembly and reducing the product cost.

In the projection type display apparatus of the nineteenth invention, a ring-shaped elastic sealing material is bonded to the peripheries of the frame of the first holding means which holds the image forming means, and of the frame of the second holding means which holds the projection lens to connect the frames liquid-lightly. Because the ring-shaped elastic sealing material is fixed onto both frames by bonding, improved sealing performance and good liquid-tightness are obtained. The relative angle and distance between both frames can be changed easily.

The above and further objects and features of the invention will more fully be apparent from the following detailed description with accompanying drawings.

DESCRIPTION OF THE PREFERRED EMBODIMENTS

The invention will now be described in detail below with reference to the drawings illustrative of the preferred embodiments thereof.

(First invention)

Figure 1:
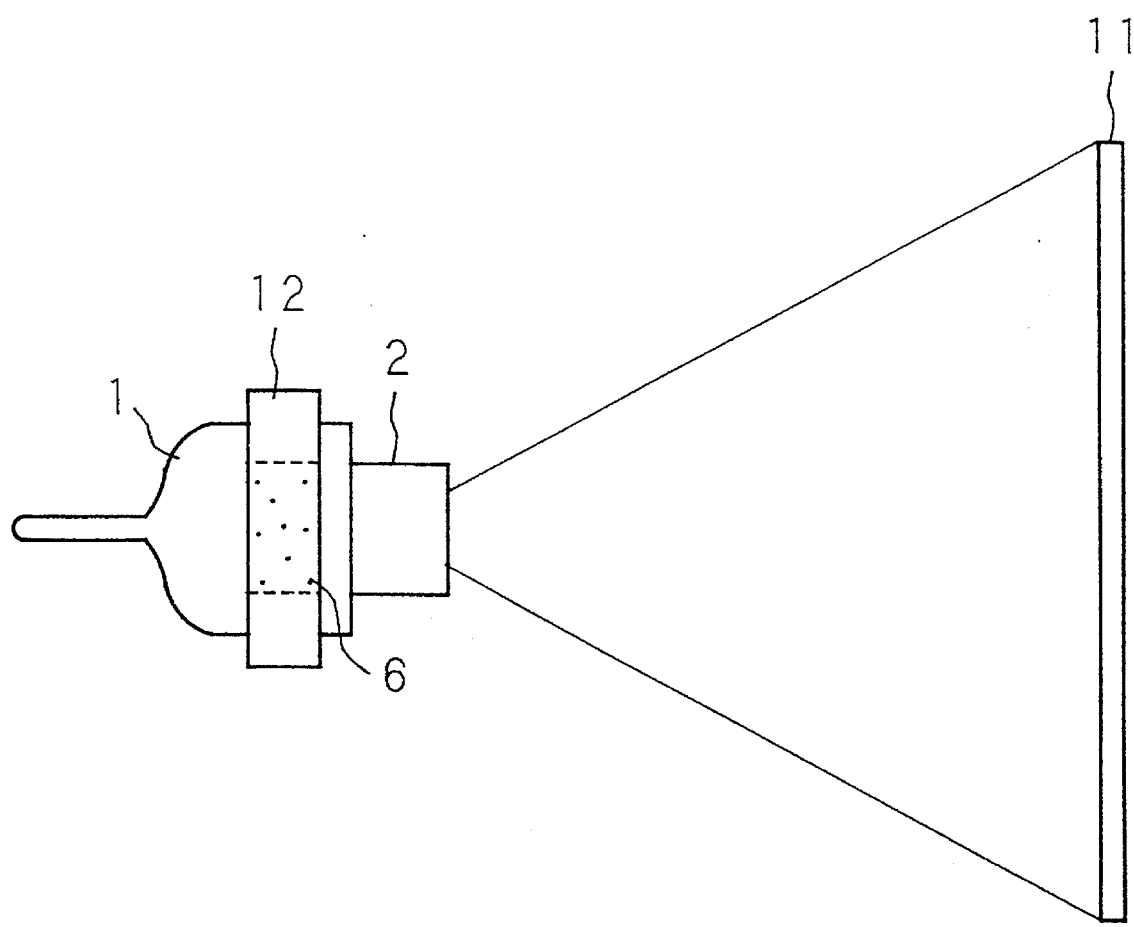
FIG. 1 is a drawing illustrative of the constitution of a projection type display apparatus of a prior art.
Figure 2:
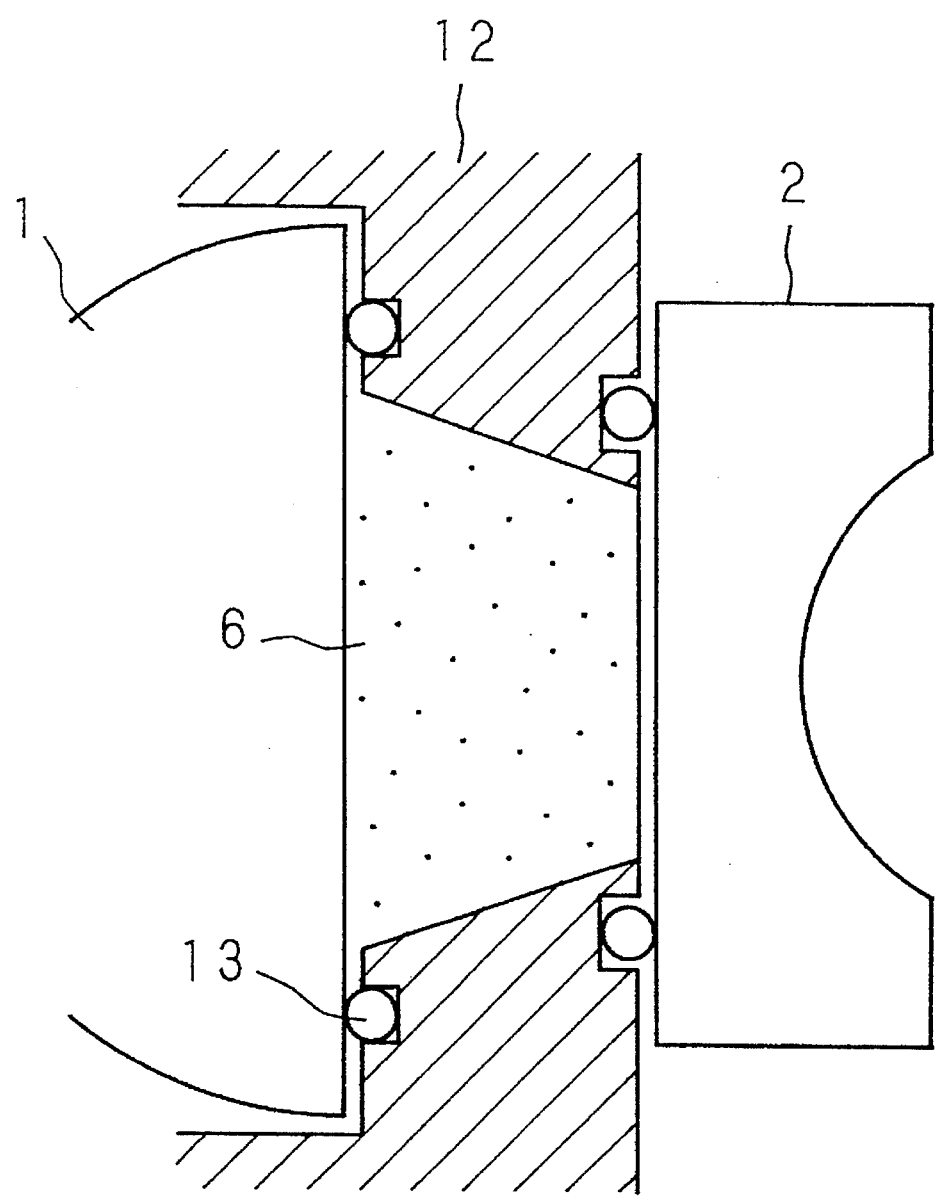
FIG. 2 is a cross sectional drawing illustrative of the joint between a CRT and a projection lens of the prior art.
Figure 3:
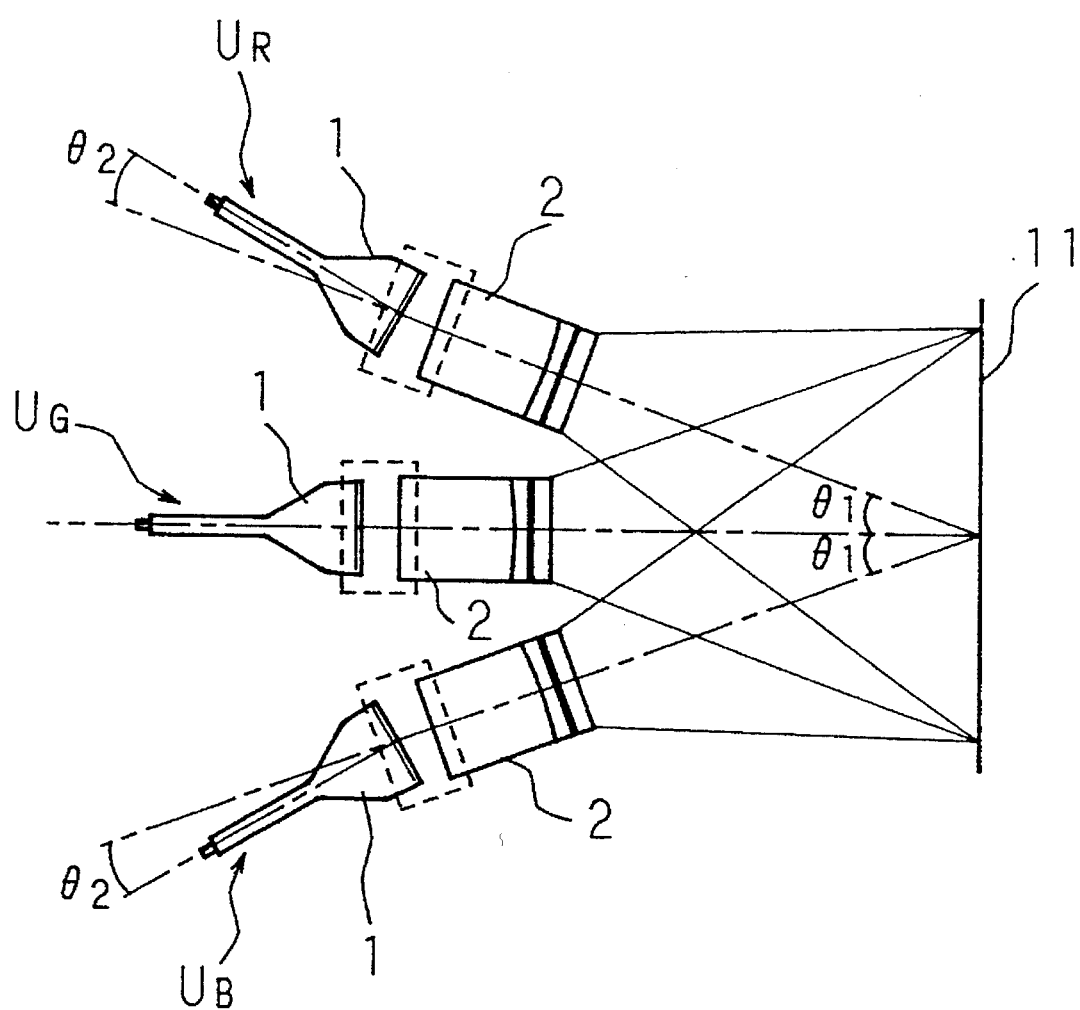
FIG. 3 is a drawing explanatory of the correction angle of a 3-tube projection type display apparatus.
Figure 4:
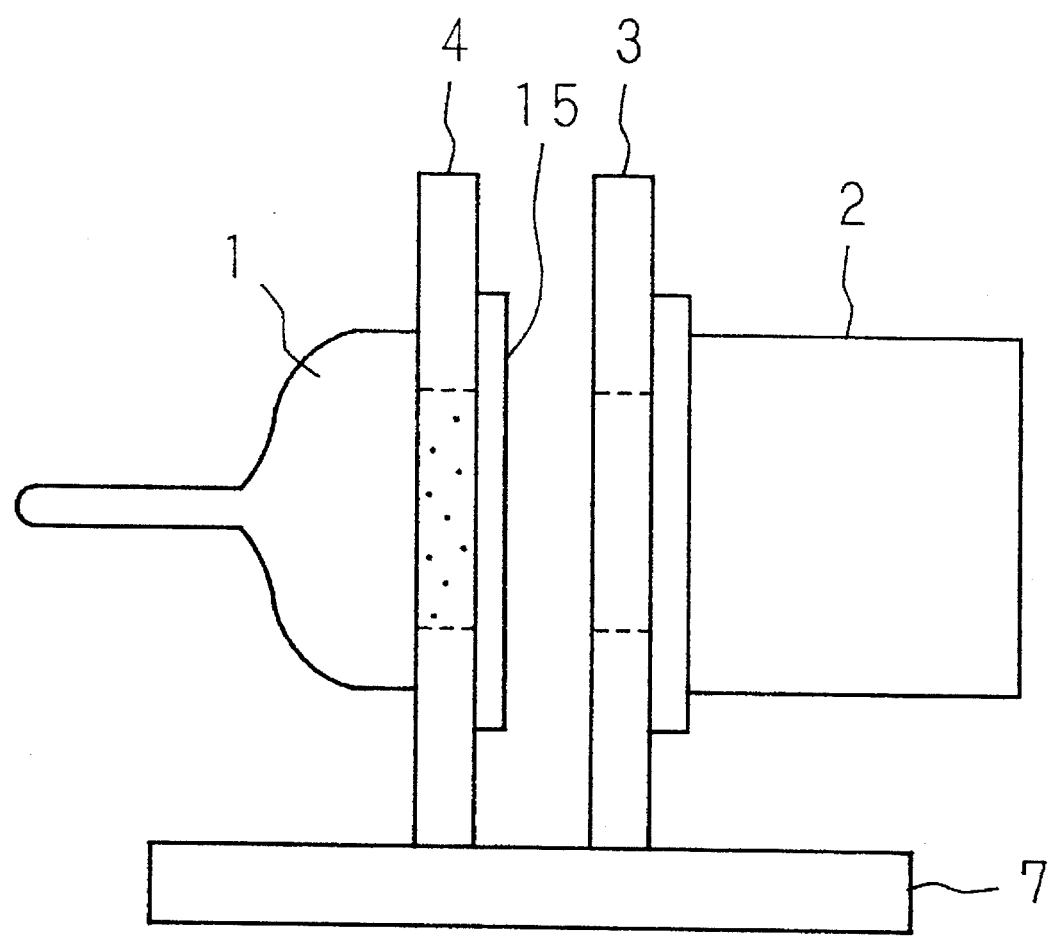
FIG. 4 is a drawing illustrative of another projection type display apparatus of the prior art.
Figure 10:
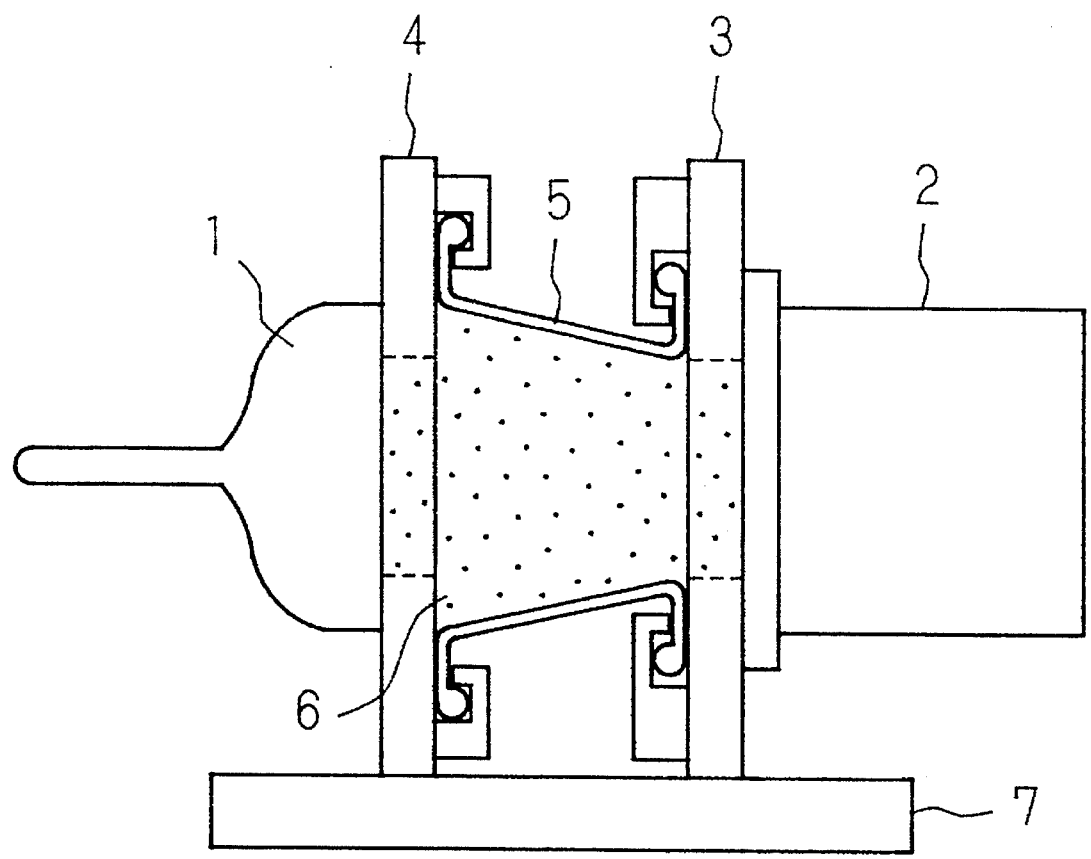
FIG. 10 is a cross sectional drawing illustrative of one of the projection units composing the projection type display of the first invention.

FIG. 10 is a cross sectional drawing illustrative of one of the projection units composing the projection type display of the first invention. A CRT 1 which is image forming means is mounted on a holding member 4 and the projection lens 2 is mounted on a holding member 3. The holding members 3, 4 are connected to each other via a coolant liquid sealing material 5 made of a soft material such as silicon rubber, with the inside being filled with a coolant liquid 6. The coolant liquid sealing material 5 has the functions of both the spacer 12 and the packing 13 in the example of the prior art shown in FIG. 2.

The first invention differs from the prior art in that a soft material such as silicon rubber is used so that, when the screen size is changed, installation of the holding members 3, 4 can be adjusted and locked to make the CRT 1 inclined against the projection lens 2 according to the correction angle θ2 determined by the equation (1). Consequently, images can be correctly formed on the screen and correct focusing can be maintained all over the screen including the periphery. When it is desired to change the thickness of the coolant liquid layer according to the screen size in order to fully utilize the lens performance, interval in the direction of optical axis can be changed to obtain the optimum position. Because the sealing section and the inclination angle and distance adjustment section are separated, adjustments of the inclination angle and distance do not cause any significant change in the seal pressure. Also because sealing is provided at two points, there is less probability of liquid leakage.

The holding members 3, 4 are mounted on a base plate 7 whereon the optical unit comprising the CRT 1, the projection lens 2, etc. Different screen sizes can be accommodated by determining the mounting position for different screen sizes in advance, and providing positioning pins or set screw holes not shown in the drawings.

Figure 11:
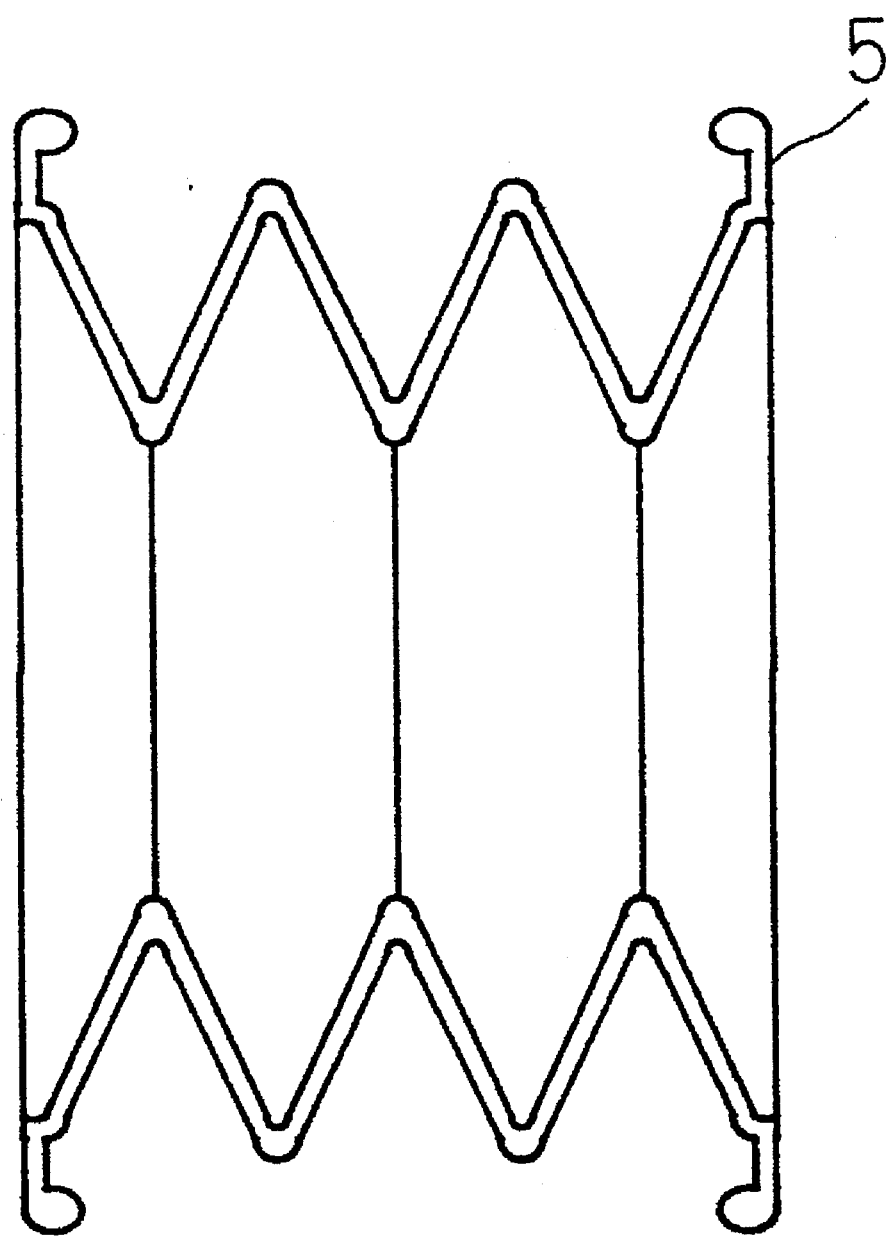
FIG. 11 is a cross sectional drawing illustrative of the configuration of the coolant liquid sealing material in another embodiment of the projection type display of the first invention.

FIG. 11 is a cross sectional drawing illustrative of the configuration of the coolant liquid sealing material 5, which is made in bellows shape, in another embodiment of the first invention. Although the coolant liquid sealing material 5 may sag due to the weight of the coolant liquid 6 in the embodiment shown in FIG. 10, the configuration in this embodiment makes the sealing material less likely to deform due to gravity. This embodiment also has an advantage of easier deformation in the directions of optical axis and inclination which are the desired directions of deformation.

(Second invention)

Figure 12:
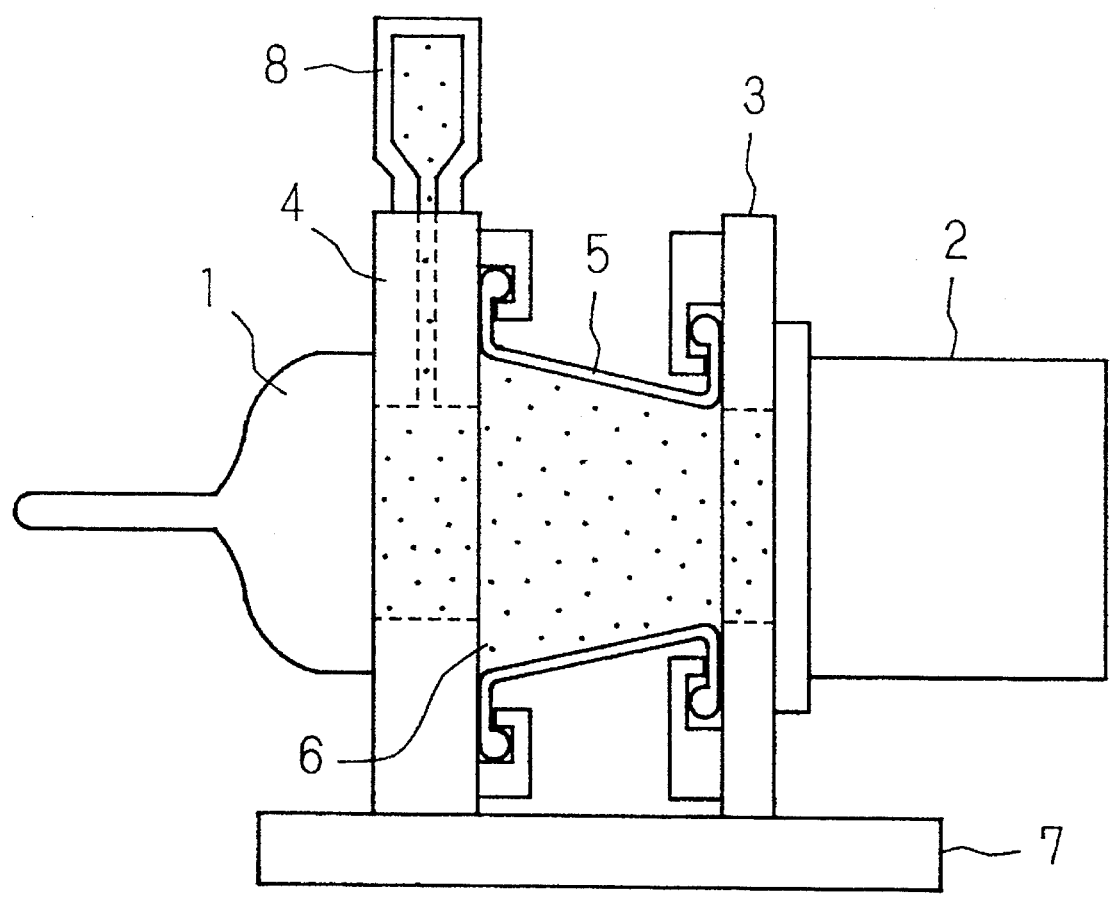
FIG. 12 is a cross sectional drawing illustrative of one of the projection units composing the projection type display of the second invention.

FIG. 12 is a cross sectional drawing illustrative of one of the projection units composing the projection type display of the second invention. In the above two embodiments, the volume of the coolant liquid 6 inside the coolant liquid sealing material 5 is liable to increase or decrease when the relative position of the holding members 3, 4 is changed. By providing the holding member 4 on the CRT 1 side with a tank 8 to store the coolant liquid 6, pressure of the coolant liquid 6 is kept from changing and problems such as liquid leakage can be prevented because the coolant liquid 6 enters the tank 8 when the volume of the coolant liquid 6 increases, and the coolant liquid 6 comes out of the tank 8 when the volume of the coolant liquid 6 decreases.

(Third invention)

Figure 13:
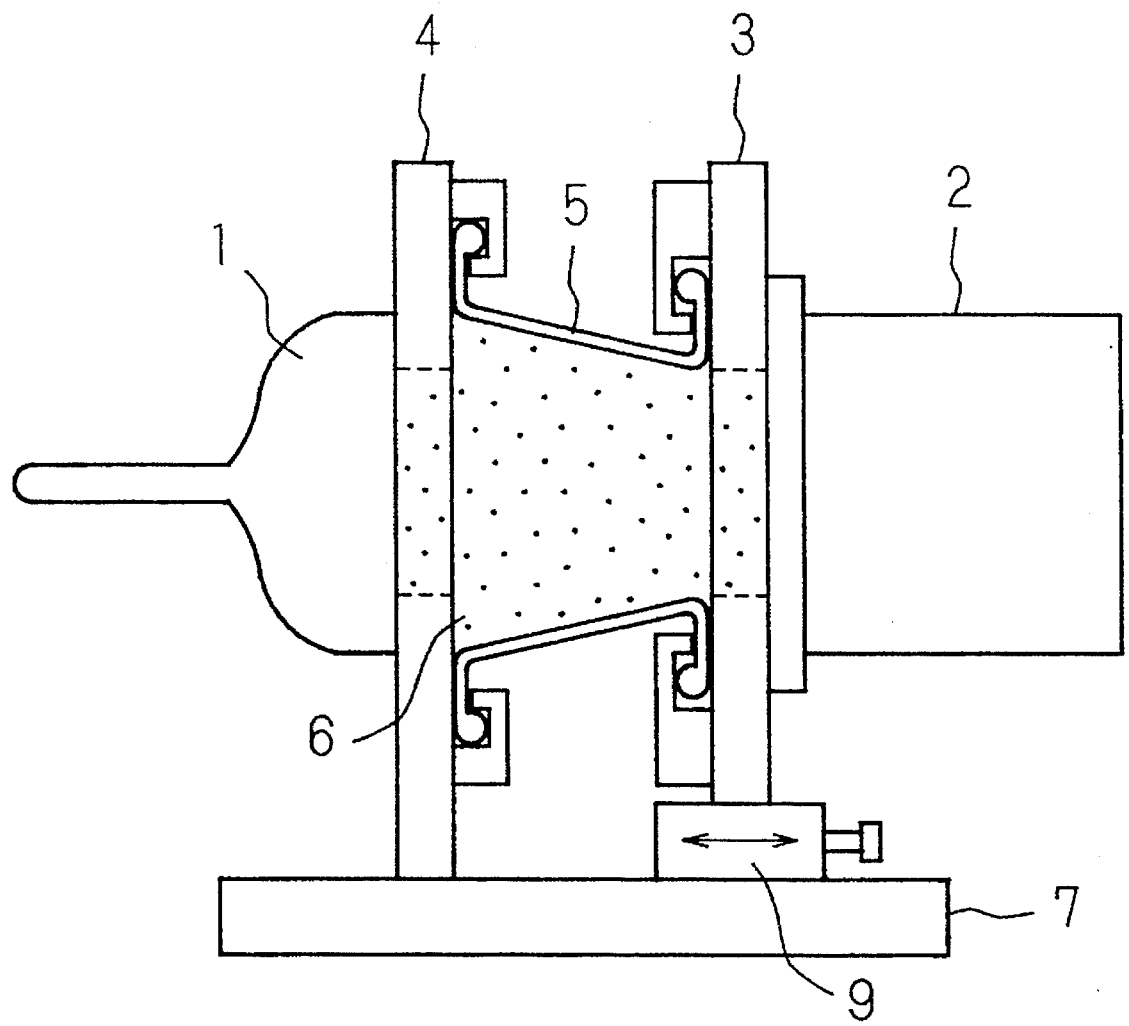
FIG. 13 is a cross sectional drawing illustrative of one of the projection units composing the projection type display of the third invention.

FIG. 13 is a cross sectional drawing illustrative of one of the projection units composing the projection type display of the third invention. The holding member 3 of the projection lens 2 is mounted on the base plate 7 via a fine adjustment mechanism 9 for the direction of optical axis. This makes it possible to make adjustment for even a minute change of the screen size, thereby providing the optimum projected images by fine-tuning the distance between the CRT 1 and the projection lens 2.

(Fourth invention)

Figure 14:
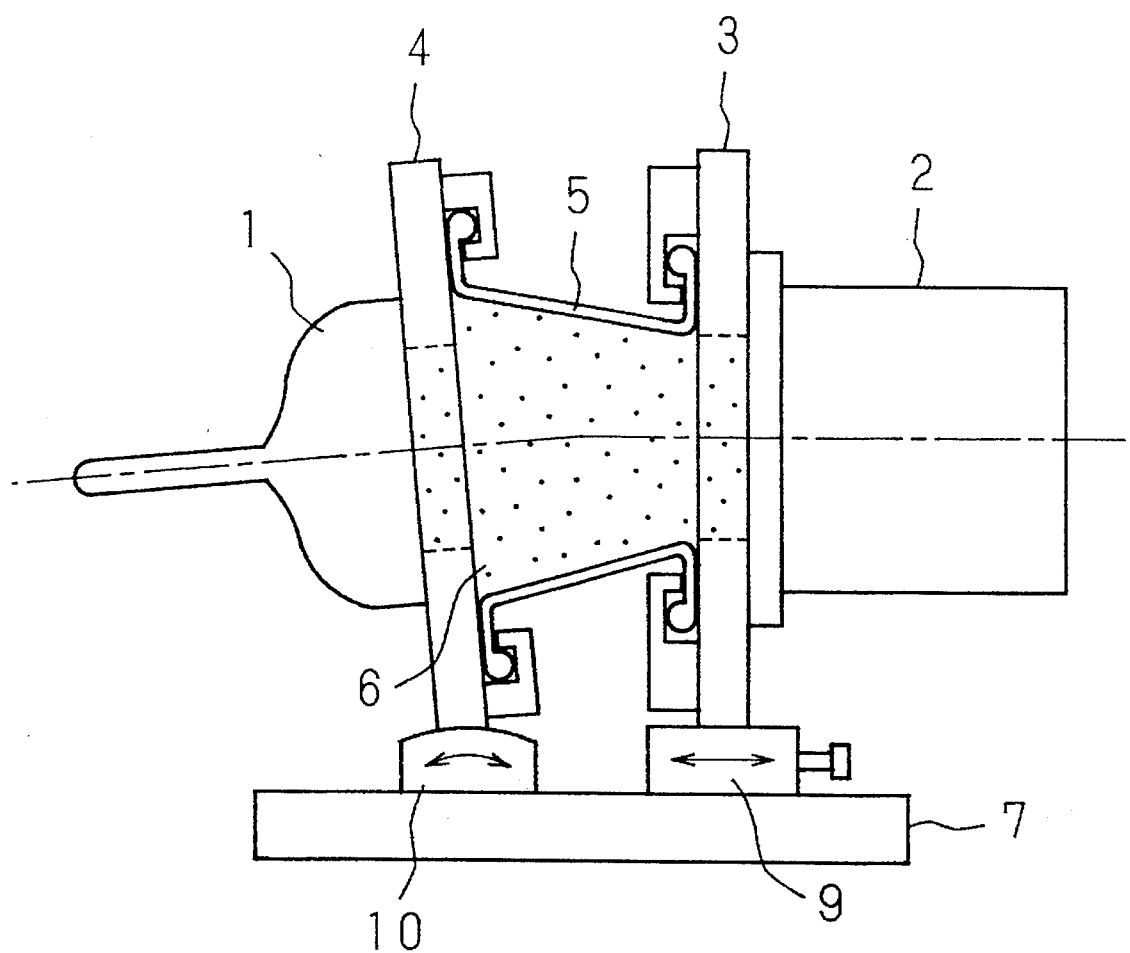
FIG. 14 is a cross sectional drawing illustrative of one of the projection units composing the projection type display of the fourth invention.

FIG. 14 is a cross sectional drawing illustrative of one of the projection units composing the projection type display of the fourth invention. The holding member 4 of the CRT 1 is mounted on the base plate 7 via an inclination angle fine adjustment mechanism 10. This makes it possible to make adjustment for even a minute change of the screen size, thereby providing the optimum focusing in the periphery of the screen by fine-tuning the relative angle between the CRT 1 and the projection lens 2.

As described with regard to the prior art in that the correction angle θ2 for the convergence angle θ1 of inclination of the optical axes for red and blue images against the green optical system, correction of the inclination angle is also necessary when the light from the green optical system is incident obliquely on the screen as in the case of, for example, a ceiling-suspended video projector. Because the relative angle of the CRT and the projection lens can be adjusted even when the angle of incidence on the screen is freely selected, thereby widening the applicability of the apparatus.

Although the apparatus of the first through fourth inventions described above have two sealing points and provides good liquid-tightness, either one of the sealing sections must be assembled out of sight. This problem of workability is solved in the fifth and subsequent inventions.

(Fifth invention)

Figure 5:
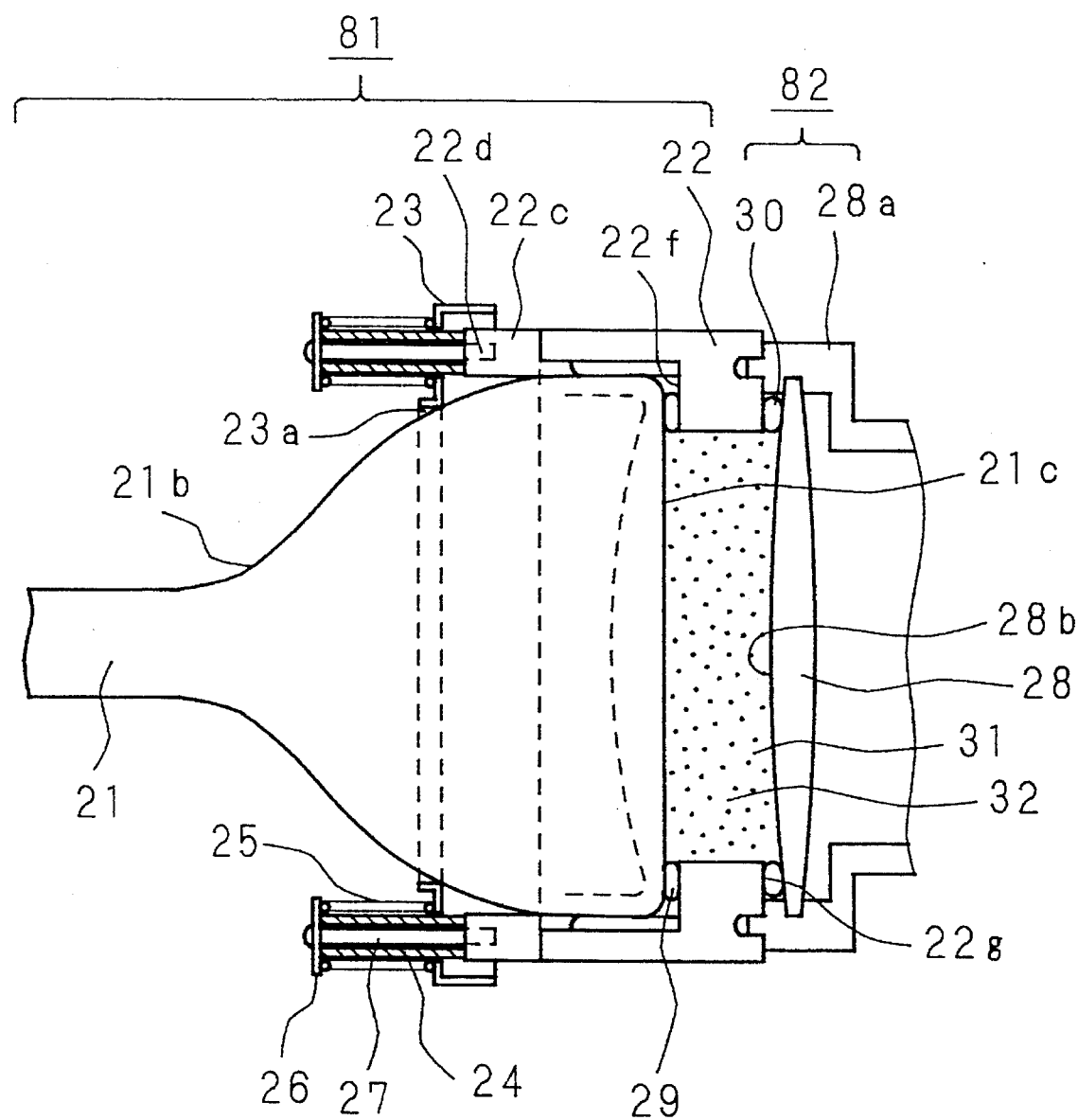
FIG. 5 is a cross sectional drawing illustrative of one of the projection units of a projection type display apparatus of the prior art.
Figure 6:
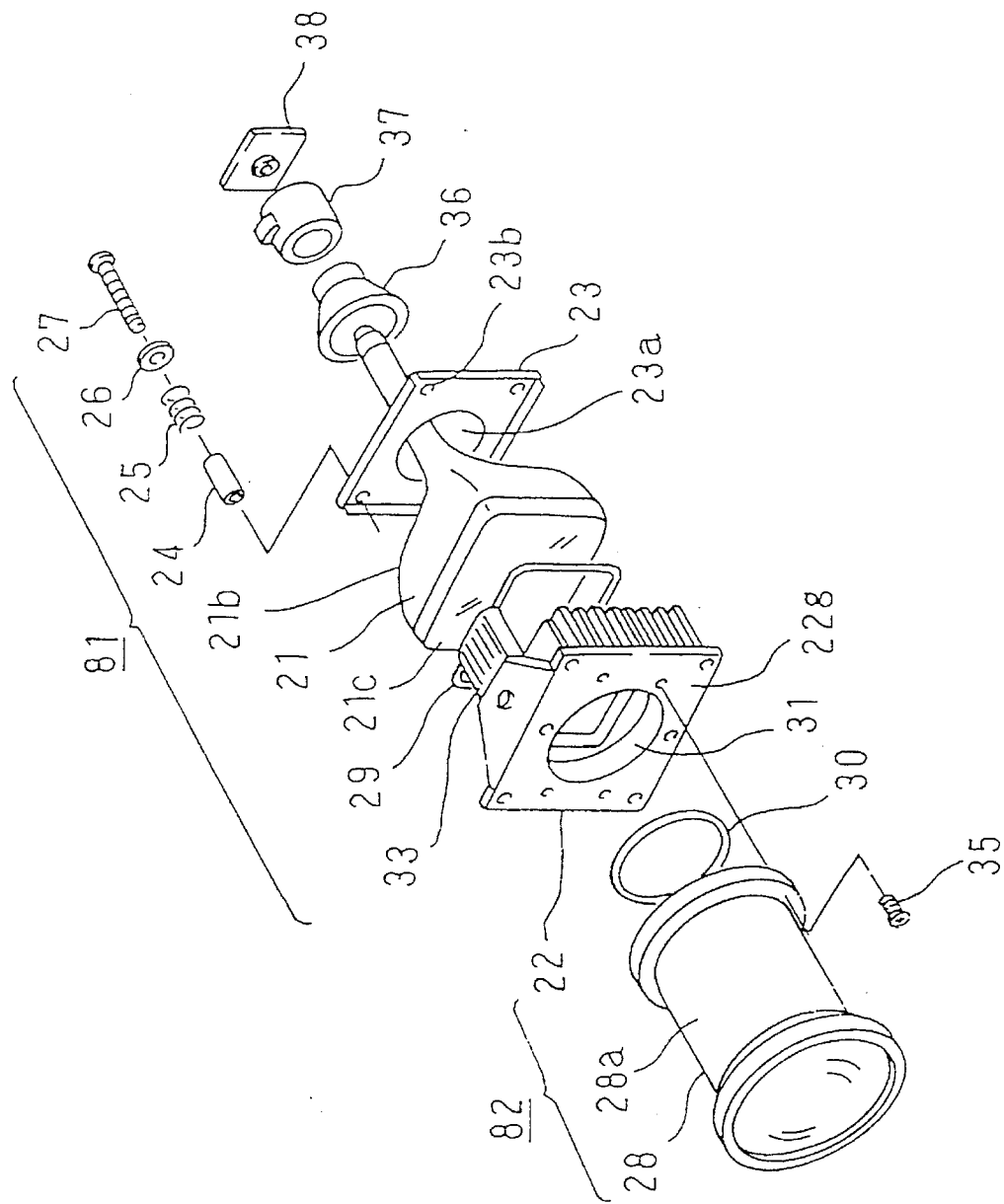
FIG. 6 is an exploded perspective view of the projection unit shown in FIG. 5.
Figure 7:
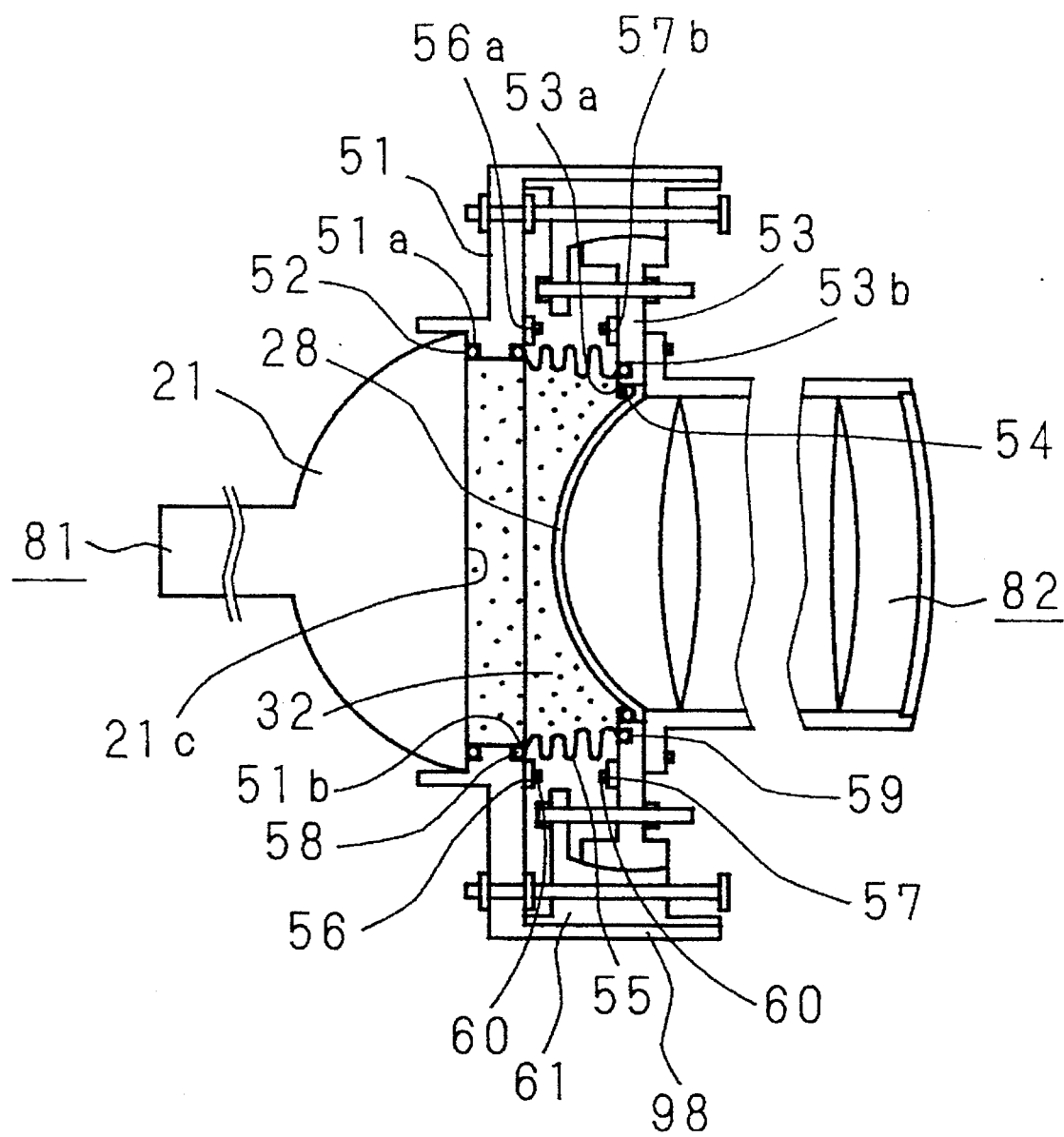
FIG. 7 is a cross sectional drawing illustrative of one of the projection units of another projection type display apparatus of the prior art.
Figure 8:
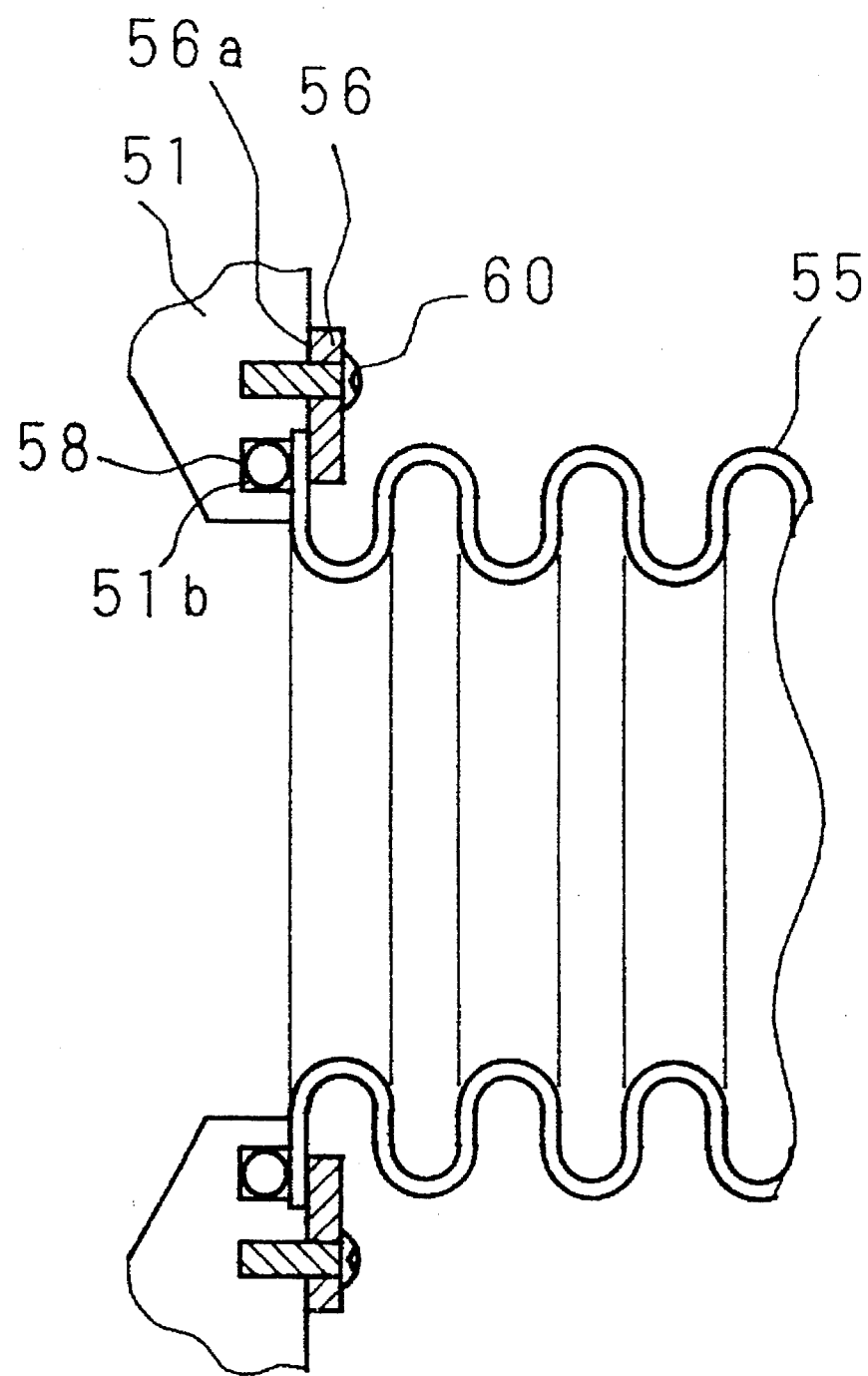
FIG. 8 is a partially enlarged cross sectional drawing of a bellows used in FIG. 7.
Figure 9:
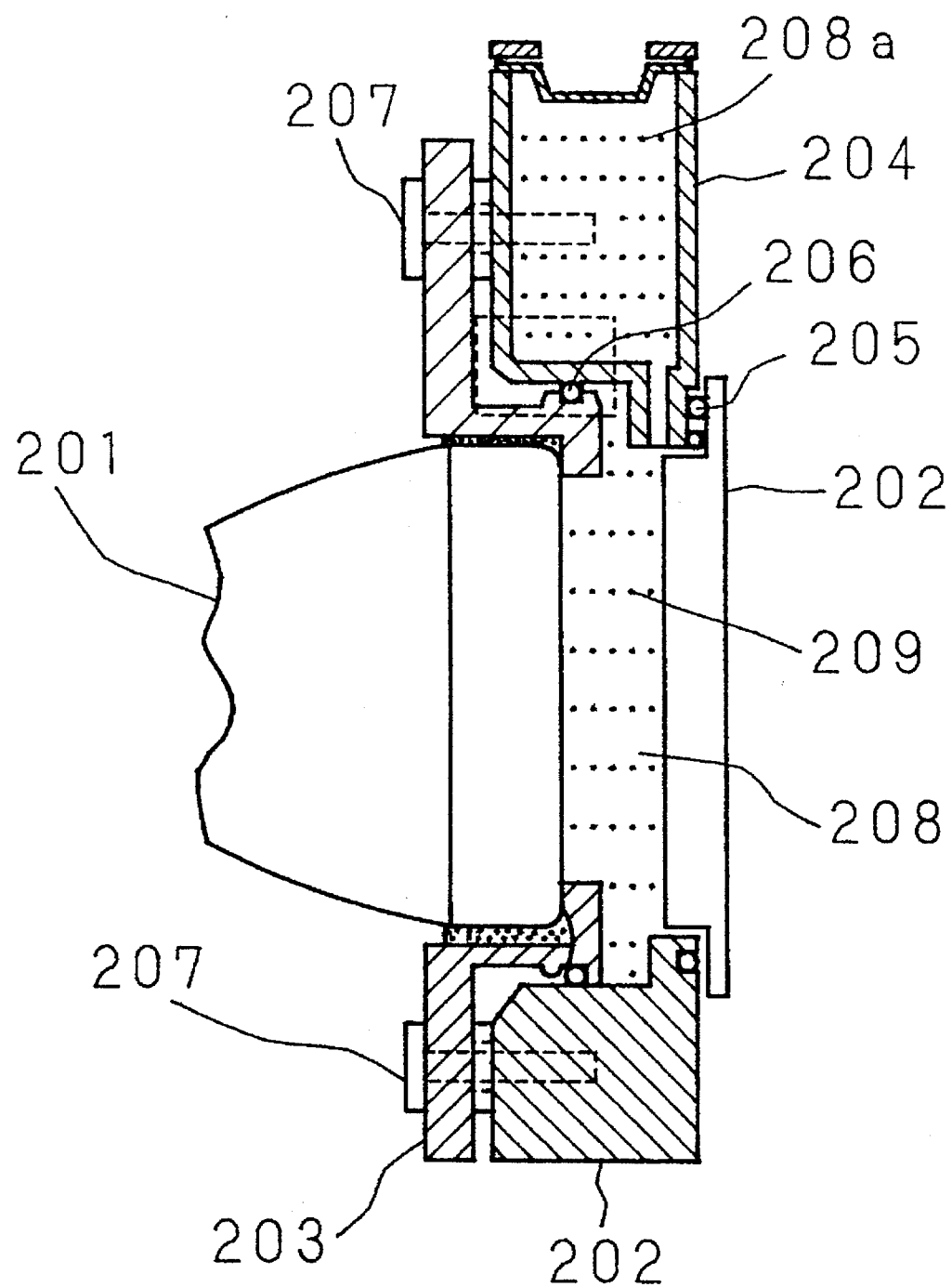
FIG. 9 is a cross sectional drawing illustrative of one of the projection units of further another projection type display of the prior art.
Figure 15:
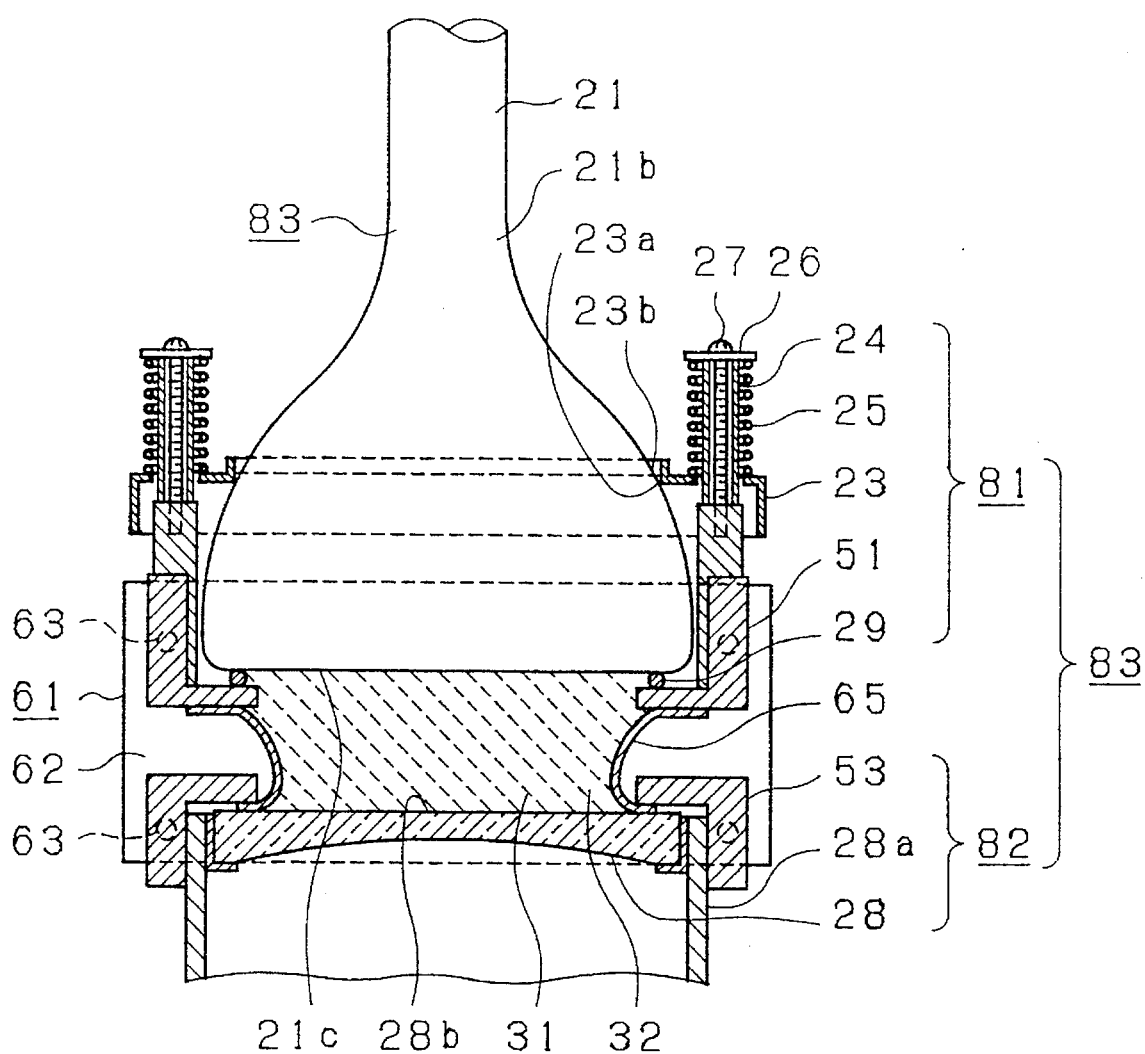
FIG. 15 is a cross sectional drawing illustrative of the first embodiment of one of the projection units composing the projection type display of the fifth invention.
Figure 16:
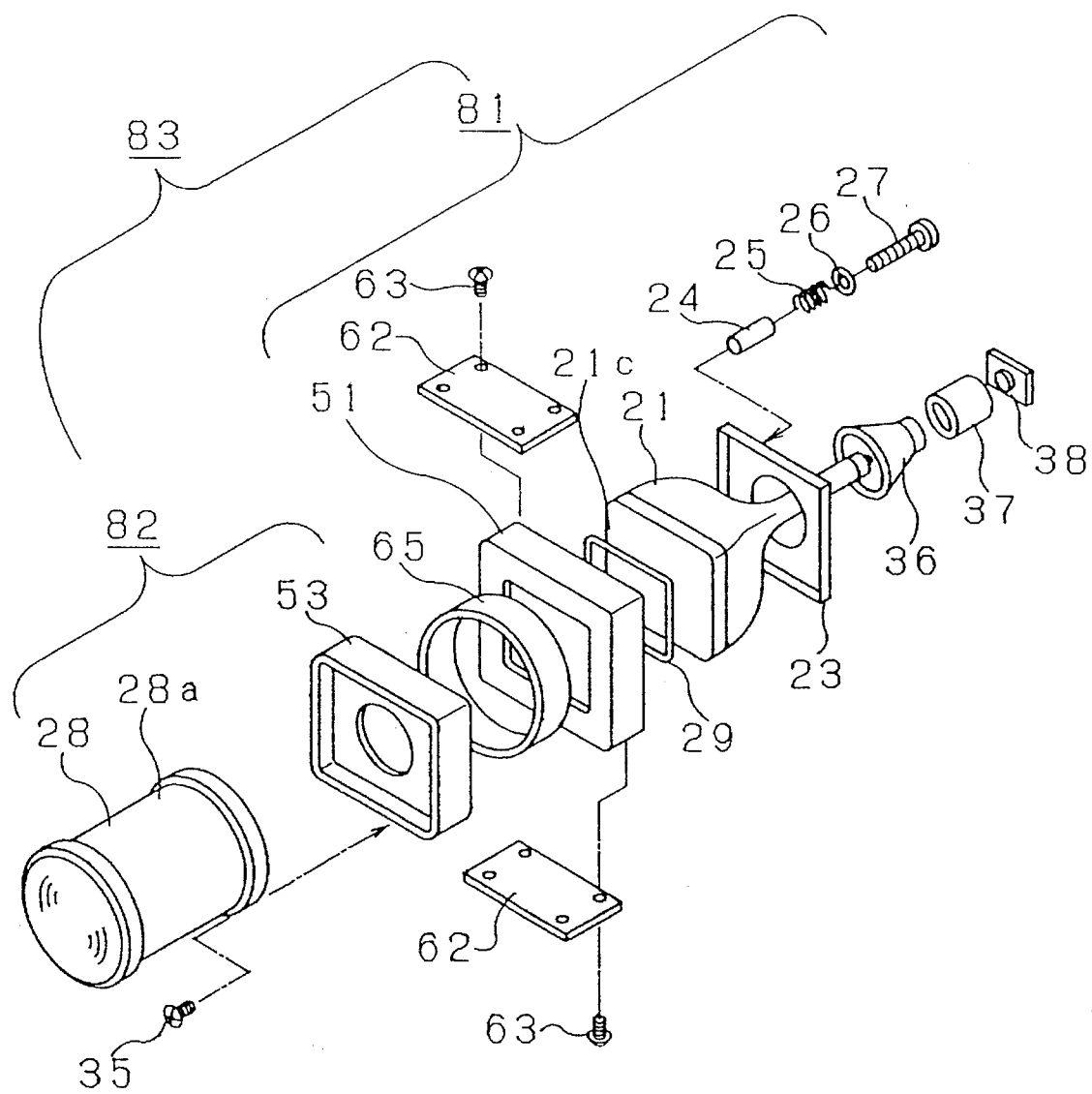
FIG. 16 is an exploded perspective view of the projection unit shown in FIG. 15.
Figure 17:
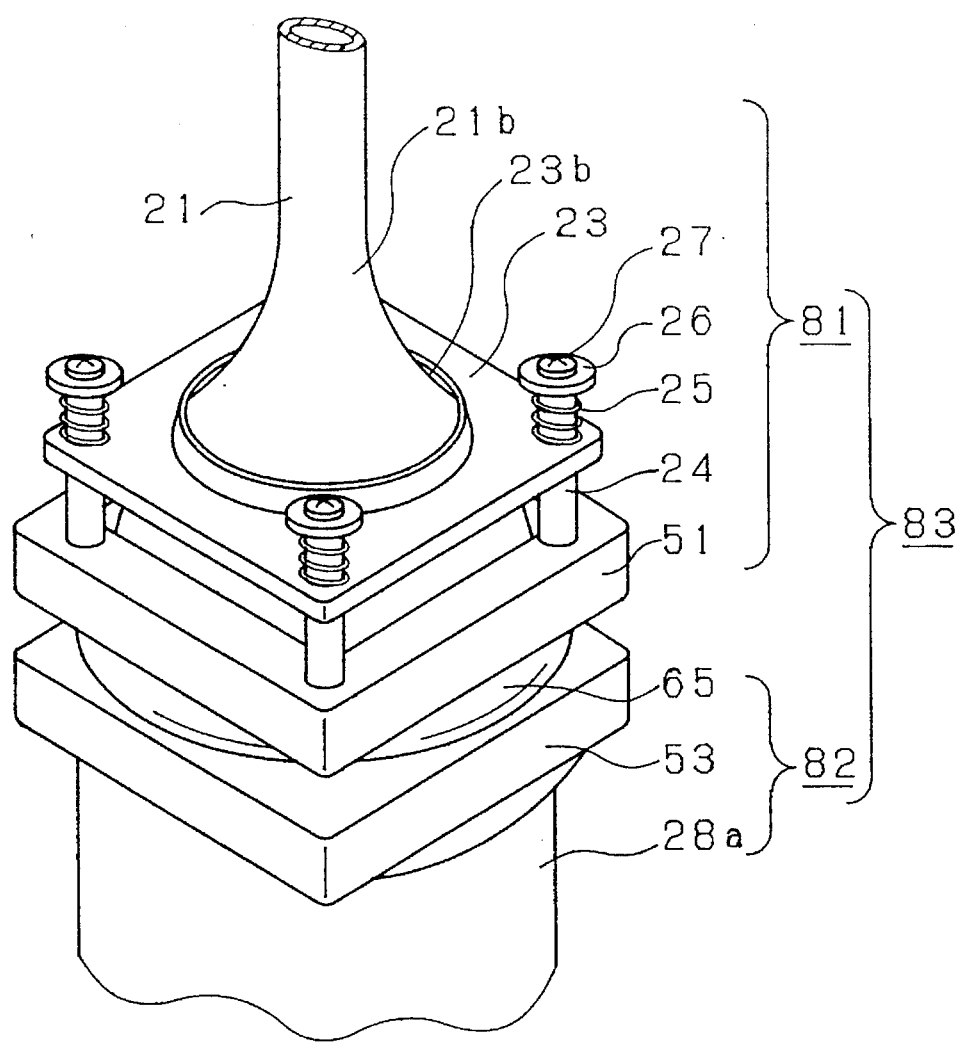
FIG. 17 is a perspective view illustrative of the projection unit shown in FIG. 15 as assembled.
Figure 18:
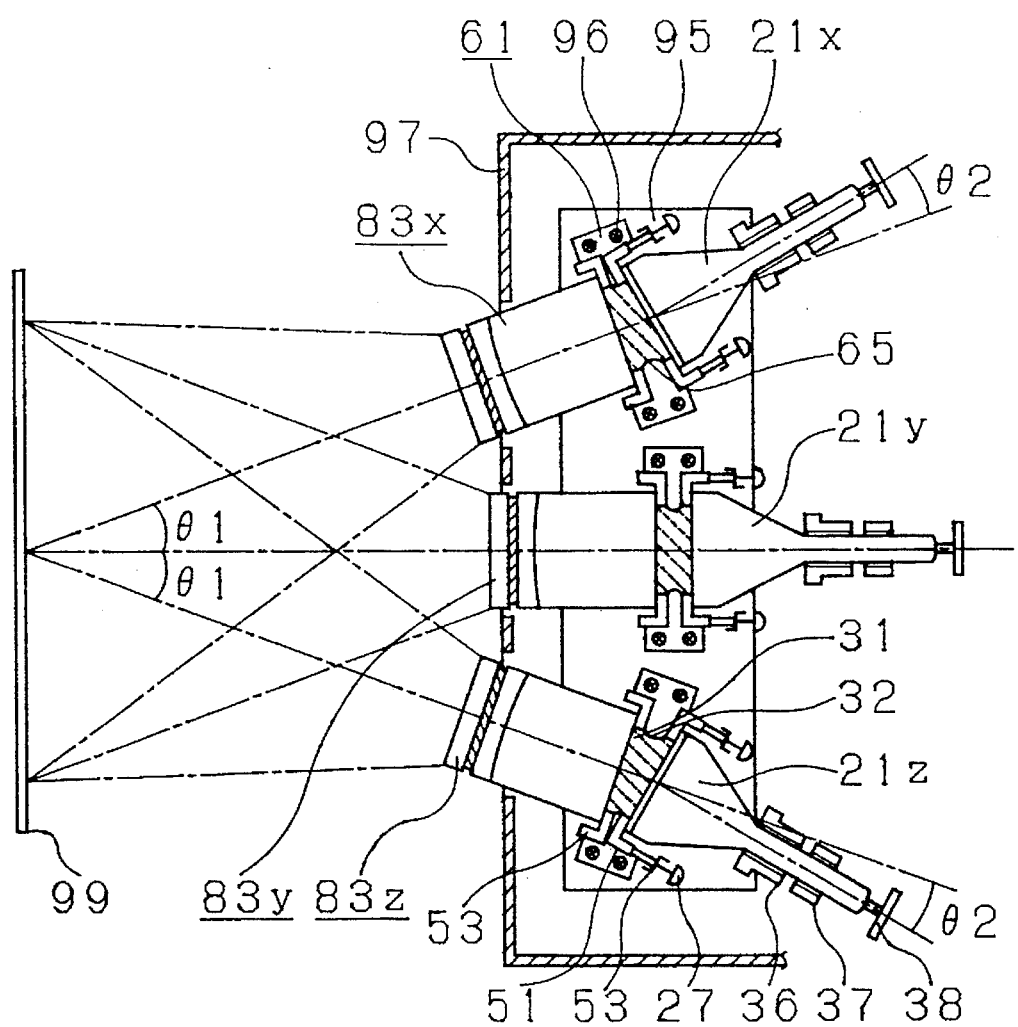
FIG. 18 is a cross sectional drawing illustrative of the projection unit shown in FIG. 15 as installed in the projection type display apparatus.

FIG. 15 is a cross sectional drawing illustrative of the first embodiment of one of the projection units composing the projection type display of the fifth invention. FIG. 16 is an exploded perspective view of FIG. 15. FIG. 17 is a perspective view illustrative of the projection unit as assembled. FIG. 18 is a cross sectional drawing illustrative of a key portion of three projection unit as installed in the apparatus. In these drawings, components identical with or corresponding to those of the conventional apparatuses shown in FIG. 5 through FIG. 7 are identified with the same symbols and description thereof will not be given.

The CRT 21 as the image forming means is mounted on a CRT frame 51 via a CRT packing 29, and a spring 25 exerts compression force to a holding plate 23 thereby to keep the CRT 21 and the CRT frame 51 in liquid-tight assembly, thus constituting a CRT block 81. On the other hand, a lens block 82 is constituted by interposing an end of a packing sheet 65 made of formed rubber or the like between a lens frame 53 and a projection lens 28 to obtain liquid-tight condition. Another end of the packing sheet 65 is attached to the CRT frame 51 liquid-tightly (method of attaching is not specified), to form a liquid-tight space 31 between a face 21c of the CRT 21 and a lens surface 28b. The packing sheet 65 in this constitution is installed with a flexure being given thereto to allow adjustment of the relative angle and distance of the blocks 81, 82, with the space 31 being filled with a coolant liquid 32.

The CRT block 81 and the lens block 82 are fastened to a mounting plate 62 with screws 63 so that the specified distance and angle can be maintained. A projection unit 83 is constituted as described above, and three sets of the CRT 21 and the projection unit 28, installed with the relative angle being set for red, green and blue images respectively, constitute the projection type display apparatus.

Now the operation will be described below. The principle of image projection in the apparatus of the fifth invention is the same as that of the conventional apparatus, and the description thereof will be omitted. It is also the same as the prior art in that three projection units 83, each comprising the CRT block 81, the lens block 82 and a holding member 61, are used for red, green and blue images, and optical axes of the projection units 83 are inclined to each other so that the images generated by the three CRTs 21 converge at one point on a screen 99, with the relative angle and distance of the CRT 21 and the projection lens 28 of each unit differ from those of other units.

The apparatus of the fifth invention is made by constituting three units for red, green and blue images within the projection apparatus by using the CRT frame 51 and the lens frame 53 in common, and changes in the projection optics system such as the screen size, projection distance and projection angle are accommodated within the same apparatus.

When the coolant liquid 32 expands due to heating of the CRT 21 during operation, the packing sheet 65 swells toward the outside to increase the capacity and accommodate the increased volume, thereby keeping the pressure of the coolant liquid 32 constant. Sealing provided on three faces, with fewer faces than in the prior art, also reduces the possibility of liquid leakage.

Three projection units 83 thus assembled are mounted on a unit base 95 which is installed on a outer casing 97 at the specified positions and angles and fastened with screws 96.

The convergence angle θ1 and the correction angle θ2 in this constitution are given as $\tan\theta 2=(n/m)\tan\theta 1$ (Scheimpflug's law) as shown by equation (1), where n is refractive index of the coolant liquid and m is the magnification of projection). For example, with a small screen measuring 70", parameters are given as n=1.4, m=12.7, θ1=4.7° and θ2=0.53°. With a large screen measuring 300", parameters are given as n=1.4, m=54.5, θ1=1° and θ2=0.03°.

Figure 19:
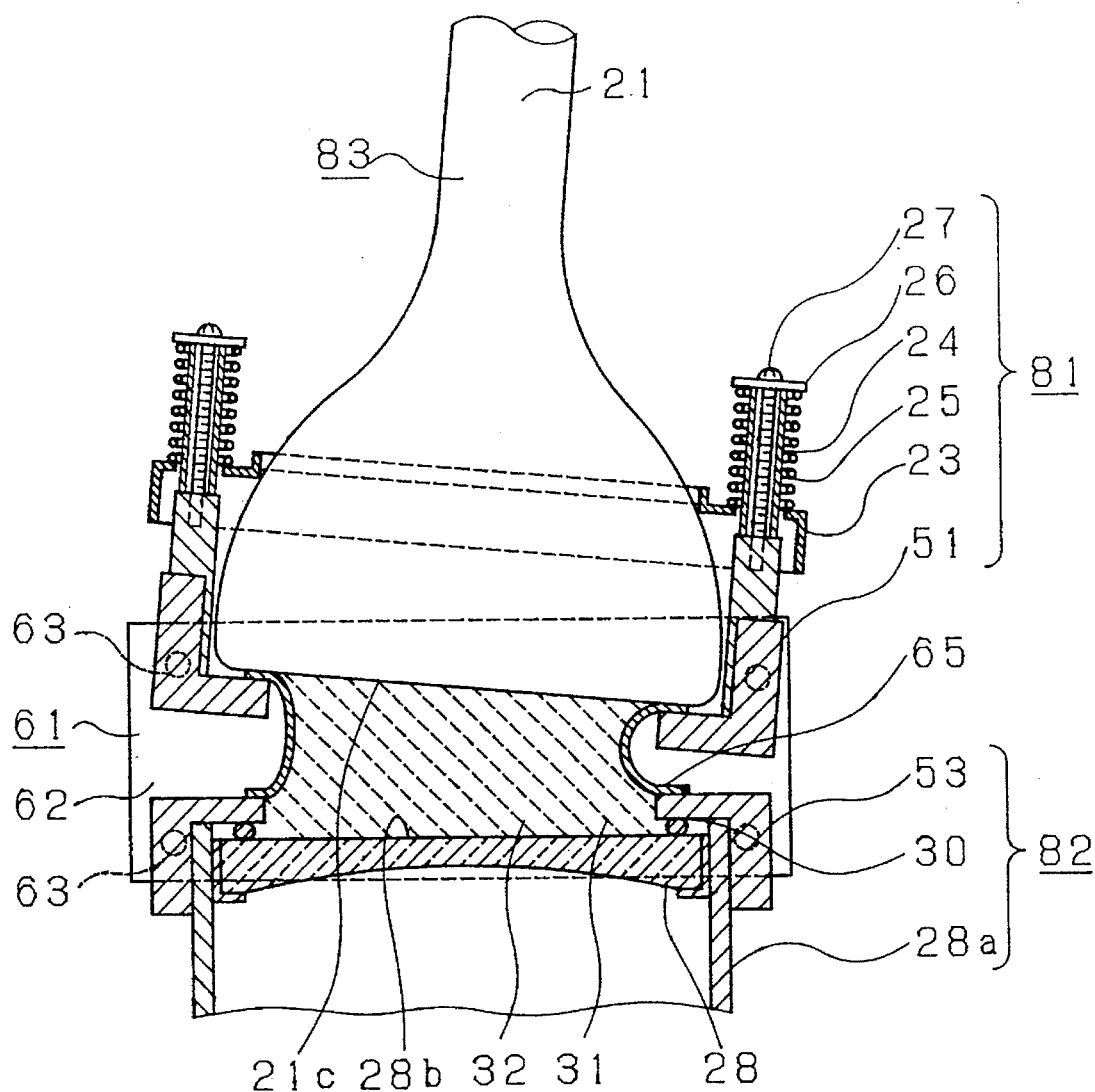
FIG. 19 is a cross sectional drawing illustrative of the second embodiment of one of the projection units composing the projection type display of the fifth invention.

FIG. 19 is a cross sectional drawing illustrative of the second embodiment of one of the projection units composing the projection type display of the fifth invention. The interface between the projection lens and the lens frame 53 is sealed with a lens packing 30, and the interfaces between the CRT 21 and the CRT frame 51 and between the CRT block 81 and the lens frame 53 are sealed with the packing sheet 65, providing the same effect.

Figure 20:
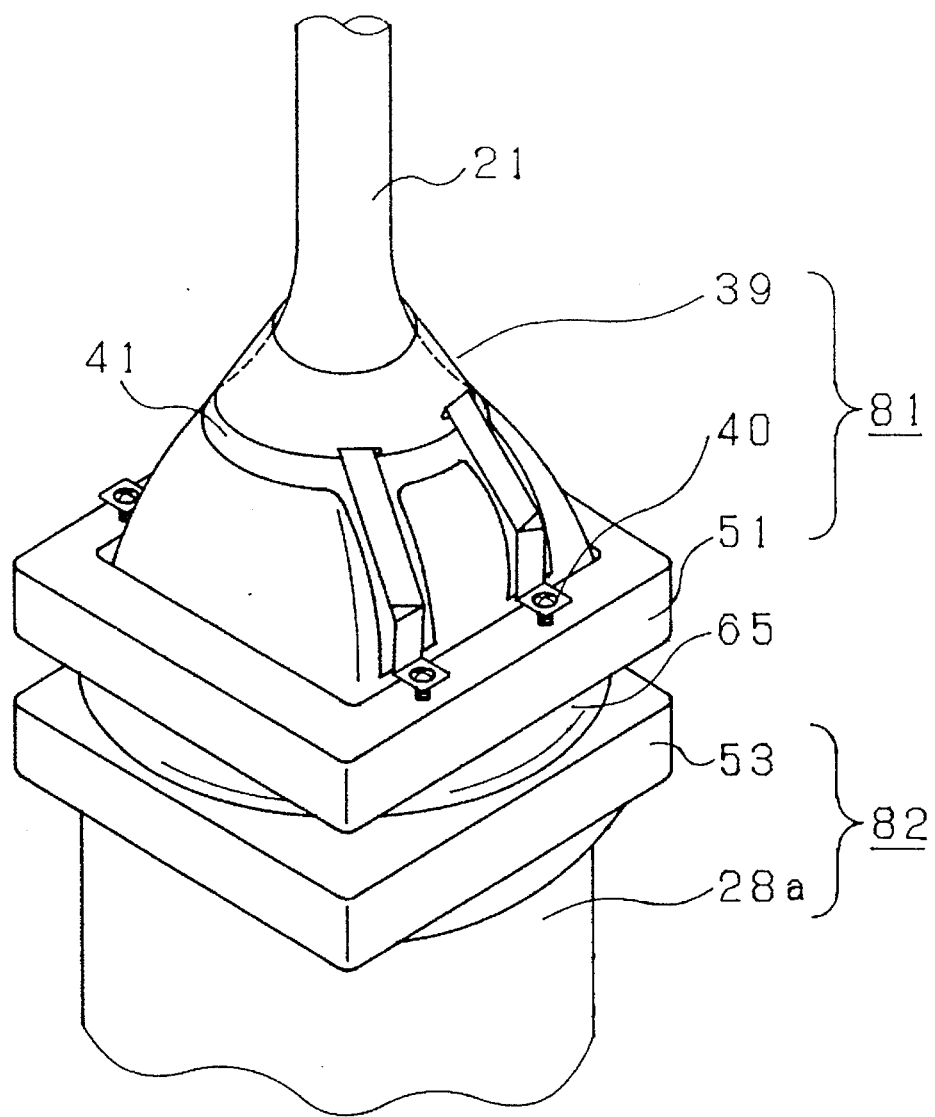
FIG. 20 is a cross sectional drawing illustrative of the third embodiment of one of the projection units composing the projection type display of the fifth invention.

FIG. 20 is a cross sectional drawing illustrative of the third embodiment of one of the projection units composing the projection type display of the fifth invention. The CRT 21 is not mounted on the CRT frame 51 by means of the compressive force of the spring 25 via the holding plate as in the first embodiment described above. Instead, the CRT 21 is directly mounted on the CRT frame 51 by means of a band 39 and screws 40. The band 39 and the CRT 21 are separated by a rubber sheet 41 serving as a shock absorber.

In another embodiment of the invention, CRT 21x and CRT 21z for red and blue images are arranged substantially parallel to the CRT 21y for green images by using special projection lenses 28, not shown in the drawing, so that the width of the external casing 97 may be reduced.

(Sixth invention)

Figure 21:
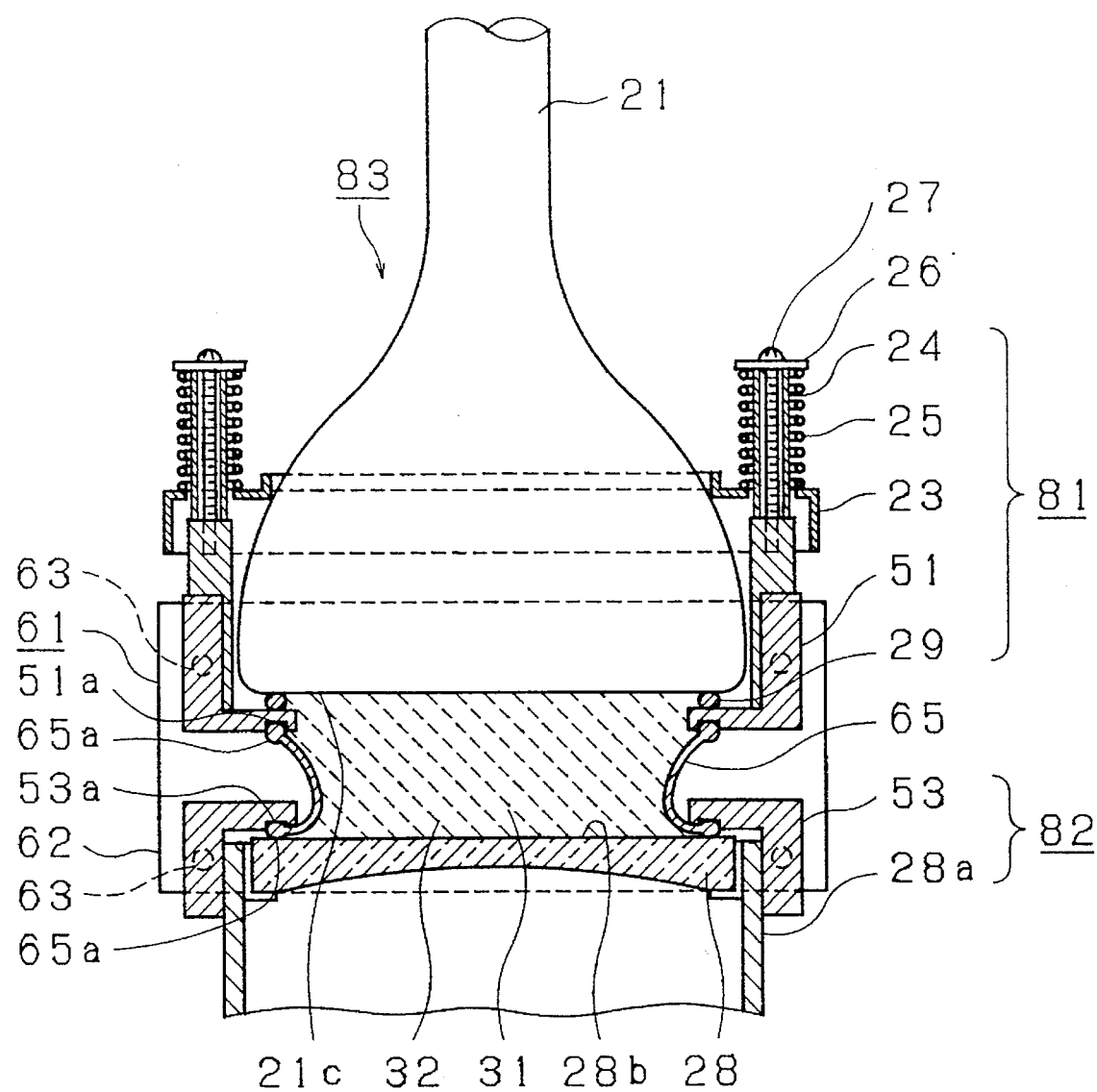
FIG. 21 is a cross sectional drawing illustrative of one of the projection units composing the projection type display of the sixth invention.
Figure 22:
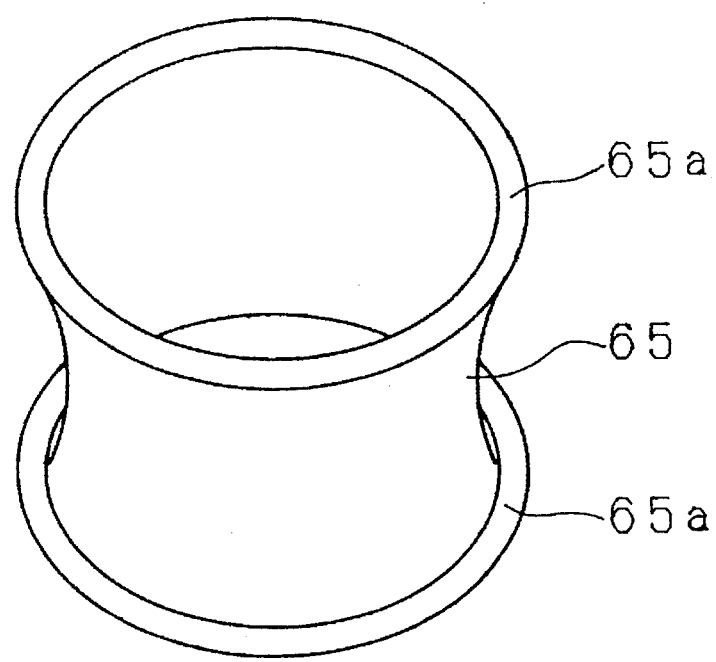
FIG. 22 is a perspective view illustrative of the packing sheet of the projection unit shown in FIG. 21.
Figure 23:
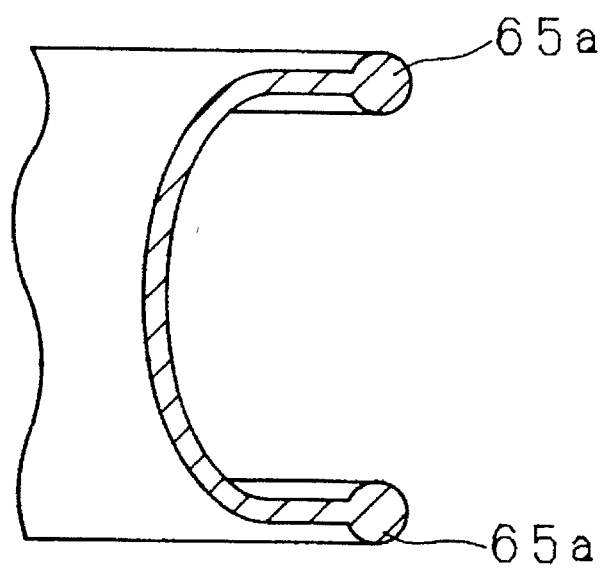
FIG. 23 is a cross sectional drawing illustrative of the packing sheet of the projection unit shown in FIG. 21.

FIG. 21 is a cross sectional drawing illustrative of one of the projection units composing the projection type display apparatus of the sixth invention. FIG. 22 is a perspective view illustrative of the packing sheet of this example, and FIG. 23 is a cross sectional drawing thereof. In these drawings, components identical or corresponding to those of the conventional apparatuses shown in FIG. 15 are identified with the same symbols and description thereof will not be given.

The CRT 21 is mounted on the CRT frame 51 via the CRT packing 29, and the spring 25 exerts compressive force to the holding plate 23 thereby to keep the CRT 21 and the CRT frame 51 in liquid-tight assembly, thus constituting the CRT block 81. The CRT frame 51 is provided with an annular groove 51a at the periphery of the opening on the projection lens 28 side, and the lens frame 53 is provided with an annular groove 53a at the periphery of the opening on the projection lens 28 side. The packing sheet 65 made of formed rubber or the like is provided with a bulging part 65a integrally on either end, and the bulging parts 65a are fitted into the annular groove 51a of the CRT frame 51 and the annular groove 53a of the lens frame 53 to fit in liquid-tight condition. The packing sheet 65 is installed with a flexure being given thereto to allow adjustment of the relative angle and distance of the blocks 81, 82.

After the CRT block 81 and the lens block 82 are sustained with the predetermined angle and distance, the space 31 formed by the CRT block 81, the lens block 82, and packing sheet 65 is filled with the coolant liquid 32.

Three projection units 83 thus constituted are installed at the specified angles to serve for red, green and blue images, to provide a projection type display apparatus.

Now the operation will be described below. The principle of image projection in the apparatus of the sixth invention is the same as that of the conventional apparatus, and the description thereof will be omitted. It is also the same as the prior art in that three projection units 83, each comprising the CRT block 81, the lens block 82 and the holding member 61, are used for red, green and blue images, and optical axes of the projection units 83 are inclined to each other so that the images generated by the three CRTs 21 converge at one point on the screen 99, with the relative angle and distance of the CRT 21 and the projection lens 28 of each unit differ from those of other units.

The apparatus of the sixth invention is made by constituting three units for red, green and blue images within the projection apparatus by using the CRT frame 51 and the lens frame 53 in common, and changes in the projection optics system such as the screen size, projection distance and projection angle are accommodated within the same apparatus.

When the coolant liquid 32 expands due to heating of the CRT 21 during operation, the packing sheet 65 swells toward the outside to increase the capacity and accommodate the increased volume, thereby keeping the pressure of the coolant liquid 32 constant. The bulging parts 65a formed on the ends of the packing sheet 65 are fitted into the annular grooves 51a, 53a of the frames 51, 53 to improve the reliability in positioning and sealing and reduces the possibility of liquid leakage.

Figure 24:
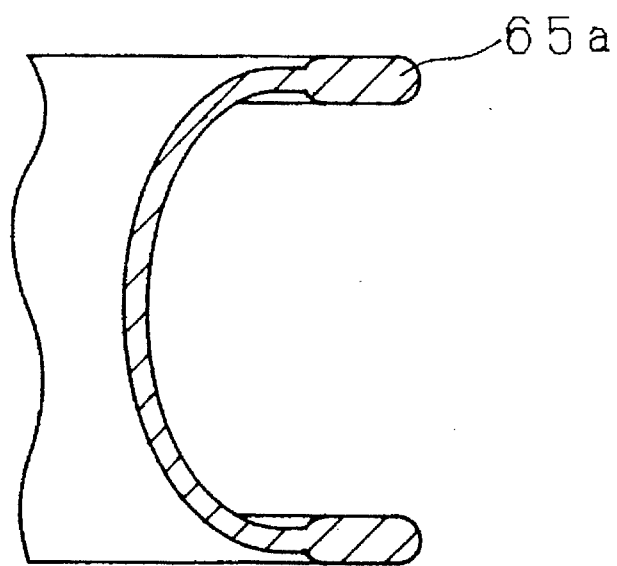
FIG. 24 is a cross sectional drawing illustrative of a variation of the packing sheet shown in FIG. 22, 23.

FIG. 24 is a cross sectional drawing illustrative of a variation of the packing sheet shown in FIG. 22, FIG. 23, wherein the bulging parts 53a integrally formed on the ends of the packing sheet 53 are made in oval shape to improve the liquid-tight contact.

Similar effect can be obtained by providing the CRT frame 51 with annular groove on the periphery of the opening on the CRT side and fitting the CRT packing 29 in the annular groove to install the CRT 21 and the CRT frame 51 liquid-tightly. Further, relative positions of the CRT 21 and the projection lens 28 may be reversed and the lens packing 30 may be used instead of the CRT packing 29.

(Seventh invention)

Figure 25:
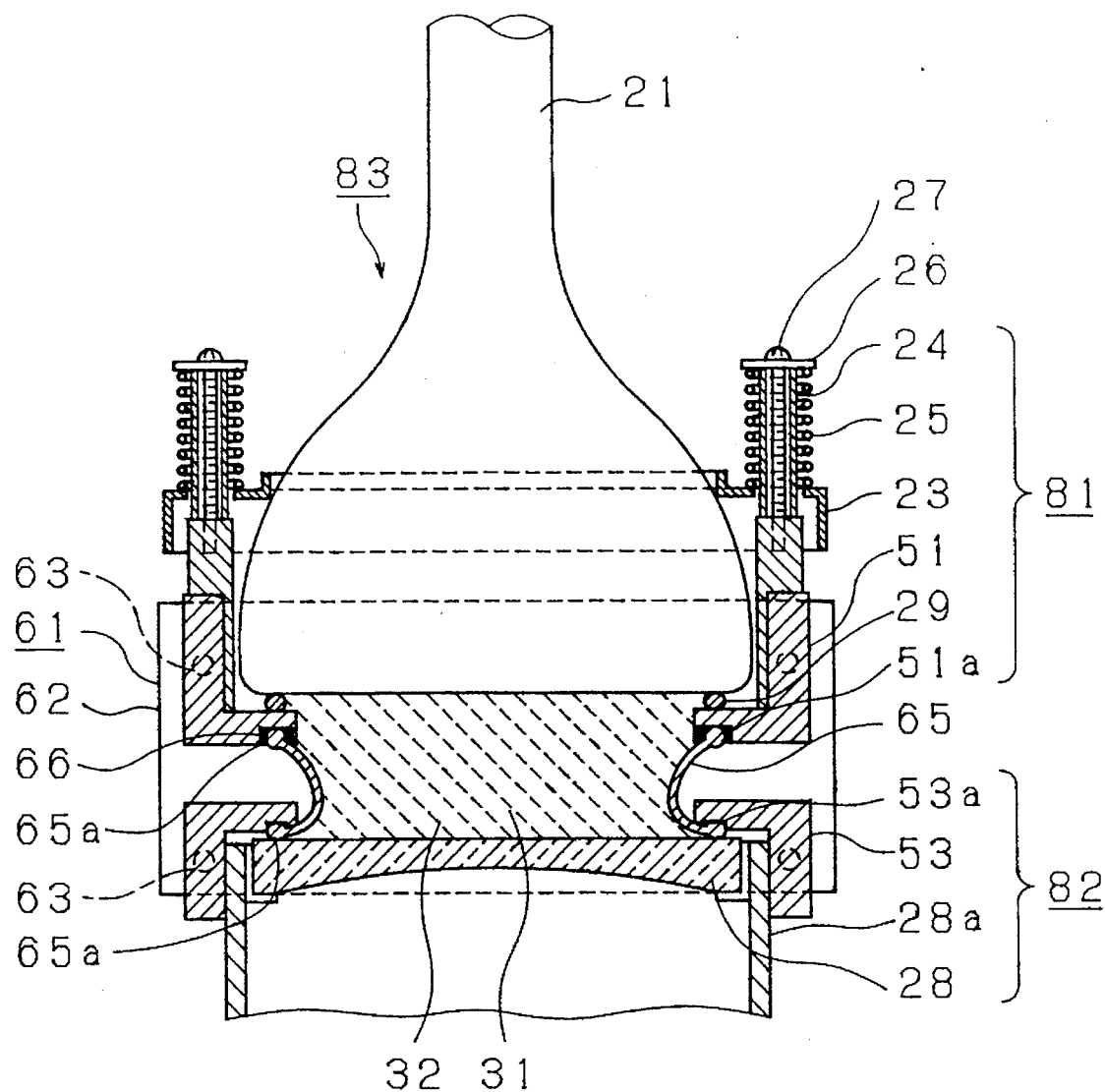
FIG. 25 is a cross sectional drawing illustrative of one of the projection units composing the projection type display of the seventh invention.

FIG. 25 is a cross sectional drawing illustrative of one of the projection units composing the projection type display apparatus of the seventh invention. In FIG. 25, components identical with or corresponding to those of the conventional apparatuses shown in FIG. 21 are identified with the same symbols and description thereof will not be given.

The CRT 21 is mounted on the CRT frame 51 via the CRT packing 29, and the spring 25 exerts compressive force to the holding plate 23 thereby to keep the CRT 21 and the CRT frame 51 in liquid-tight assembly, thus constituting the CRT block 81. The CRT frame 51 is provided with the annular groove 51a at the periphery of the opening on the projection lens 28 side, and the lens frame 53 is provided with the annular groove 53a at the periphery of the opening on the projection lens 28 side. The packing sheet 65 made of formed rubber or the like is provided with the bulging part 65a integrally on either end, and the bulging parts 65a are fitted into the annular groove 51a of the CRT frame 51 and the annular groove 53a of the lens frame 53 liquid-tightly. The packing sheet 65 is installed having a flexure to allow adjustment of the relative angle and distance of the blocks 81, 82, and are fixed by means of an adhesive 66 when the bulging parts 65a of the packing sheet 65 are fitted into the annular groove 51a of the CRT frame 51.

After the CRT block 81 and the lens block 82 are sustained with the predetermined angle and distance, the space 31 formed by the CRT block 81, the lens block 82, and packing sheet is filled with the coolant liquid 32.

Three projection units 83 thus constituted are installed at the specified angles to serve for red, green and blue, to provide a projection type display apparatus.

Now the operation will be described below. The principle of image projection in the apparatus of the seventh invention is the same as that of the conventional apparatus, and the description thereof will be omitted. It is also the same as the prior art, in that three projection units 83, each comprising the CRT block 81, the lens block 82 and the holding member 61, are used for red, green and blue, and optical axes of the projection units 83 are inclined to each other so that the images generated by the three CRTs 21 converge at one point on the screen 99, with the relative angle and distance of the CRT 21 and the projection lens 28 of each unit differ from those of other units.

The apparatus of the seventh invention is made by constituting three units for red, green and blue within the projection apparatus by using the common CRT frame 51 and the lens frame 53, and changes in the projection optics system such as the screen size, projection distance and projection angle are accommodated within the same apparatus.

When the coolant liquid 32 expands due to heating of the CRT 21 during operation, the packing sheet 65 swells toward the outside to increase the capacity and accommodate the increased volume, thereby keeping the pressure of the coolant liquid 32 constant. The bulging parts 65a formed on the ends of the packing sheet 65 are fitted into the annular grooves 51a, 53a of the frames 51, 53 to improve the reliability in positioning and sealing and reduces the possibility of liquid leakage by improving assembly efficiency, because the CRT frame 51 and the packing sheet 65 are bonded with the adhesive 66.

(Eighth invention)

Figure 26:
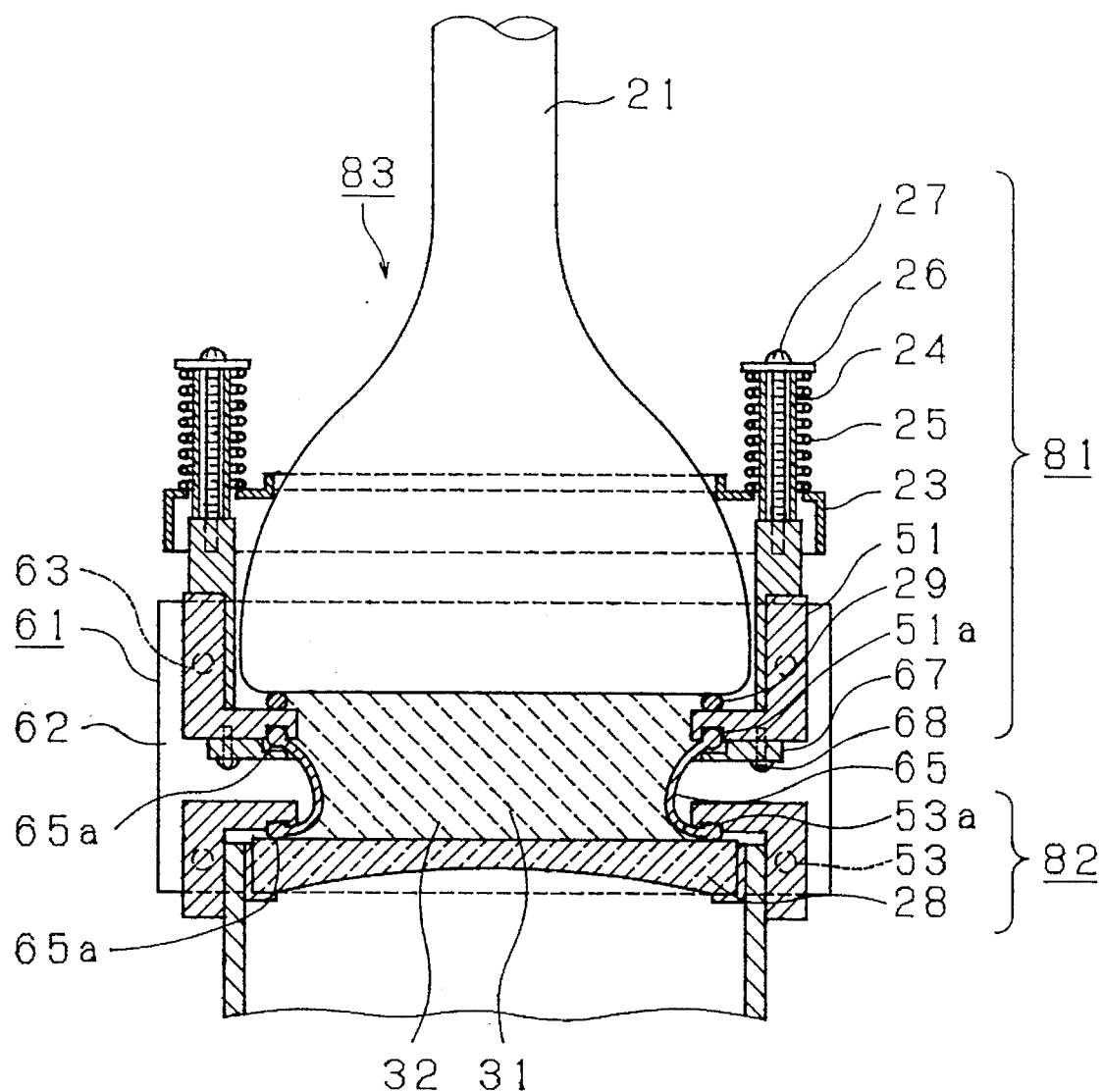
FIG. 26 is a cross sectional drawing illustrative of the first embodiment of one of the projection units composing the projection type display of the eighth invention.

FIG. 26 is a cross sectional drawing illustrative of the first embodiment of one of the projection units composing the projection type display apparatus of the eighth invention. In FIG. 26, components identical or corresponding to those of the conventional apparatuses shown in FIG. 21 are identified with the same symbols and description thereof will not be given.

The CRT 21 is mounted on the CRT frame 51 via the CRT packing 29, and the spring 25 exerts compressive force to the holding plate 23 thereby to keep the CRT 21 and the CRT frame 51 in liquid-tight assembly, thus constituting the CRT block 81. The CRT frame 51 is provided with the annular groove 51a at the periphery of the opening on the projection lens 28 side, and the lens frame 53 is provided with an annular groove 53a at the periphery of the opening on the projection lens 28 side. The packing sheet 65 made of formed rubber or the like is provided with the bulging part 65a integrally on either ends and the bulging parts 65a are fitted into the annular groove 51a of the CRT frame 51 and the annular groove 53a of the lens frame 53 to fit in liquid-tight condition. The packing sheet 65 is installed having a flexure to allow adjustment of the relative angle and distance of the blocks 81, 82. After fitting the bulging parts 65a of the packing sheet 65 into the annular groove 51a of the CRT frame 51, an annular plate 67 is secured on the CRT frame 51 with screws 68 to press the bulging parts 65a thereby to obtain liquid-tight condition.

The CRT block 81 and the lens block 82 are held in the specified angle and distance by the holding section 61, then the space 31 formed by the CRT block 81, the lens block 82 and the packing sheet 65 is filled with the coolant liquid 32.

Three projection units 83 thus constituted are installed at the specified angles to serve for red, green and blue, to provide a projection type display apparatus.

Now the operation will be described below. The principle of image projection in the apparatus of the eighth invention is the same as that of the conventional apparatus, and the description thereof will be omitted. It is also the same as the prior art, in that three projection units 83, each comprising the CRT block 81, the lens block 82 and the holding member 61, are used for red, green and blue, and optical axes of the projection units 83 are inclined to each other so that the images generated by the three CRTs 21 converge at one point on the screen 99, with the relative angle and distance of the CRT 21 and the projection lens 28 of each unit differ from those of other units.

The apparatus of the eighth invention is made by constituting three units for red, green and blue within the projection apparatus by using the common CRT frame 51 and the lens frame 53, and changes in the projection optics system such as the screen size, projection distance and projection angle are accommodated within the same apparatus.

When the coolant liquid 32 expands due to heating of the CRT 21 during operation, the packing sheet 65 swells toward the outside to increase the capacity and accommodate the increased volume, thereby keeping the pressure of the coolant liquid 32 constant. The bulging parts 65a formed on the ends of the packing sheet 65 are fitted into the annular grooves 51a, 53a of the frames 51, 53 to improve the reliability in positioning and sealing and reduces the possibility of liquid leakage by improving assembly efficiency, because the CRT frame 51 and the packing sheet 65 are secured by means of the annular plate 67.

Figure 27:
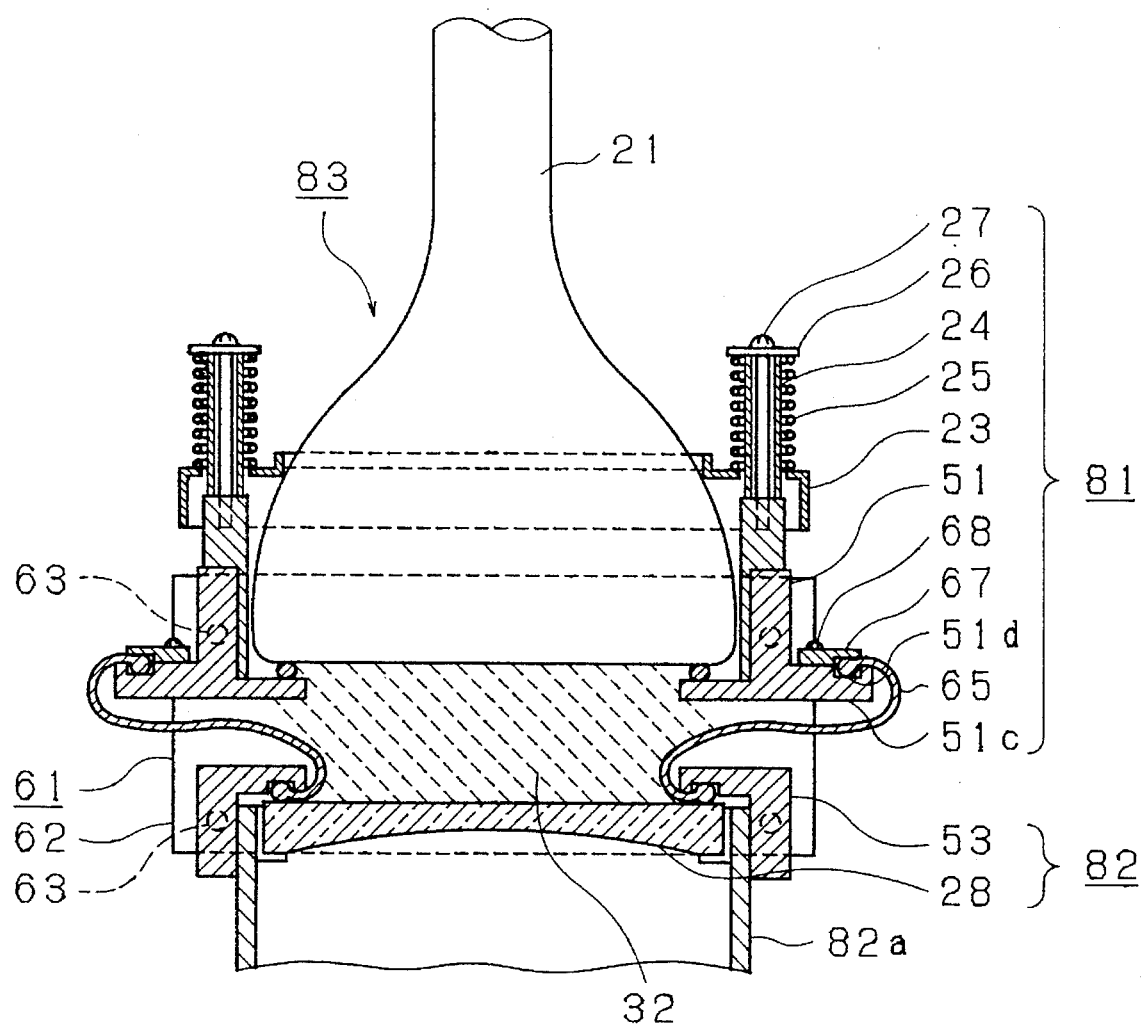
FIG. 27 is a cross sectional drawing illustrative of the second embodiment of one of the projection units composing the projection type display of the eighth invention.

FIG. 27 is a cross sectional drawing illustrative of the second embodiment of one of the projection units composing the projection type display apparatus of the eighth invention. A circumferential flange 51c of the CRT frame 51 is provided with an annular groove 51d on the CRT 21 side. The packing sheet 65 is fitted by wrapping around the flange 51c and is fastened by the annular plate 67 by means of screws 68 which are set from the CRT 21 side, thereby providing similar effect as described before.

(Ninth invention)

Figure 28:
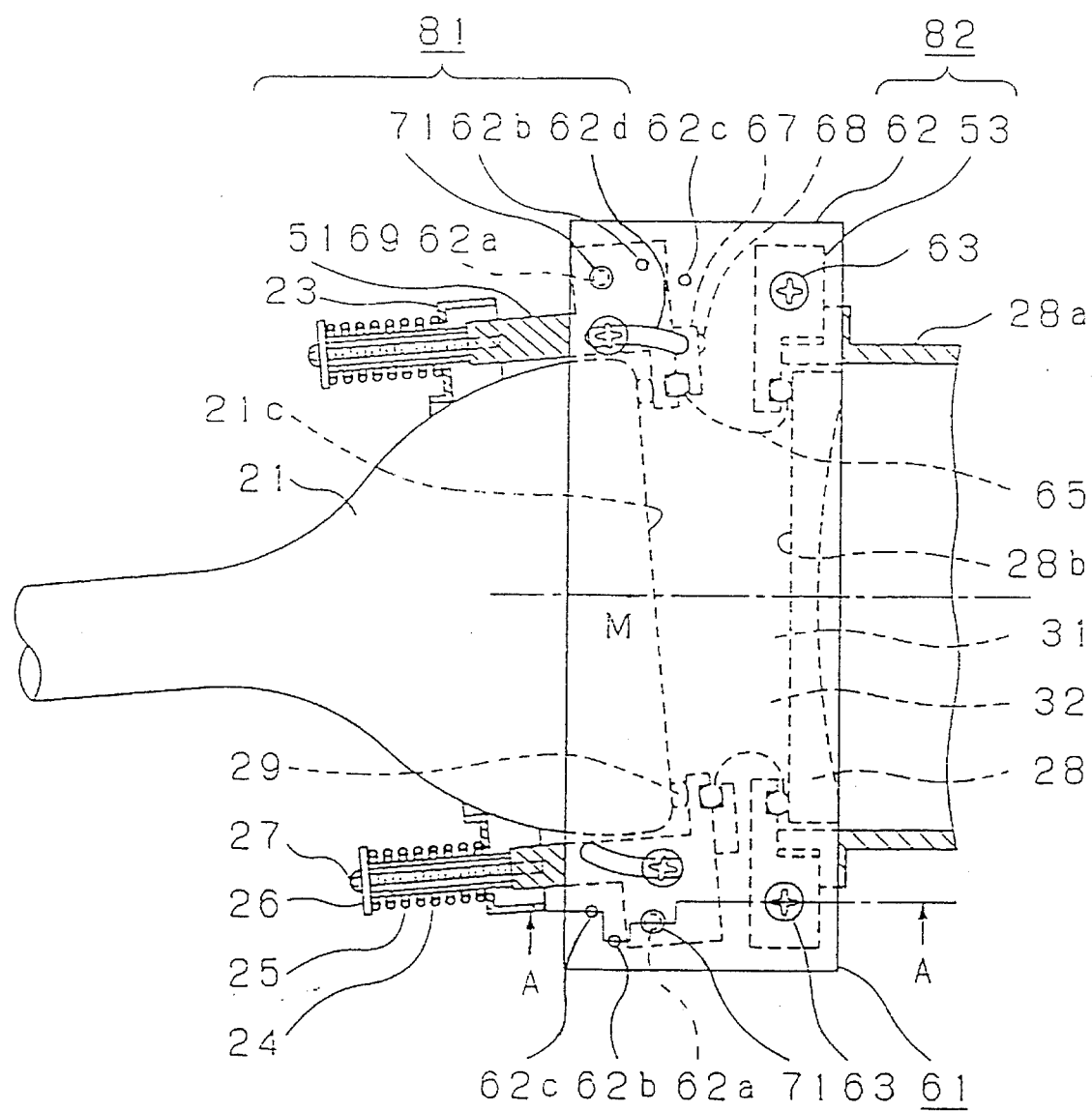
FIG. 28 is a plan view illustrative of one of the projection units composing the projection type display of the ninth invention.
Figure 29:
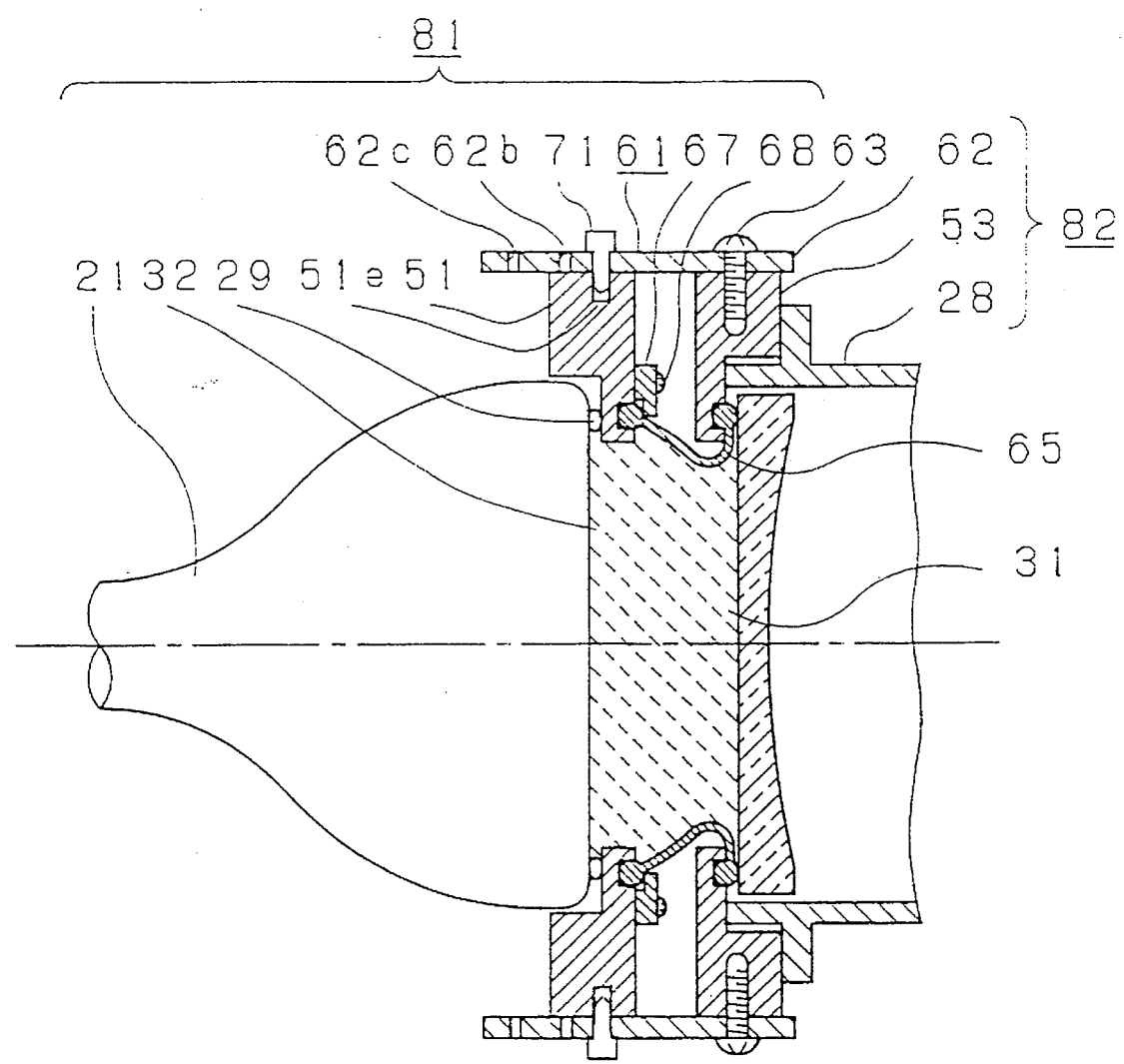
FIG. 29 is a cross sectional drawing of FIG. 28 viewed in the direction of A—A line.

FIG. 28 is a plan view illustrative of one of the projection units composing the projection type display apparatus of the ninth invention, and FIG. 29 shows a cross sectional drawing in view of A—A direction of FIG. 28. In these drawings, components identical or corresponding to those of the conventional apparatuses shown in FIG. 26 are identified with the same symbols and description thereof will not be given.

The CRT 21 is mounted on the CRT frame 51 via the CRT packing 29, and the spring 25 exerts compressive force to the holding plate 23 thereby to keep the CRT 21 and the CRT frame 51 in liquid-tight assembly, this constituting the CRT block 81. The lens block 82 is constituted by interposing an end of the packing sheet 65, made of formed rubber or the like, between the lens frame 53 and the projection lens 28 and being installed liquid-tightly. Another end of the packing sheet 65 is installed to the CRT frame 51 liquid-tightly by means of the annular plate 67 and the screws 68 with a flexure given to the sheet to allow adjustment of the relative angle and distance of the blocks 81, 82. Thus the space 31 between the face 21c of the CRT 21 and the lens surface 28b is formed liquid-tightly and filled with the coolant liquid 32.

The CRT block 81 and the lens block 82 are mounted with the specified angle and distance in the following procedure. While the lens frame 53 is fastened on the mount plate 62 with screws 68, the CRT frame 51 is fastened via elongated holes 62d of the mount plate 62 by means of screws 69. The elongated hole 62d is made along an arc with the center located at point M which is the center of rotation of the CRT 21 with respect to the projection lens 28. The set position is determined by selecting from among the positioning holes 62a through 62c of the mount plate 62 and inserting a positioning pin 71 through the selected positioning hole into a positioning hole 51e of the CRT frame 51. Three units of the CRT block 81 and the lens block 82 thus constituted and positioned in the holding section 61 are used to provide a projection type display apparatus.

Now the operation will be described below. The principle of image projection in the apparatus of the ninth invention is the same as that of the convention apparatus, and the description thereof will be omitted. It is also the same as the prior art, in that three projection units 88, each comprising the CRT block 81, the lens block 82 and the holding member 61, are used for red, green and blue, and optical axes of the projection units 83 are inclined to each other so that the images generated by the three CRTs 21 converge at one point on the screen 99, with the relative angle and distance of the CRT 21 and the projection lens 28 of each unit differ from those of other units.

The apparatus of the ninth invention is made by constituting three units for red, green and blue within the projection apparatus by using the common CRT frame 51 and the lens frame 53, and changes in the projection optics system such as the screen size, projection distance and projection angle are accommodated within the same apparatus.

When the coolant liquid 32 expands due to heating of the CRT 21 during operation, the packing sheet 65 swells toward the outside to increase the capacity and accommodate the increased volume, thereby keeping the pressure of the coolant liquid 32 constant and reducing the possibility of liquid leakage.

The relative angle and distance of the CRT 21 with respect to the projection lens 28 are determined depending on which of the positioning holes 62a through 62c of the mount plate 62 the positioning pin 71 passes through before being inserted in the positioning hole 51e of the CRT frame 51. Therefore the relative angle of the CRT 21 and the projection lens 28 can be accurately changed even in the presence of the coolant liquid 32 filling the space.

Although the above embodiments are described as being capable of 3-step adjustment, adjustment in greater number of steps will be made possible by increasing the number of positioning holes.

(Tenth invention)

Figure 30:
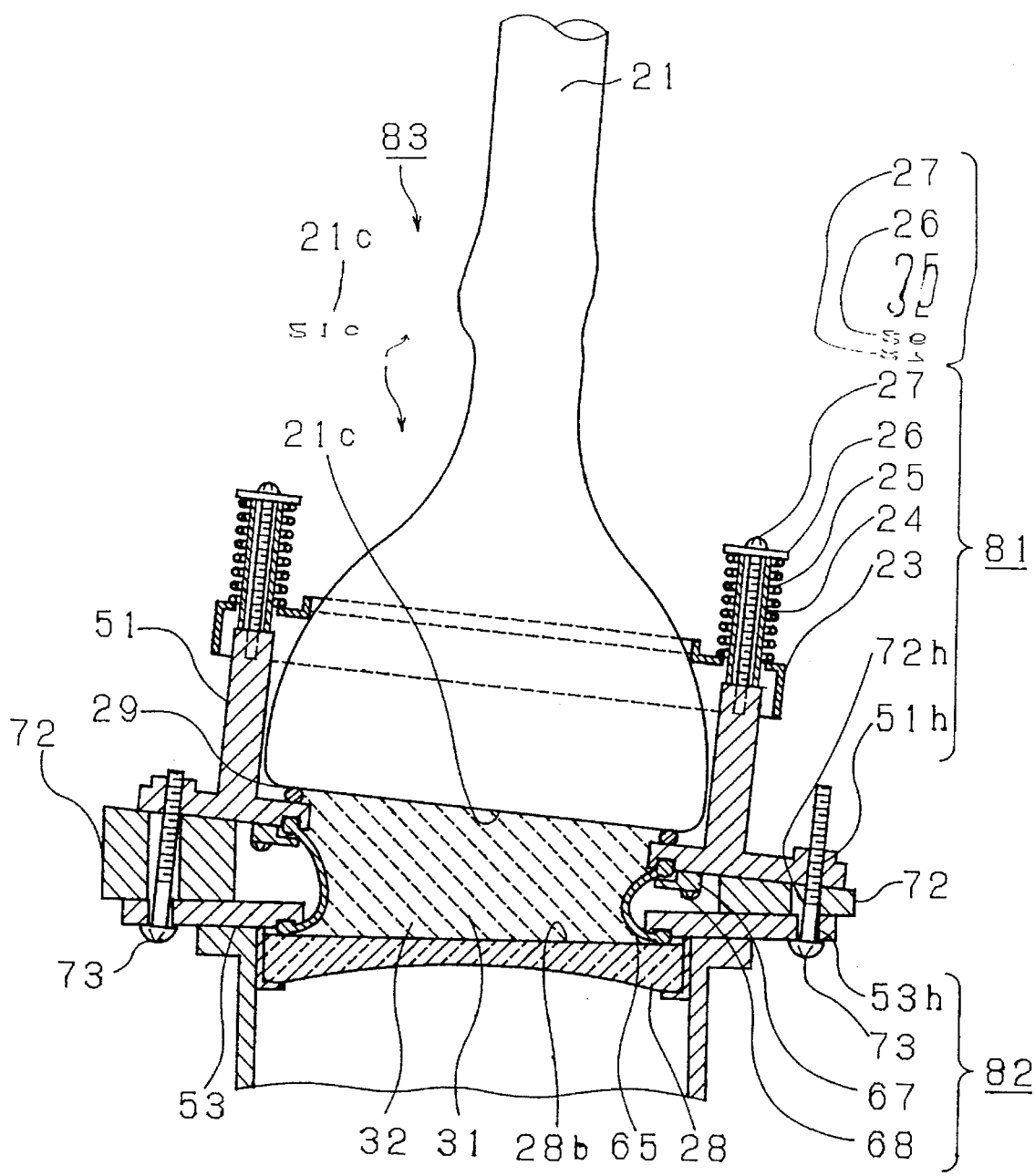
FIG. 30 is a cross sectional drawing illustrative of one of the projection units composing the projection type display of the tenth invention.

FIG. 30 is a cross sectional drawing illustrative of one of the projection units composing the projection type display apparatus of the tenth invention. In FIG. 30, components identical or corresponding to those of the conventional apparatuses shown in FIG. 26 are identified with the same symbols and description thereof will not be given. The CRT 21 is mounted on the CRT frame 51 via the CRT packing 29, and the spring 25 exerts compressive force to the holding plate 23 thereby to keep the CRT 21 and the CRT frame 51 in liquid-tight assembly, thus constituting the CRT block 81. The lens block 82 is constituted by interposing an end of the packing sheet 65, made of formed rubber or the like, between the lens frame 53 and the projection lens 28 and being installed liquid-tightly. Another end of the packing sheet 65 is attached to the CRT frame 51 liquid-tightly by means of the annular plate 67 and the screws 68, with a flexure given to the sheet to allow adjustment of the relative angle and distance of the blocks 81, 82. Thus the space 31 between the face 21c of the CRT 21 and the lens surface 28b is formed liquid-tightly and filled with the coolant liquid 32.

The CRT block 81 and the lens block 82 are mounted with the specified angle and distance in the following procedure. A spacer 72 having a specified thickness and taper is interposed between the CRT frame 51 and the lens frame 53, and screws 73 pass through holes 53h of the lens frame 53 and through holes 72h of the spacer 72 and are screwed into threaded holes 51h of the CRT frame 51.

Now the operation will be described below. The principle of image projection in the apparatus of the tenth invention is the same as that of the conventional apparatus, and the description thereof will be omitted. It is also the same as the prior art, in that three projection units 83, each comprising the CRT block 81 and the lens block 82, are used for forming red, green and blue images, and optical axes of the projection units 83 are inclined to each other so that the images generated by the three CRTs 21 converge at one point on the screen 99, with the relative angle and distance of the CRT 21 and the projection lens 28 of each unit differ from those of other units.

The apparatus of the tenth invention is made by constituting three units for red, green and blue images within the projection apparatus by using the CRT frame 51 and the lens frame 53 in common, and changes in the projection optics system such as the screen size, projection distance and projection angle are accommodated within the same apparatus.

When the coolant liquid 32 expands due to heating of the CRT 21 during operation, the packing sheet 65 swells toward the outside to increase the capacity and accommodate the increased volume, thereby keeping the pressure of the coolant liquid 32 constant and reducing the possibility of liquid leakage.

The relative angle and distance of the CRT 21 with respect to the projection lens 28 can be accurately controlled by changing the thickness and inclination of the spacer 72 which is interposed between the CRT frame 51 and the lens frame 53.

(Eleventh invention)

Figure 31:
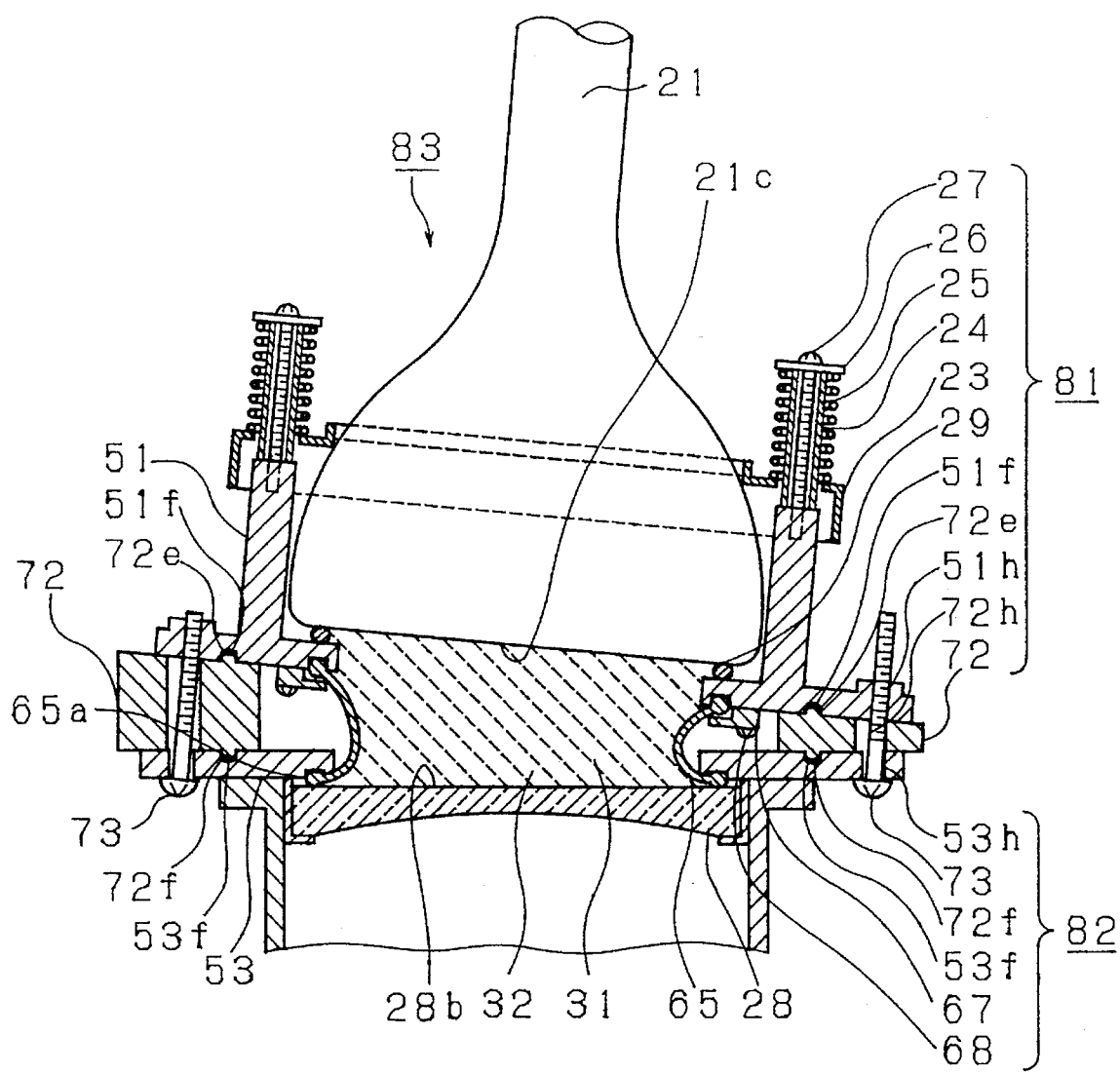
FIG. 31 is a cross sectional drawing illustrative of the first embodiment of one of the projection units composing the projection type display of the eleventh invention.

FIG. 31 is a cross sectional drawing illustrative of the first embodiment of one of the projection units composing the projection type display apparatus of the eleventh invention. In FIG. 31, components identical or corresponding to those of the conventional apparatuses shown in FIG. 26 are identified with the same symbols and the description thereof will not be given.

The CRT 21 is mounted on the CRT frame 51 via the CRT packing 29, and the spring 25 exerts compressive force to the holding plate 23 thereby to keep the CRT 21 and the CRT frame 51 in liquid-tight assembly, thus constituting the CRT block 81. The lens block 82 is constituted by interposing an end of the packing sheet 65, made of formed rubber or the like, between the lens frame 53 and the projection lens 28 and being installed liquid-tightly. Another end of the packing sheet 65 is attached to the CRT frame 51 liquid-tightly by means of the annular plate 67 and the screws 68, with a flexure given to the sheet to allow adjustment of the relative angle and distance of the blocks 81, 82. Thus the space 31 between the face 21c of the CRT 21 and the lens surface 28b is formed liquid-tightly and filled with the coolant liquid 32.

The spacer 72 interposed between the CRT block 81 and the lens block 82 is provided with semi-spherical bulging parts 72e, 72f at specified positions. The CRT frame 51 and the lens frame 53 are also provided with recesses 51f, 53f at specified positions thereof. The CRT frame 51 and the lens frame 53 are positioned by fitting the semi-spherical bulging parts 72e, 72f into the recesses 51f, 53f respectively.

Now the operation will be described below. The principle of image projection in the apparatus of the eleventh invention is the same as that of the conventional apparatus, and the description thereof will be omitted. It is also the same as the prior art, in that three projection units 83, each comprising the CRT block 81 and the lens block 82, are used for forming red, green and blue images, and optical axes of the projection units 83 are inclined to each other so that the images generated by the three CRTs 21 converge at one point on the screen 99, with the relative angle and distance of the CRT 21 and the projection lens 28 of each unit differ from those of other units.

The apparatus of the eleventh invention is made by constituting three units for red, green and blue images within the projection apparatus by using the CRT frame 51 and the lens frame 53 in common, and changes in the projection optics system such as the screen size, projection distance and projection angle are accommodated within the same apparatus.

When the coolant liquid 32 expands due to heating of the CRT 21 during operation, the packing sheet 65 swells toward the outside to increase the capacity and accommodate the increased volume, thereby keeping the pressure of the coolant liquid 32 constant and reducing the possibility of liquid leakage.

While the relative angle and distance of the CRT 21 with respect to the projection lens 28 are determined by means of the spacer 72 which is interposed between the CRT frame 51 and the lens frame 53, positioning of the spacer 72 is done by fitting the semi-spherical bulging parts 72e, 72f of the spacer 72 into the mating recesses 51f, 53f. By changing the thickness and inclination of the spacer 72, the relative angle and distance can be controlled accurately.

Figure 32:
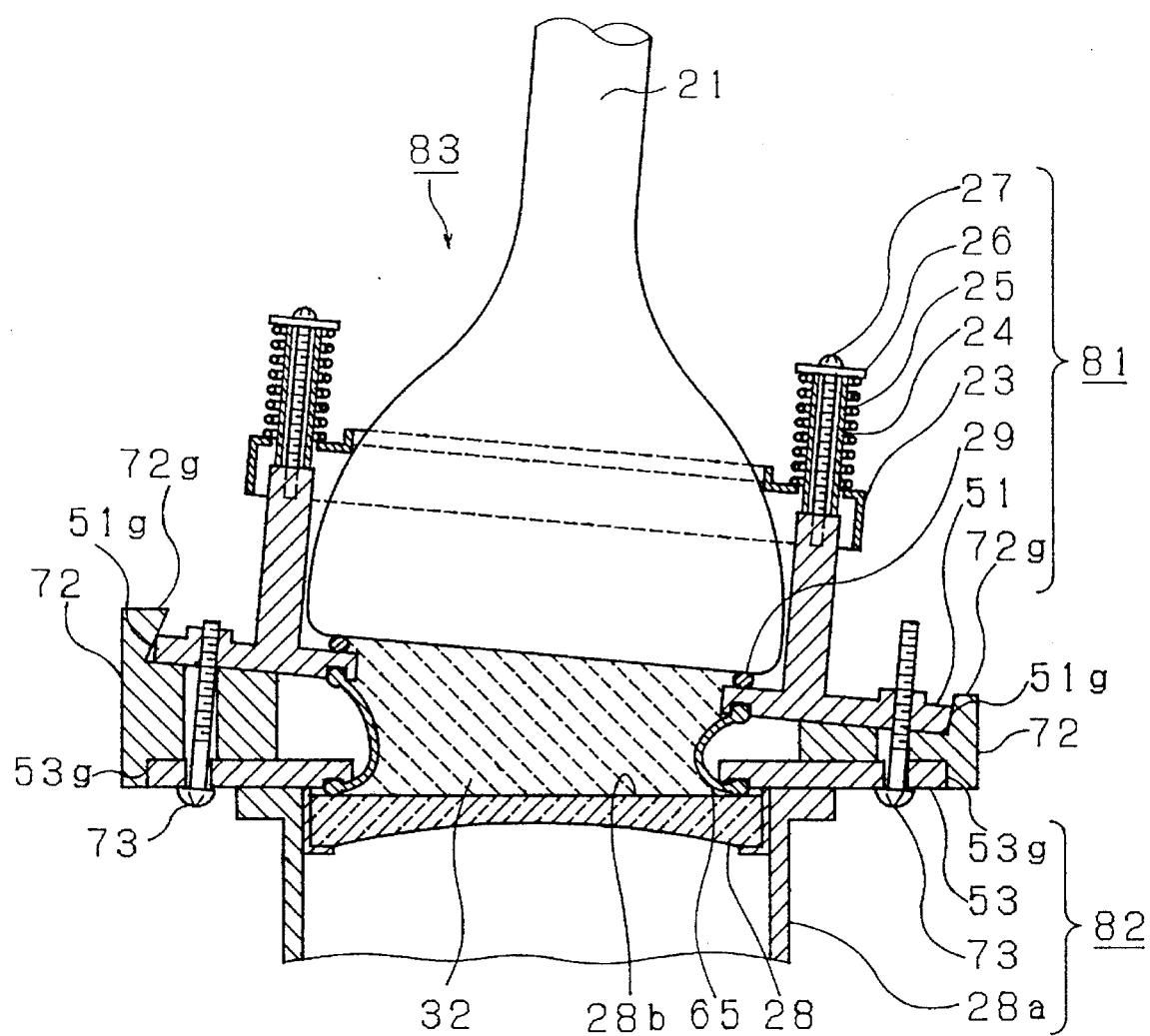
FIG. 32 is a cross sectional drawing illustrative of the second embodiment of one of the projection units composing the projection type display of the eleventh invention.

FIG. 32 is a cross sectional drawing illustrative of the second embodiment of one of the projection units composing the projection type display of the eleventh invention. The spacer 72 is positioned by bringing an outer flange section 72g of the spacer 72 which is set between the CRT block 81 and the lens block 82 into contact with circumferential walls 51g, 53g of the CRT frame 51 and the lens frame 53.

(Twelfth invention)

Figure 33:
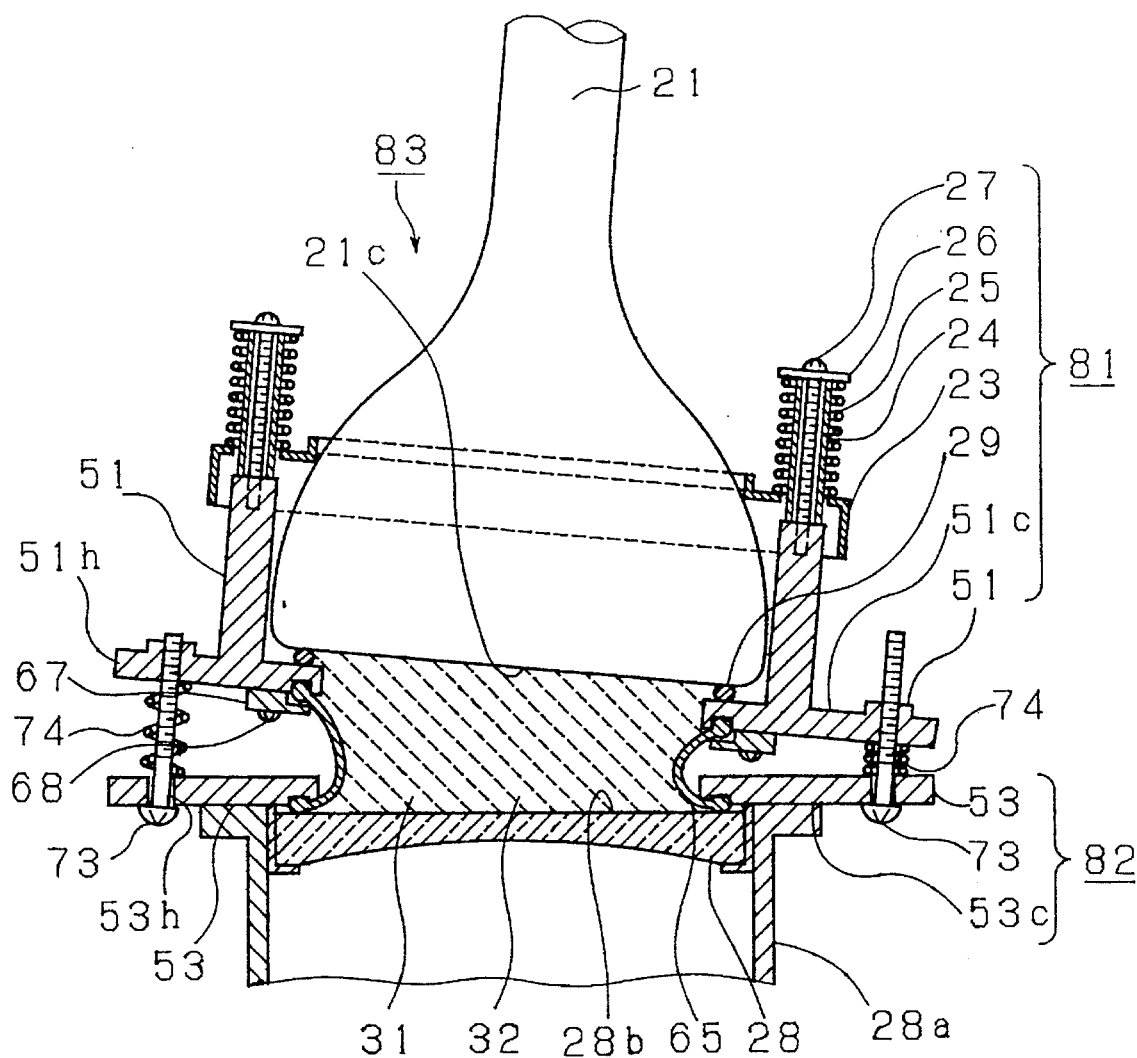
FIG. 33 is a cross sectional drawing illustrative of one of the projection units composing the projection type display of the twelfth invention.

FIG. 33 is a cross sectional drawing illustrative of one of the projection units composing the projection type display apparatus of the twelfth invention. In FIG. 33, components identical or corresponding to those shown in FIG. 30 are identified with the same symbols and the description thereof will not be given.

The CRT 21 is mounted on the CRT frame 51 via the CRT packing 29, and the spring 25 exerts compressive force to the holding plate 23 thereby to keep the CRT 21 and the CRT frame 51 in liquid-tight assembly, thus constituting the CRT block 81. The lens block 82 is constituted by interposing an end of the packing sheet 65, made of formed rubber or the like, between the lens frame 53 and the projection lens 28 and being installed liquid-tightly. Another end of the packing sheet 65 is attached to the CRT frame 51 liquid-tightly by means of the annular plate 67 and the screws 68, with a flexure being given to the sheet to allow adjustment of the relative angle and distance of the blocks 81, 82. Thus the space 31 between the face 21c of the CRT 21 and the lens surface 28b is formed liquid-tightly and filled with the coolant liquid 32.

Relative angle and distance of the CRT block 81 and the lens block 82 are changed in the following procedure. A compression spring 74 is interposed between the outer flange sections 51c, 53c of the CRT frame 51 and the lens frame 53, with both blocks being fastened with screws 73.

Now the operation will be described below. The principle of image projection in the apparatus of the twelfth invention is the same as that of the convention apparatus, and the description thereof will be omitted. It is also the same as the prior art, in that three projection units 83, each comprising the CRT block 81, the lens block 82 and the holding member 61, are used for forming red, green and blue images, and optical axes of the projection units 83 are inclined to each other so that the images generated by the three CRTs 21 converge at one point on the screen 99, with the relative angle and distance of the CRT 21 and the projection lens 28 of each unit differ from those of other units.

The apparatus of the twelfth invention is made by constituting three units for red, green and blue images within the projection apparatus by using the CRT frame 51 and the lens frame 53 in common, and changes in the projection optics system such as the screen size, projection distance and projection angle are accommodated within the same apparatus.

When the coolant liquid 32 expands due to heating of the CRT 21 during operation, the packing sheet 65 swells toward the outside to increase the capacity and accommodate the increased volume, thereby keeping the pressure of the coolant liquid 32 constant and reducing the possibility of liquid leakage.

The relative angle and distance of the CRT 21 with respect to the projection lens 28 can be freely set by turning the screw 73 which fastens the CRT frame 51 and the lens frame 53. Namely, loosening the screw 73 causes the compression spring 74 to force both frames separated wider, and tightening the screw 73 makes the space between both flanges narrower. The screw 73 and the compression spring 74 regulate both frames 51, 53 thereby to determine their positions.

The positioning mechanism for the CRT block 81 and the lens block 82 in the twelfth invention may also combine, for example, the constitution of the apparatus of the ninth invention.

(Thirteenth invention)

Figure 34:
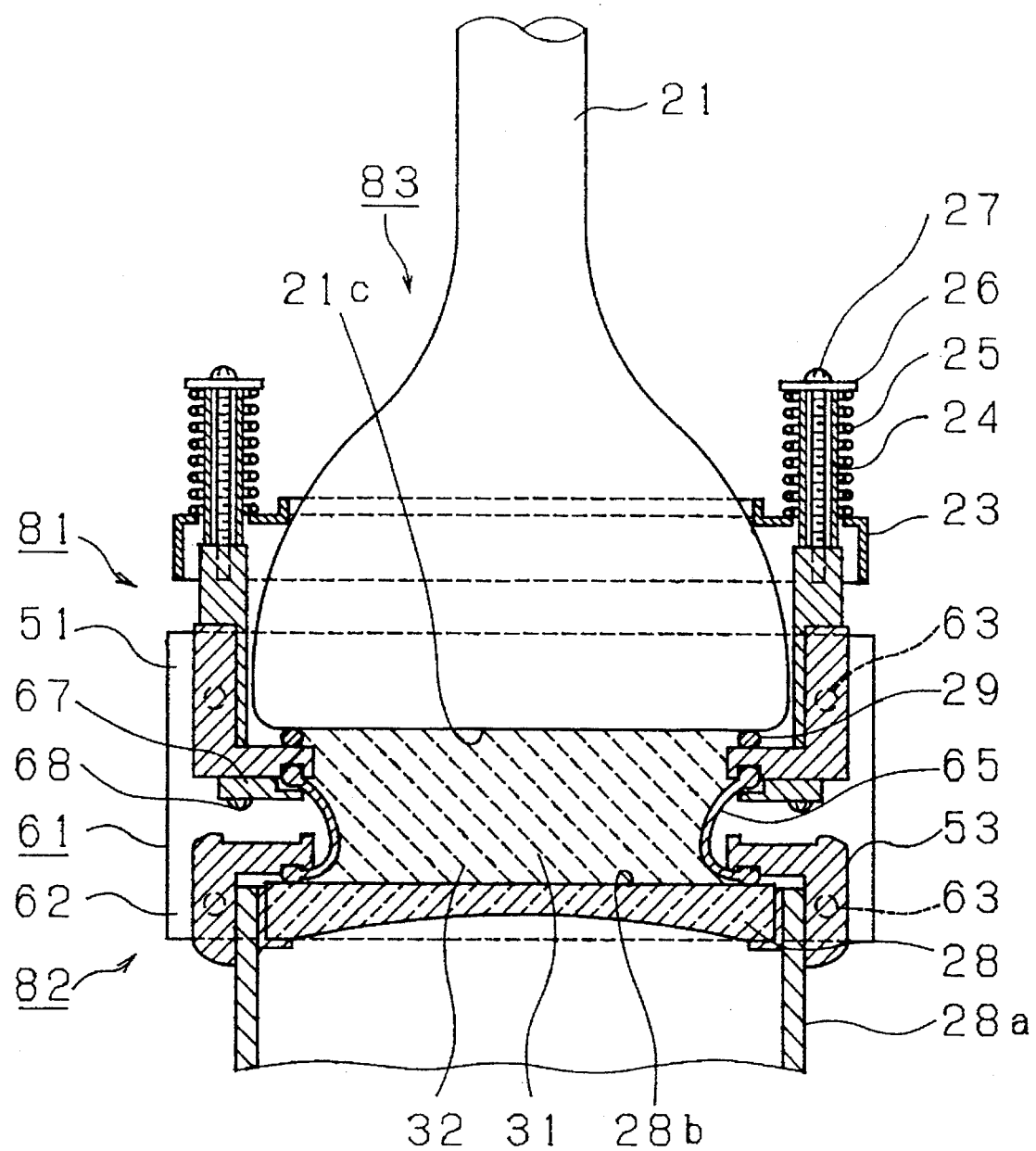
FIG. 34 is a cross sectional drawing illustrative of one of the projection units composing the projection type display of the thirteenth invention.

FIG. 34 is a cross sectional drawing illustrative of one of the projection units composing the projection type display apparatus of the thirteenth invention. In FIG. 34, components identical with or corresponding to those shown in FIG. 26 are identified with the same symbols and the description thereof will not be given.

The CRT 21 is mounted on the CRT frame 51 via the CRT packing 29, and the spring 25 exerts compressive force to the holding plate 23 thereby to keep the CRT 21 and the CRT frame 51 in liquid-tight assembly, thus constituting the CRT block 81. The lens block 82 is constituted by interposing an end of the packing sheet 65, made of formed rubber or the like, between the lens frame 53 and the projection lens 28 and being installed liquid-tightly. Another end of the packing sheet 65 is attached to the CRT frame 51 liquid-tightly by means of the annular plate 67 and the screws 68, with a flexure being given to the sheet to allow adjustment of the relative angle and distance of the blocks 81, 82. Thus the space 31 between the face 21c of the CRT 21 and the lens surface 28b is formed liquid-tightly and filled with the coolant liquid 32.

While the CRT frame 51 is made of formed aluminum which is chemically stable because it makes contact with the coolant liquid 32 to dissipate the heat generated by he CRT 21, the lens frame 53 is made of formed plastic which is light-weight and low-cost because it is covered by the packing sheet 65.

The operation of this apparatus is the same as that of the apparatus of the sixth invention, and the description thereof will be omitted.

(Fourteenth invention)

Figure 35:
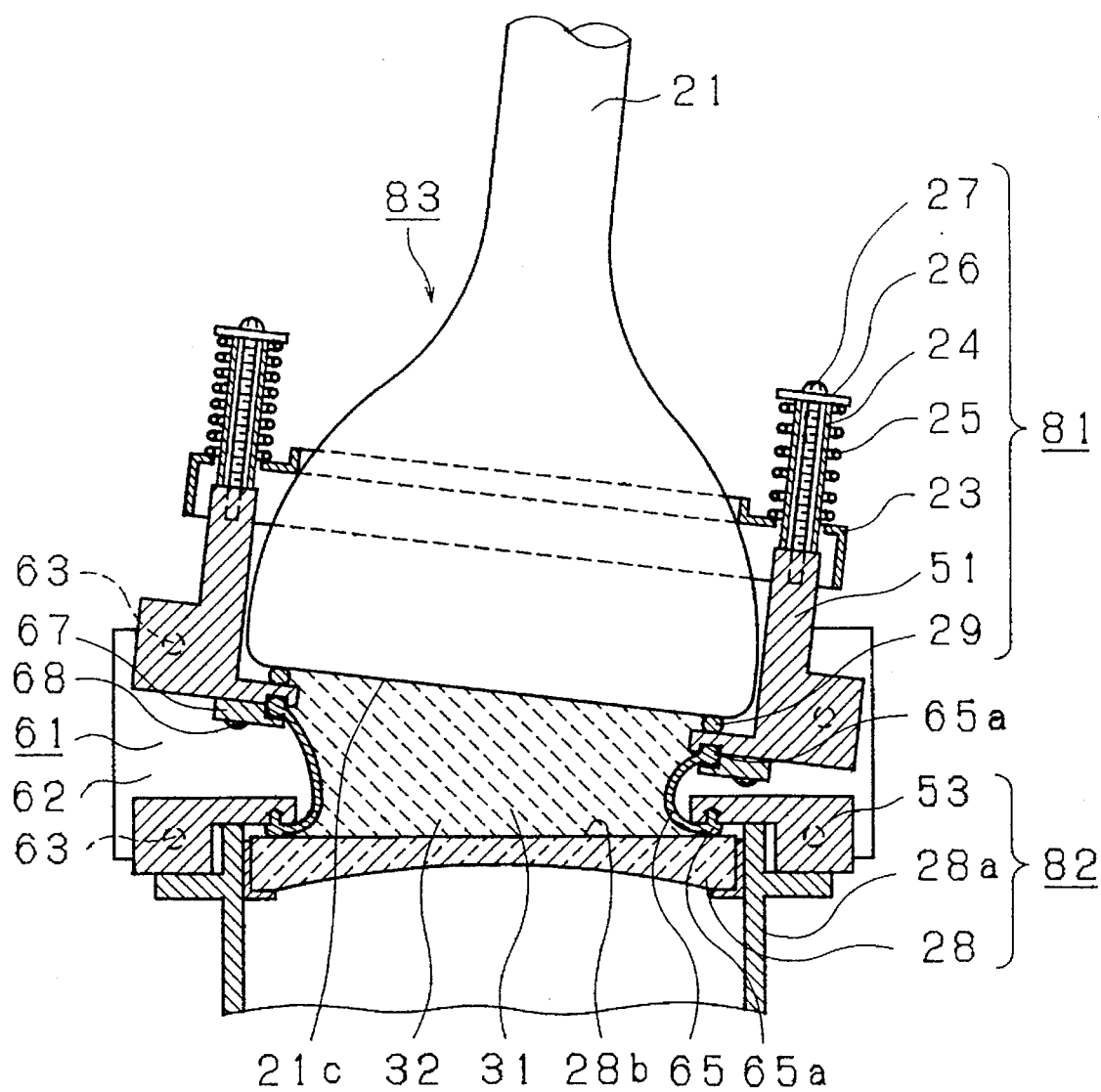
FIG. 35 is a cross sectional drawing illustrative of one of the projection units composing the projection type display of the fourteenth invention.

FIG. 35 is a cross sectional drawing illustrative of one of the projection units composing the projection type display apparatus of the fourteenth invention. In FIG. 35, components identical with or corresponding to those shown in FIG. 26 are identified with the same symbols and the description thereof will not be given.

The CRT 21 is mounted on the CRT frame 51 via the CRT packing 29, and the spring 25 exerts compressive force to the holding plate 23 thereby to keep the CRT 21 and the CRT frame 51 in liquid-tight assembly, thus constituting the CRT block 81. The lens block 82 is constituted by interposing an end of the packing sheet 65, made of formed rubber or the like, between the lens frame 53 and the projection lens 28 and being installed liquid-tightly. Another end of the packing sheet 65 is attached to the CRT frame 51 liquid-tightly by means of the annular plate 67 and the screws 68, with a flexure being given to the sheet to allow adjustment of the relative angle and distance of the blocks 81, 82. Thus the space 31 between the face 21c of the CRT 21 and the lens surface 28b is formed liquid-tightly and filled with the coolant liquid 32.

The lens frame 53 is made of formed plastic because it does not contact with the coolant liquid 32, and a part of the bulging part 65a of the packing sheet is fitted to the lens frame 53 to improve the liquid-tightness and workability of assembly.

The operation of this apparatus is the same as that of the apparatus of the sixth invention, and the description thereof will be omitted.

(Fifteenth invention)

Figure 36:
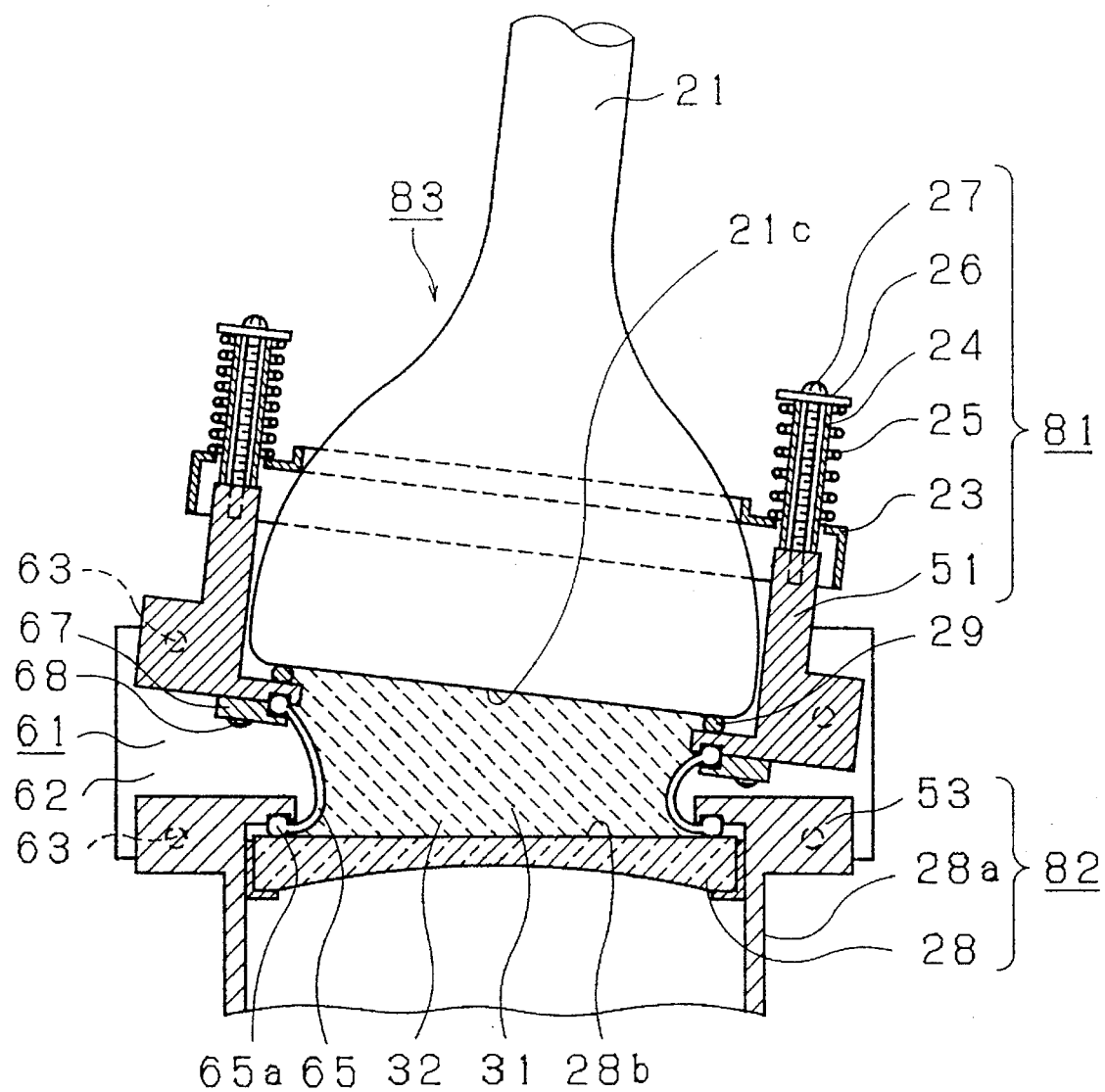
FIG. 36 is a cross sectional drawing illustrative of one of the projection units composing the projection type display of the fifteenth invention.

FIG. 36 is a cross sectional drawing illustrative of one of the projection units composing the projection type display apparatus of the fifteenth invention. In FIG. 36, components identical with or corresponding to those shown in FIG. 26 are identified with the same symbols and the description thereof will not be given.

The CRT 21 is mounted on the CRT frame 51 via the CRT packing 29, and the spring 25 exerts compressive force to the holding plate 23 thereby to keep the CRT 21 and the CRT frame 51 in liquid-tight assembly, thus constituting the CRT block 81. The lens block 82 is constituted by interposing an end of the packing sheet 65, made of formed rubber or the like, between the lens frame 53 and the projection lens 28 and being installed liquid-tightly. Another end of the packing sheet 65 is attached to the CRT frame 51 liquid-tightly by means of the annular plate 67 and the screws 68, with a flexure being given to the sheet to allow adjustment of the relative angle and distance of the blocks 81, 82. Thus the space 31 between the face 21c of the CRT 21 and the lens surface 28b is formed liquid-tightly and filled with the coolant liquid 32.

The lens frame 53 and the lens barrel 28a of the projection lens 28 are made by forming integrally, and the packing sheet 65 is attached when assembling the lens.

The operation of this apparatus is the same as that of the apparatus of the sixth invention, and the description thereof will be omitted.

(Sixteenth invention)

Figure 37:
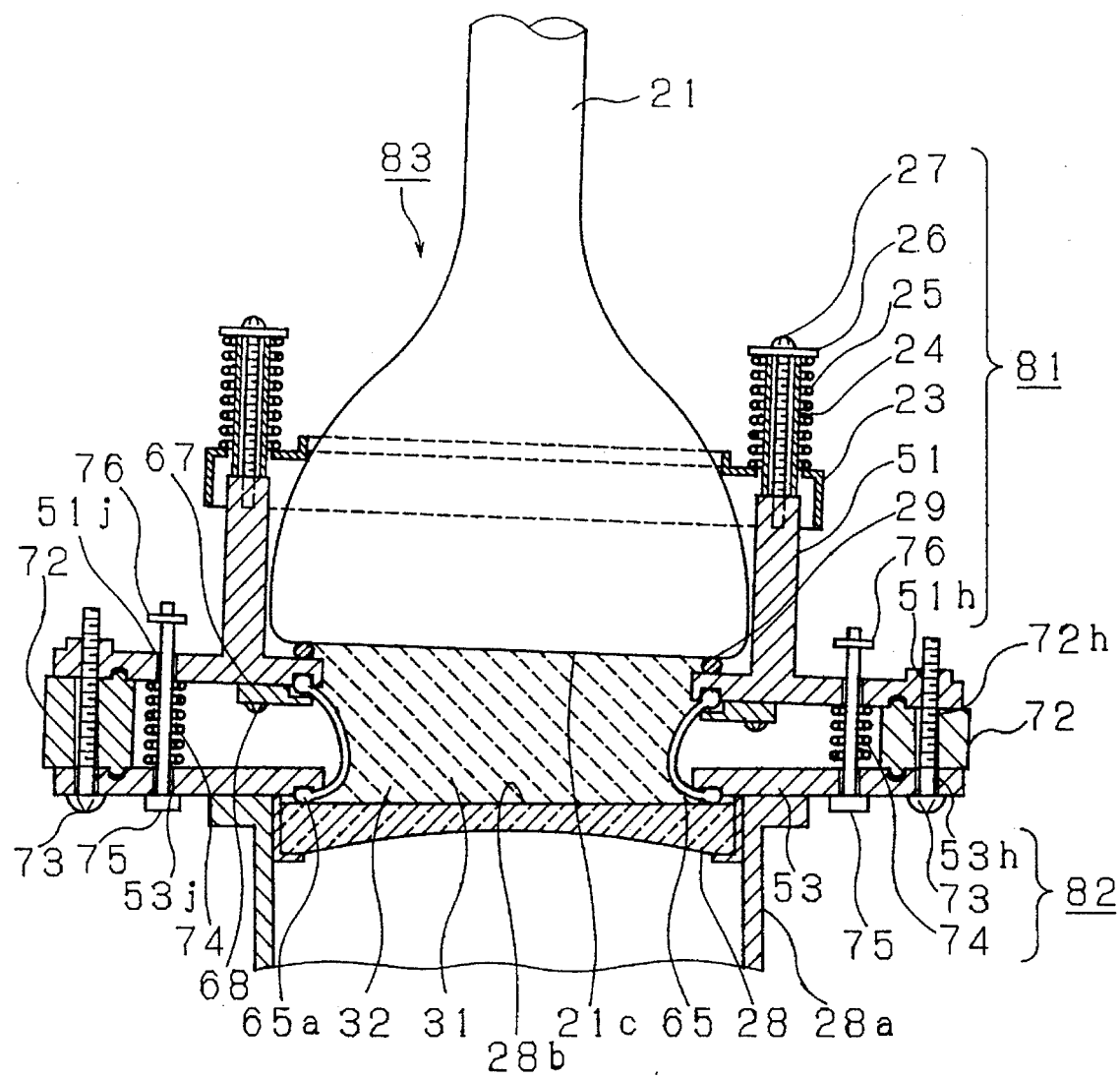
FIG. 37 is a cross sectional drawing illustrative of the first embodiment of one of the projection units composing the projection type display of the sixteenth invention.

FIG. 37 is a cross sectional drawing illustrative of the first embodiment of one of the projection units composing the projection type display apparatus of the sixteenth invention. In FIG. 37, components identical or corresponding to those of the conventional apparatuses shown in FIG. 31 are identified with the same symbols and the description thereof will not be given.

The CRT 21 is mounted on the CRT frame 51 via the CRT packing 29, and the spring 25 exerts compressive force to the holding plate 23 thereby to keep the CRT 21 and the CRT frame 51 in liquid-tight assembly, thus constituting the CRT block 81. The lens block 82 is constituted by interposing an end of the packing sheet 65, made of formed rubber or the like, between the lens frame 53 and the projection lens 28 and being installed liquid-tightly. Another end of the packing sheet 65 is attached to the CRT frame 51 liquid-tightly by means of the annular plate 67 and the screws 68, with a flexure given to the sheet to allow adjustment of the relative angle and distance of the blocks 81, 82. Thus the space 31 between the face 21c of the CRT 21 and the lens surface 28b is formed liquid-tightly and filled with the coolant liquid 32.

The relative angle and distance of the CRT block 81 with respect to the lens block 82 are determined by inserting the spacer of specified thickness and taper between the CRT frame 51 and the lens frame 53, passing the screws 73 through the holes 53h of the lens frame 53 and the hole 72h of the spacer 72, and tightening the screw 73 into the threaded hole 51h of the CRT frame 51. Apart from the set screw 73, a support shaft 75, which support both blocks 81, 82 freely movably, is installed passing through a support hole 53j of the lens frame 53 and a support hole 51j of the CRT frame 51. Further the support shaft 75 passes through the compression spring 74 installed between the lens frame 53 and the CRT frame 51 and is provided with a retainer ring 76 at the tip to prevent it from backing out.

Now the operation will be described below. The principle of image projection in the apparatus of the sixteenth invention is the same as that of the convention apparatus, and the description thereof will be omitted. It is also the same as the prior art, in that three projection units 83, each comprising the CRT block 81 and the lens block 82, are used for forming red, green and blue images, and optical axes of the projection units 83 are inclined to each other so that the images generated by the three CRTs 21 converge at one point on the screen 99, with the relative angle and distance of the CRT 21 and the projection lens 28 of each unit differ from those of other units.

The apparatus of the sixteenth invention is made by constituting three units for red, green and blue images within the projection apparatus by using the CRT frame 51 and the lens frame 53 in common, and changes in the projection optics system such as the screen size, projection distance and projection angle are accommodated within the same apparatus.

When the coolant liquid 32 expands due to heating of the CRT 21 during operation, the packing sheet 65 swells toward the outside to increase the capacity and accommodate the increased volume, thereby keeping the pressure of the coolant liquid 32 constant and reducing the possibility of liquid leakage.

The relative angle and distance of the CRT 21 with respect to the projection lens 28 can be accurately controlled by changing the thickness and inclination of the spacer 72 which is interposed between the CRT frame 51 and the lens frame 53.

When changing the angle and distance between both blocks in the presence of the filling coolant liquid 32, both blocks 81, 82 do not come off even if the spacer 72 and the screw 73 are removed, because the CRT block frame 51 is pressed by the compression spring 74 to increase the distance between both frames 51, 53 until stopped by the retainer ring 76, thereby making it easier to replace the spacer 72. Because the support holes 51j, 53j are made greater than the diameter of the support shaft 75 enough to accommodate the changes in the relative angle of both frames 51, 53.

Figure 38:
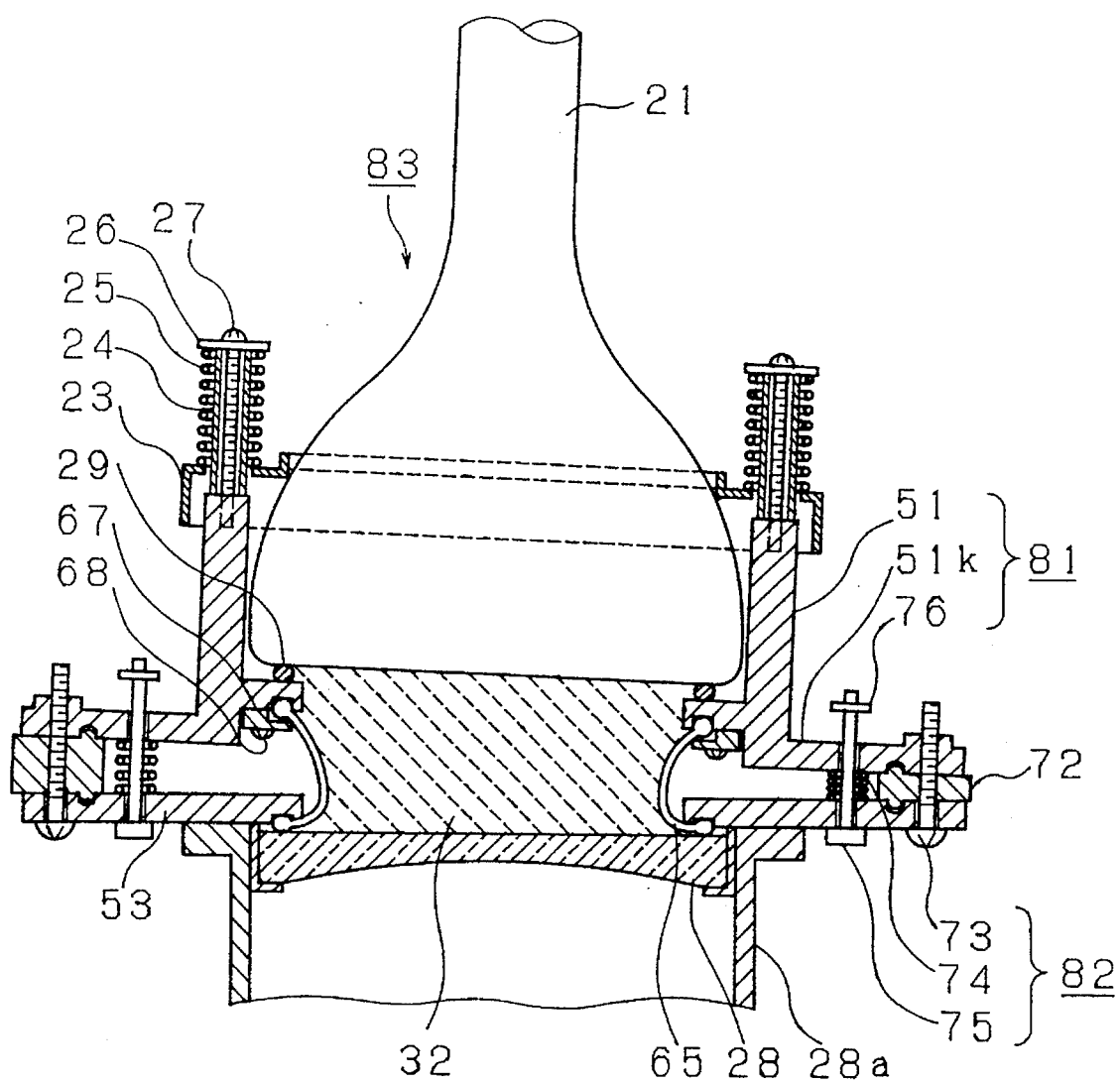
FIG. 38 is a cross sectional drawing illustrative of the second embodiment of one of the projection units composing the projection type display of the sixteenth invention.

FIG. 38 is a cross sectional drawing illustrative of the second embodiment of one of the projection units composing the projection type display apparatus of the sixteenth invention, wherein a mounting section 51k of the CRT frame 51 is provided with a step to reduce the thickness of the spacer 72 which is installed between the CRT block 81 and the lens block 82.

Figure 39:
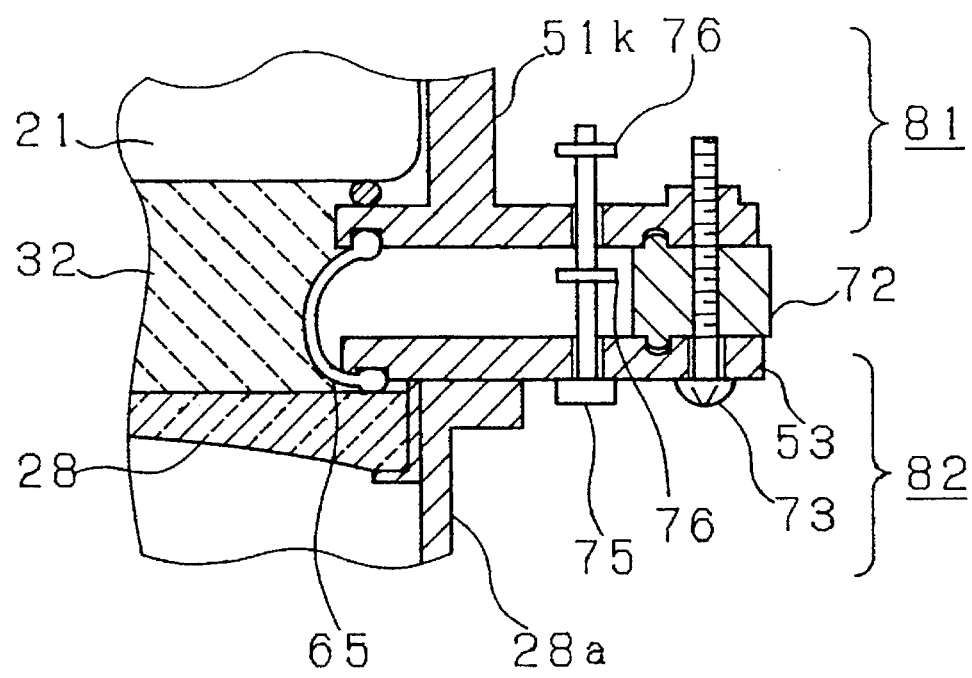
FIG. 39 is a partially enlarged cross sectional drawing illustrative of the third embodiment of one of the projection units composing the projection type display of the sixteenth invention.

FIG. 39 is a cross sectional drawing illustrative of a key portion of the third embodiment of one of the projection units composing the projection type display apparatus of the sixteenth invention, wherein the compression spring 74 installed between the CRT frame 51 and the lens frame 53 is replaced with the retainer ring 76. Similar effect can be obtained by installing the retainer ring 76 on at the tip of the support shaft 75, although not shown in the drawing.

Further in the inventions described below, the relative angle can be adjusted easily under liquid-tight condition even when the distance between the CRT and the projection lens is very small, by reducing the sliding resistance during adjustment of the relative angle.

(Seventeenth invention)

Figure 40:
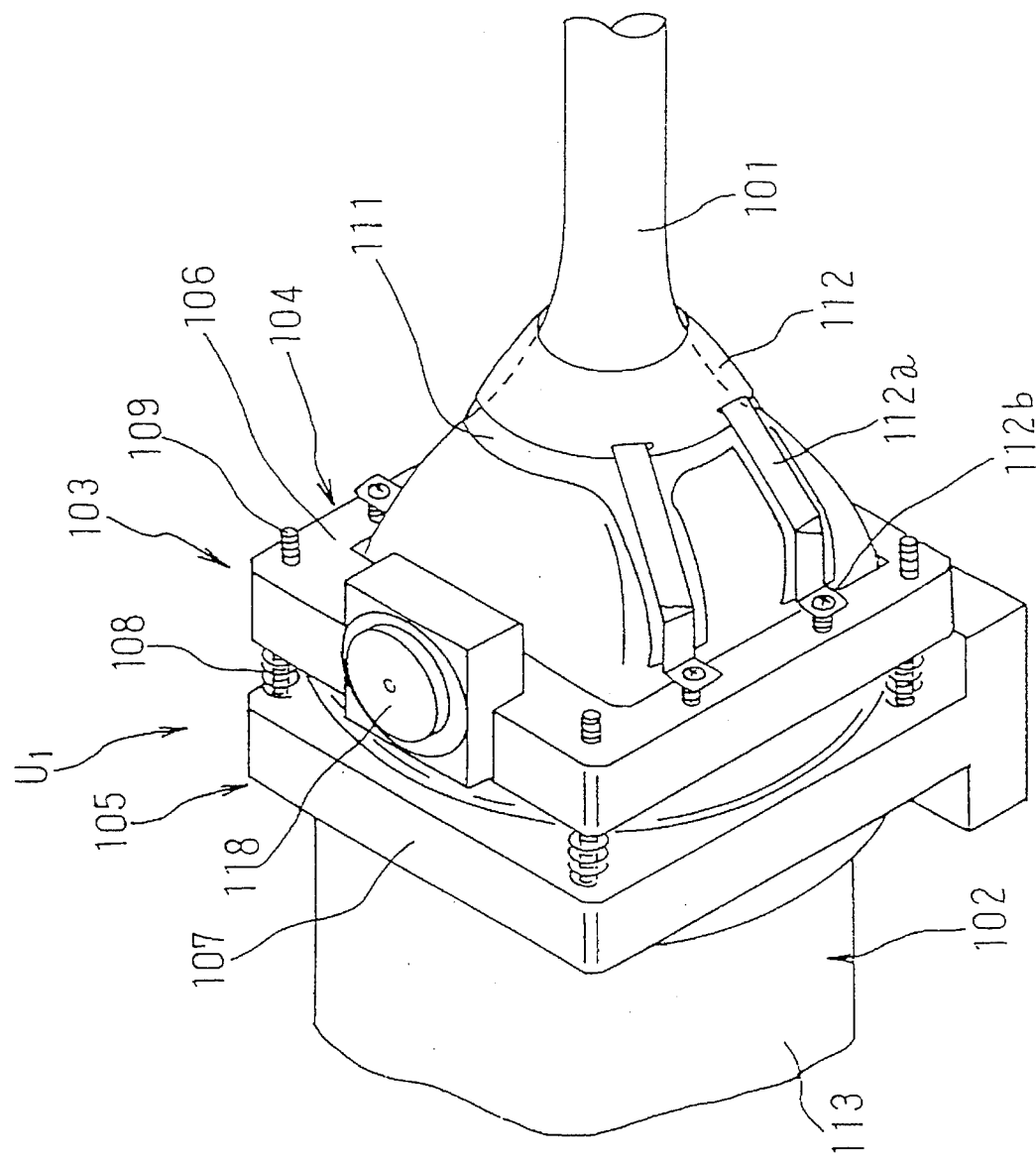
FIG. 40 is a perspective view illustrative of the first embodiment of one of the projection units composing the projection type display of the seventeenth invention.
Figure 41:
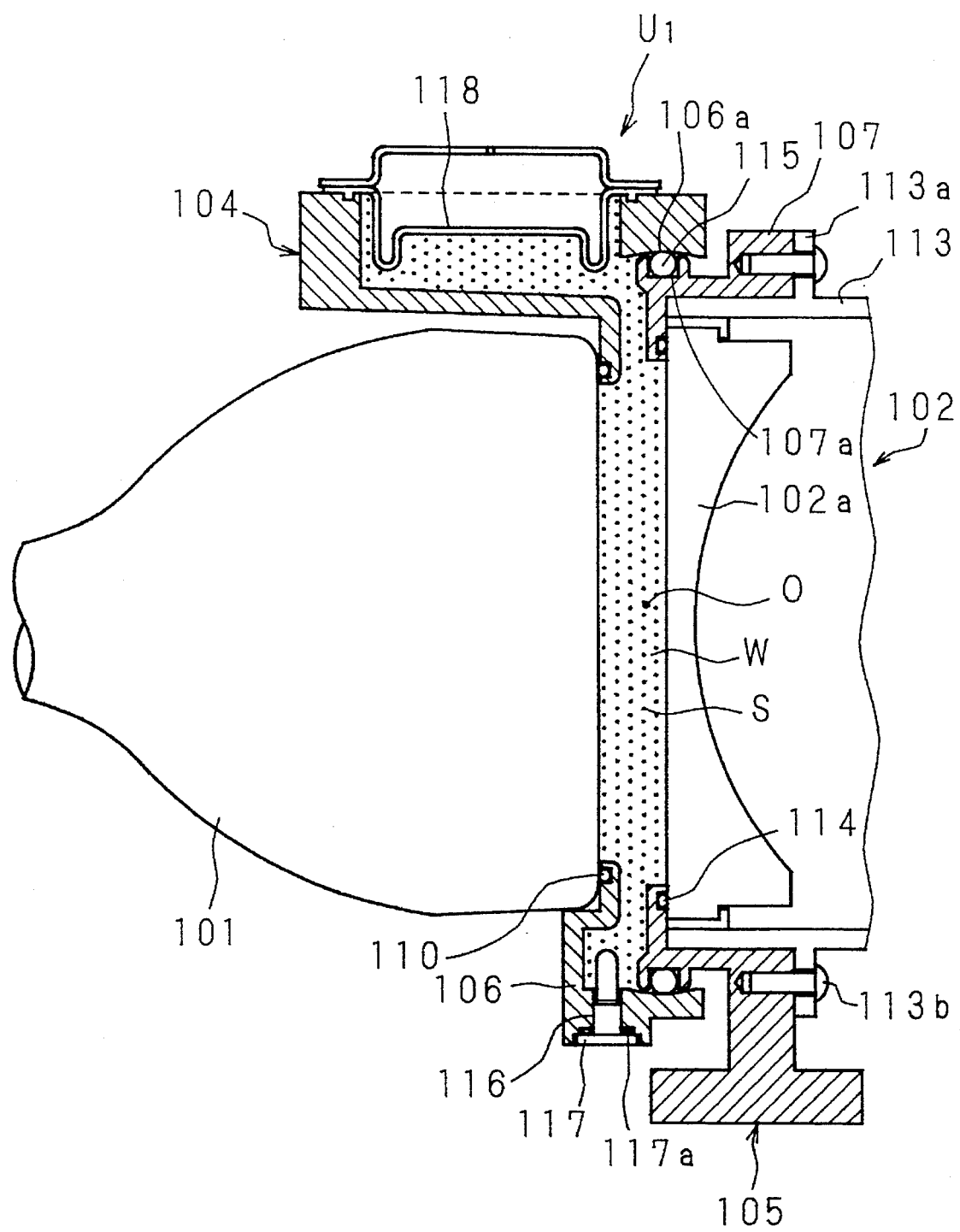
FIG. 41 is a cross sectional drawing illustrative of the first embodiment of one of the projection units composing the projection type display of the seventeenth invention.
Figure 42:
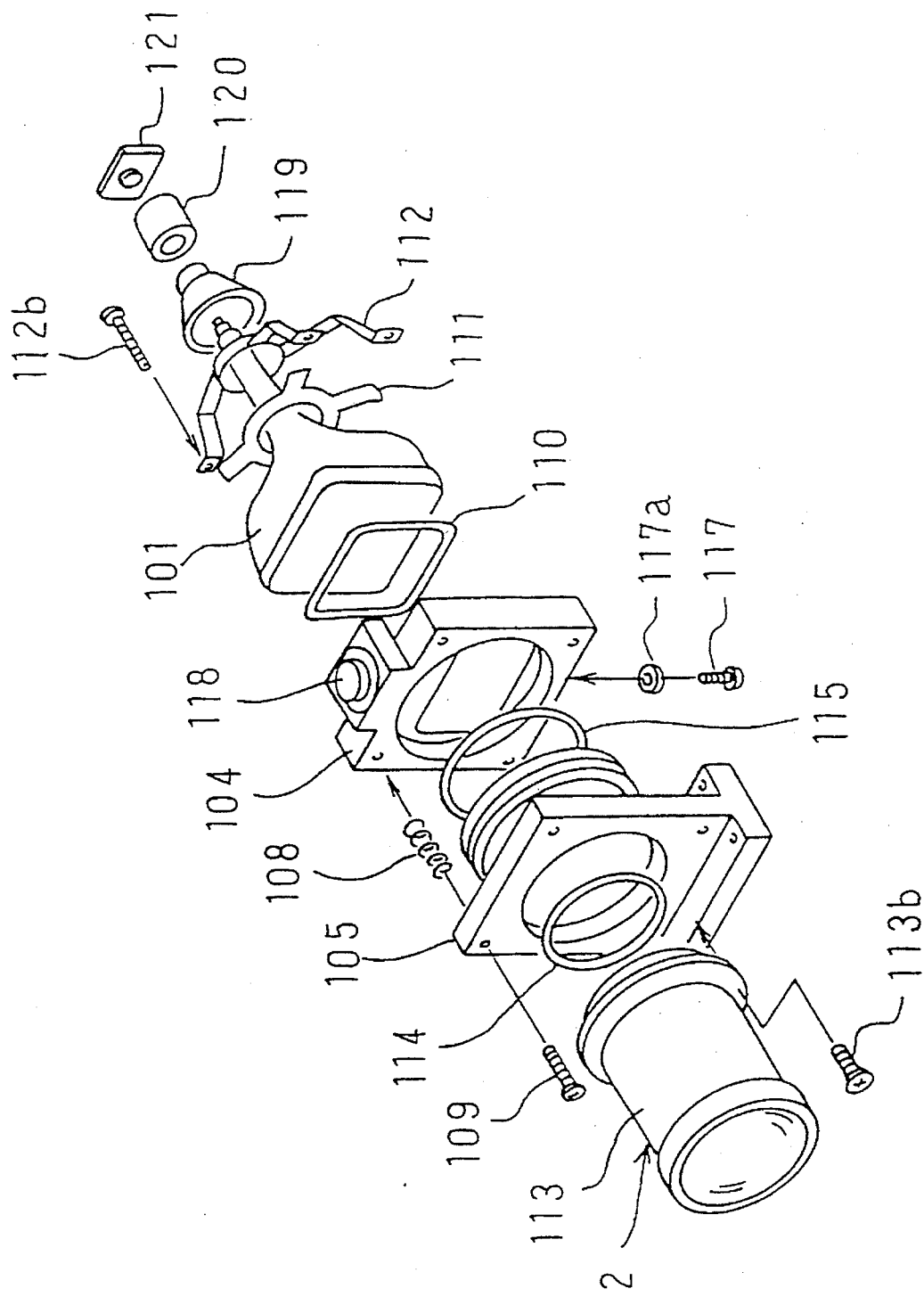
FIG. 42 is an exploded perspective view illustrative of the first embodiment of one of the projection units composing the projection type display of the seventeenth invention.

FIG. 40 is a perspective view illustrative of the first embodiment of one of the projection units composing the projection type display of the seventeenth invention, FIG. 41 is a cross sectional drawing thereof, and FIG. 42 is an exploded perspective view thereof. A linkage member 103 is made of aluminum diecast or the like having a good heat conductance, and consists of a CRT holding member 104 and a lens holding member 105. The CRT holding member 104 is provided with a ring-shaped frame section 106 having a rectangular opening in the middle thereof which matches the front face configuration of a CRT 101 which is the image forming means, and is installed on the periphery of the CRT 101 at the front. The lens holding member 105 is provided with a ring-shaped frame section 107 having a circular opening in the middle thereof which matches a barrel 113 of a projection lens 102, and is installed on the periphery of the projection lens 102 at the base.

The frame section 106 of the CRT holding member 104 and the frame section 107 of the lens holding member 105 are connected keeping the predetermined distance and angle between the CRT 101 and the projection lens 102 by the screw 109 via the spring 108 on the four corners respectively.

The CRT 101 is liquid-tightly mounted on the frame section 106, with the periphery of the front end surface of the CRT 101 being put into contact with a packing sheet 110 which is fitted in the annular groove made along the inner circumference of the frame section 106 of the CRT holding member 104, while a cylindrical cone-shaped band 112 is fitted into the back side of the CRT holding member 104 via a rubber sheet 111, by clamping a connecting belts 112a onto the side of the frame section 106 by means of set screws 112b.

The projection lens 102 is liquid-tightly mounted on the frame section 107, with the periphery of the lens surface of the first stage lens 102a fixed on the base of the barrel 113 being put into contact with a packing 114 which is fitted in the annular groove made along the inner circumference of the frame section 107 of the lens holding member 105, by clamping a flange section 113a provided on the periphery of the barrel 113 onto the frame section 107 by means of set screws 113b.

A frame 106 of the CRT holding member 104 is provided with a spherical guide 106a having an arc configuration of concave cross section formed on the inner circumference near the projection lens 102 side thereof. The frame section 107 of the lens holding member 105 is provided with an annular groove 107a formed along the entire periphery on the CRT 101 side thereof, with an O-ring 115 fitted in the groove. The spherical guide 106a of the frame section 106 is fitted from the outside to the frame section 107 whereon the O-ring 115 is arranged, thereby a space S formed between both frames 106, 107 and between the CRT 101 and the projection lens 102 is made liquid-tight and filled with a coolant liquid W.

Numeral 116 denotes a port for pouring the coolant liquid W bored on the circumferential wall of the frame section 106 to face the space S between both frame sections 106, 107, and can be opened and closed by means of a sealing screw 117 interfaced by a packing 117a. Numeral 118 denotes a tank provided on the CRT holding member 104 to accommodate excess of the coolant liquid W filling the space S generated by heat expansion thereof. Numeral 119 denotes a deflection yoke, numeral 120 denotes a focus magnet, and numeral 121 denotes a CRT board.

In this embodiment as constituted as described above, red, green and blue images generated by the CRT 101 of each projection unit enter the projection lens 102 and projected onto the screen so that the images converge on one point of the screen. The relative angle and distance of the CRT 101 and the projection lens 102 can be controlled while keeping the space S liquid-tight by turning the CRT holding member 104 and the lens holding member 105 relatively within the limit of width of the spherical guide 106a around a specified reference point O as the center.

Although the description of this embodiment assumes that the CRT holding member 104 and the lens holding member 105 are made of the same material, the lens holding member 105 may be made of a material having greater thermal expansion coefficient than that of the CRT holding member 104. This causes the thermal expansion of the lens holding member 105 during operation of the projector to exert increased pressure in the contact between the O-ring 115 and the spherical guide 106a, resulting in greater sealing effect.

Figure 43A:
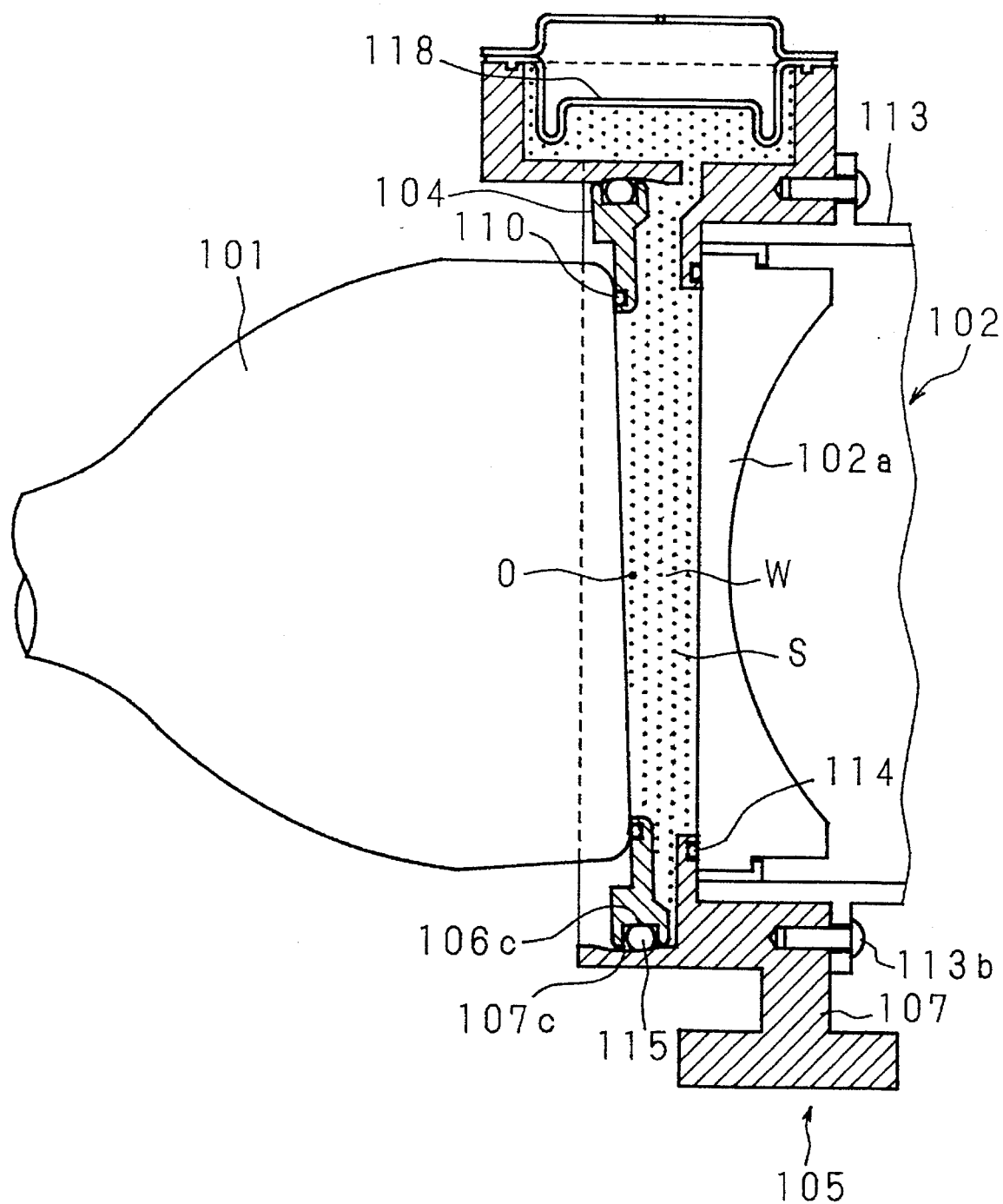
FIG. 43(a) is a cross sectional drawing illustrative of the second embodiment of one of the projection units composing the projection type display of the seventeenth invention.

FIG. 43(a), (b) are cross sectional drawings illustrative of the second and third embodiments of one of the projection units composing the projection type display of the seventeenth invention. In the second embodiment shown in FIG. 43(a), the frame section 107 of the lens holding member 105 is provided with a spherical guide 107c, having an arc configuration with the center located at the reference point O and having a concave cross section, formed on the inner circumference on the CRT 101 side. The frame section 106 of the CRT holding member 104 is provided with an annular groove 106c formed along the entire periphery of the frame section 106, with the O-ring 115 fitted in the groove. The spherical guide 107c of the frame 107 is fitted from the outside to the frame section 106 whereon the O-ring 115 is arranged, thereby the space S formed between both frames 106, 107 and between the CRT 101 and the projection lens 102 is made liquid-tight and filled with coolant liquid W.

In the second embodiment as described above, in addition to similar effect as that of the first embodiment being obtained, there is an advantage of being capable of significantly simplifying the configuration of the frame section 106 itself. Other constitution is the same as that of the first embodiment shown in FIG. 40 through FIG. 42, and corresponding components are given the same symbols and the description thereof will be omitted.

Figure 43B:
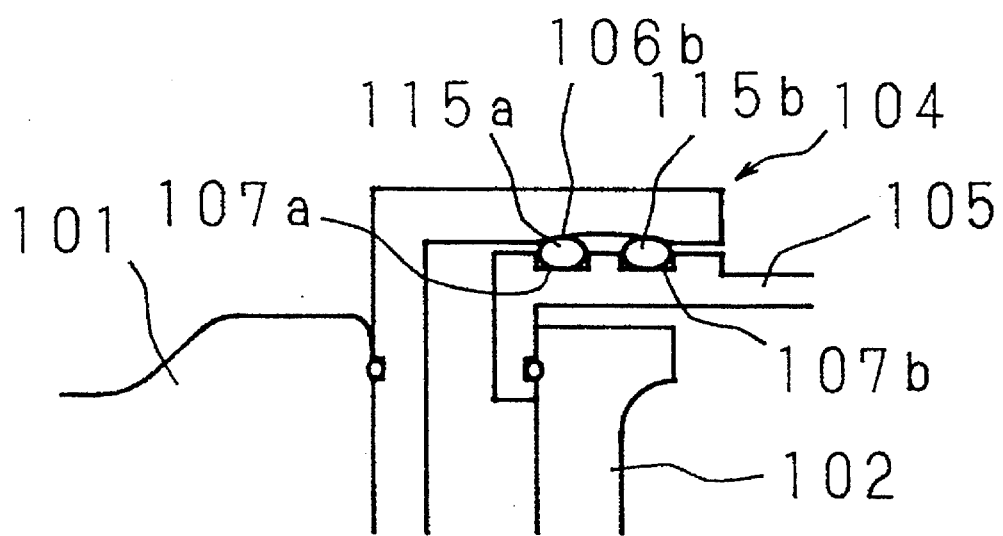
FIG. 43(b) is a cross sectional drawing illustrative of a key portion of the third embodiment of one of the projection units composing the projection type display of the seventeenth invention.

In the third embodiment shown in FIG. 43(b), the frame section 106 of the CRT holding member 104 is provided with a spherical guide 106b having greater width than that of the spherical guide 106a. The frame section 107 of the lens holding member 105 which opposes the spherical guide 106b is provided with annular grooves 107a, 107b arranged in two rows in parallel, wherein O-rings 115a, 115b are fitted, and the O-rings 115a, 115b are installed to slide along the spherical guide 106b, respectively.

In the third embodiment as described above, double sealing structure is provided between the frames 106 and 107, resulting in improved reliability. Otherwise the constitution and operation are substantially the same as those of the first embodiment, and corresponding components are given the same symbols and the description thereof will be omitted.

Figure 44:
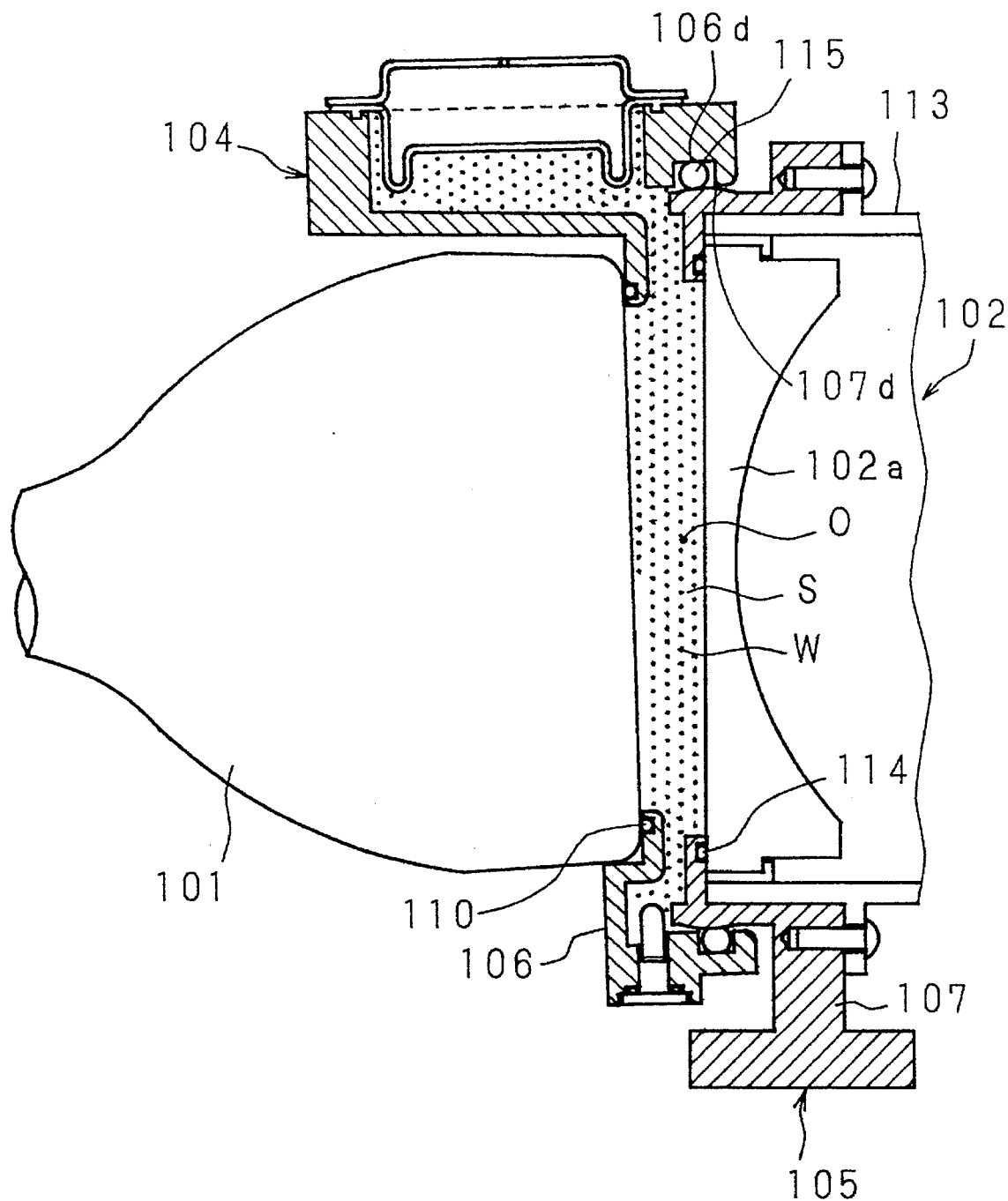
FIG. 44 is a cross sectional drawing illustrative of the fourth embodiment of one of the projection units composing the projection type display of the seventeenth invention.

FIG. 44 is a cross sectional drawing illustrative of the fourth embodiment of one of the projection units composing the projection type display of the seventeenth invention. In the fourth embodiment, the frame section 107 of the lens holding member 105 is provided with a spherical guide 107d having an arc configuration with the center located at the reference point O and having a convex cross section, formed on the outer circumference on the CRT 101 side. The frame section 106 of the CRT holding member 104 is provided with an annular groove 106d formed along the entire length of the inner circumference on the projection lens 102 side, with the O-ring 115 fitted in the groove. The spherical guide 107d of the frame section 106 provided with the O-ring 115 is fitted from the inside to the frame section 107. By pressing the O-ring 115 against the outer circumference of the spherical guide 107d, the space S is kept liquid-tight and the relative angle and distance of the CRT 101 and the projection lens 102 are made adjustable.

In the fourth embodiment as described above, the relative angle and distance of the CRT 101 and the projection lens 102 can be controlled while keeping the space S liquid-tight, by sliding the O-ring 115 within the limit of the spherical guide 107d around the reference point O as the center. Other constitution and operation are substantially the same as those of the first embodiment shown in FIG. 40 through FIG. 42, and corresponding components are given the same symbols and the description thereof will be omitted.

Figure 45:
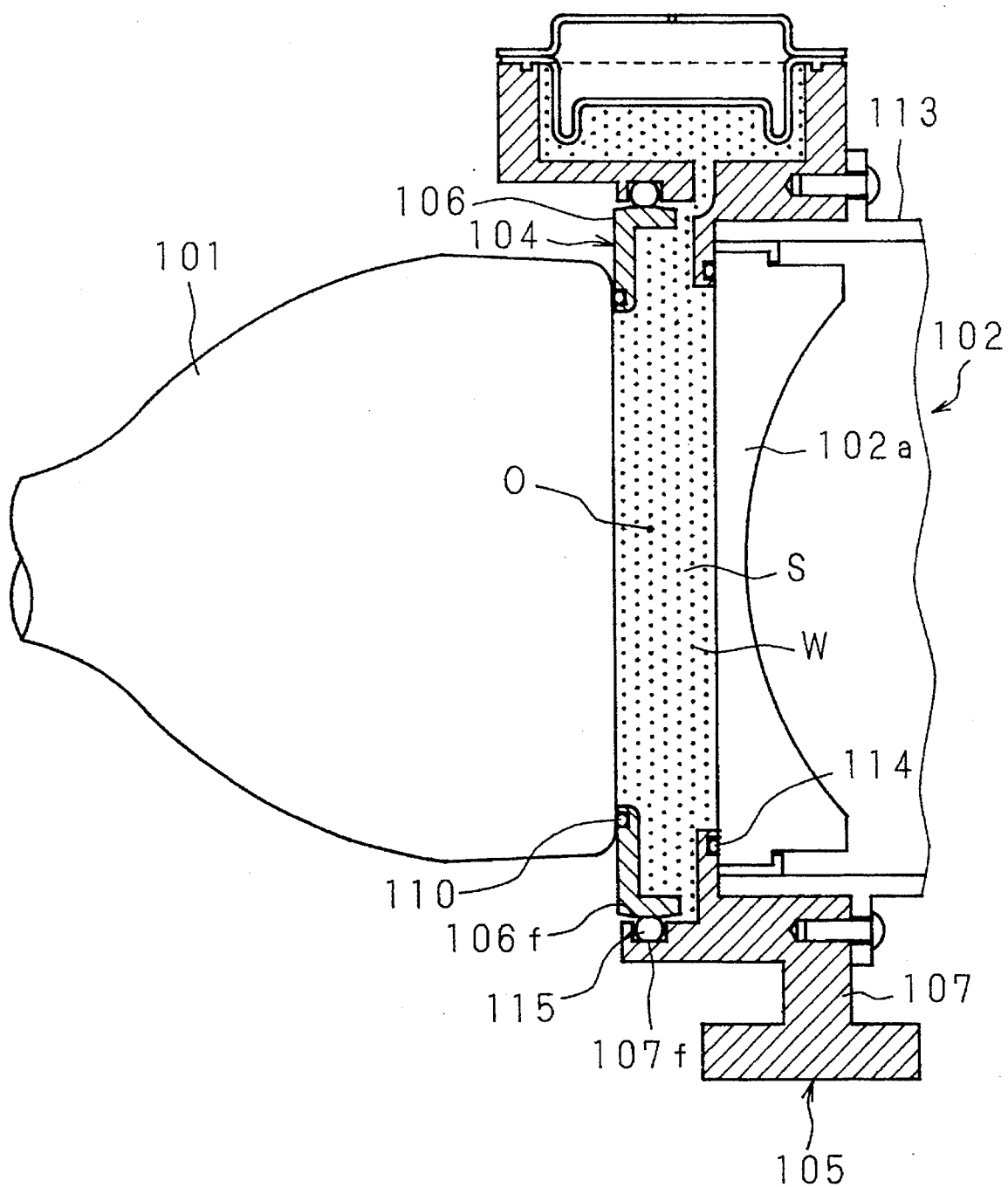
FIG. 45 is a cross sectional drawing illustrative of the fifth embodiment of one of the projection units composing the projection type display of the seventeenth invention.

FIG. 45 is a cross sectional drawing illustrative of the fifth embodiment of one of the projection units composing the projection type display of the seventeenth invention. In the fifth embodiment, the frame section 106 of the CRT holding member 104 is provided with a spherical guide 106f having an arc configuration with the center located at the reference point O and having a convex cross section, formed on the outer circumference on the projection lens 102 side. The frame section 107 of the lens holding member 105 is provided with an annular groove 107f formed along the entire length of the inner circumference on the projection CRT 101 side, with the O-ring 115 fitted in the groove. By fitting the spherical guide 106f of the frame section 106 from the inside to the frame section 107 whereon the O-ring 115 is arranged, the space S formed between the frames 106, 107 and between the CRT 101 and the projection lens 102 is kept liquid-tight and is filled with the coolant liquid W. In the fifth embodiment, in addition to the effect similar to that of the fourth embodiment being obtained, there is an advantage of being capable of significantly simplifying the configuration of the frame section 106 itself. Otherwise the constitution is substantially the same as that of the fourth embodiment shown in FIG. 44, and corresponding components are given the same symbols and the description thereof will be omitted.

Figure 46:
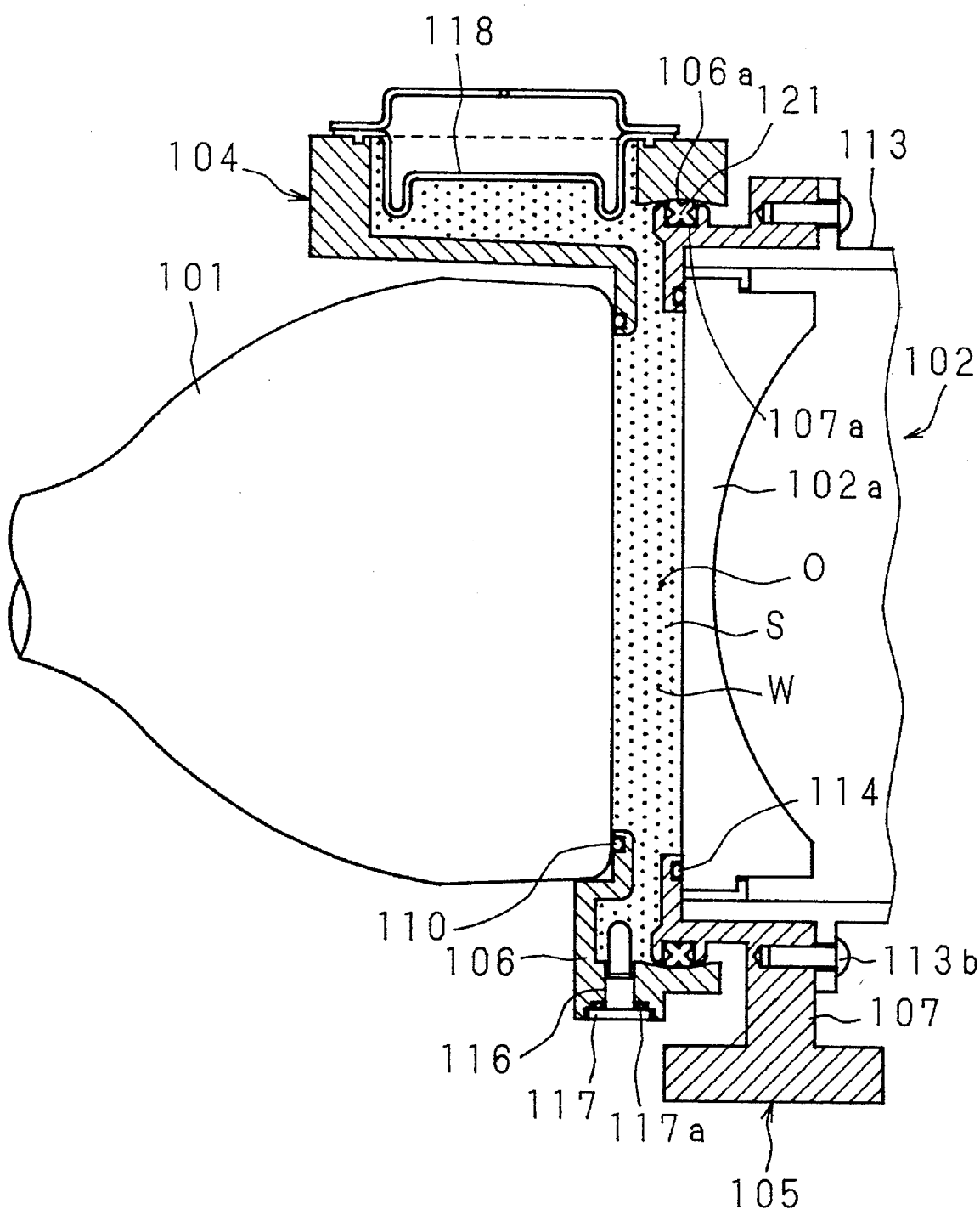
FIG. 46 is a cross sectional drawing illustrative of the sixth embodiment of one of the projection units composing the projection type display of the seventeenth invention.
Figure 47:
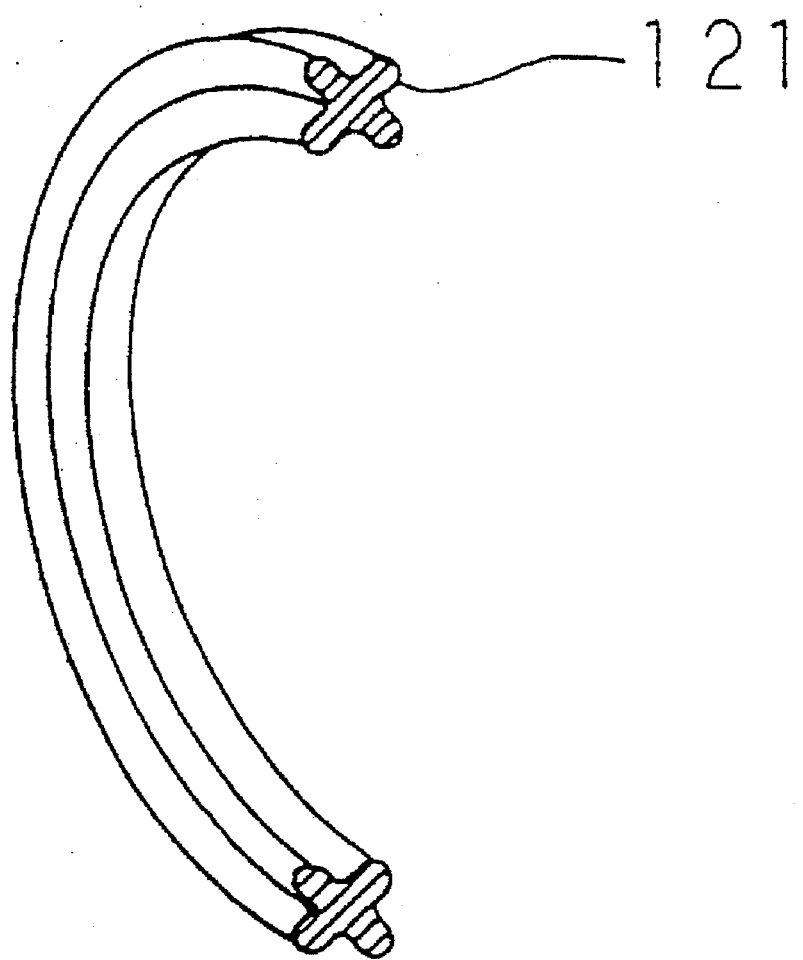
FIG. 47 is a half-broken perspective view of an X ring used in the projection unit shown in FIG. 46.

FIG. 46 is a cross sectional drawing illustrative of the sixth embodiment of one of the projection units composing the projection type display of the seventeenth invention. FIG. 47 is a half-broken perspective view of an X-ring used in the embodiment shown in FIG. 46. The sixth embodiment is constituted by using the X-ring 121 made of formed elastic material similar to that of the O-ring 115 shown in FIG. 41, instead of the O-ring 115.

In the sixth embodiment, because the O-ring 115 is replaced with the X-ring 121, sliding resistance between the X-ring 121 and the spherical guide 106a becomes small and workability is improved during change of the relative angle or distance of the CRT 101 and the 102, while the structure similar to double sealing improves the reliability. Other constitution and operation are substantially the same as those of the fourth embodiment shown in FIG. 44, and corresponding components are given the same symbols and the description thereof will be omitted.

Figure 48A:
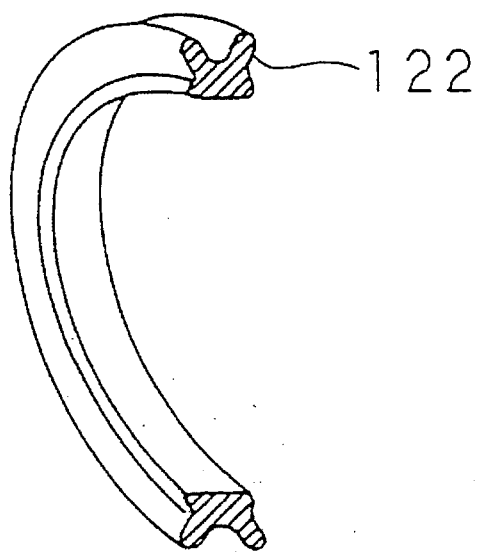
FIG. 48(a), (b), (c) are drawings illustrative of other examples of the sealing rings used in the projection units in the seventeenth invention.
Figure 48B:
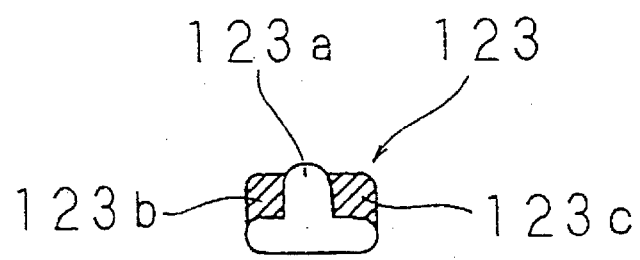
Figure 48C:
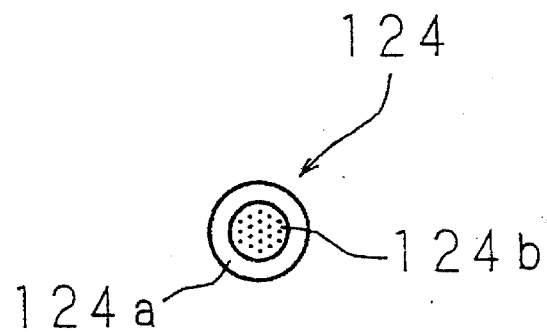

Sealing may also be provided by means of seal rings as shown in FIG. 48(a), (b), (c) instead of the O-ring 115 and the X-ring 121. The seal ring shown in FIG. 48(a) is a U-ring 122, the seal ring shown in FIG. 48(b) is a T-ring 123, and the seal ring 124 shown in FIG. 48(c) is a tube 124a filled with gel 124b. The U-ring 122 has a groove on the periphery with flat inner circumference. The T-ring 123 has flat inner circumference provided with a rib 123a formed along the periphery at the center of the width, with reinforcement rings 123b, 123c made of synthetic resin installed along the rib 123a on both sides thereof.

(Eighteenth invention)

Figure 49:
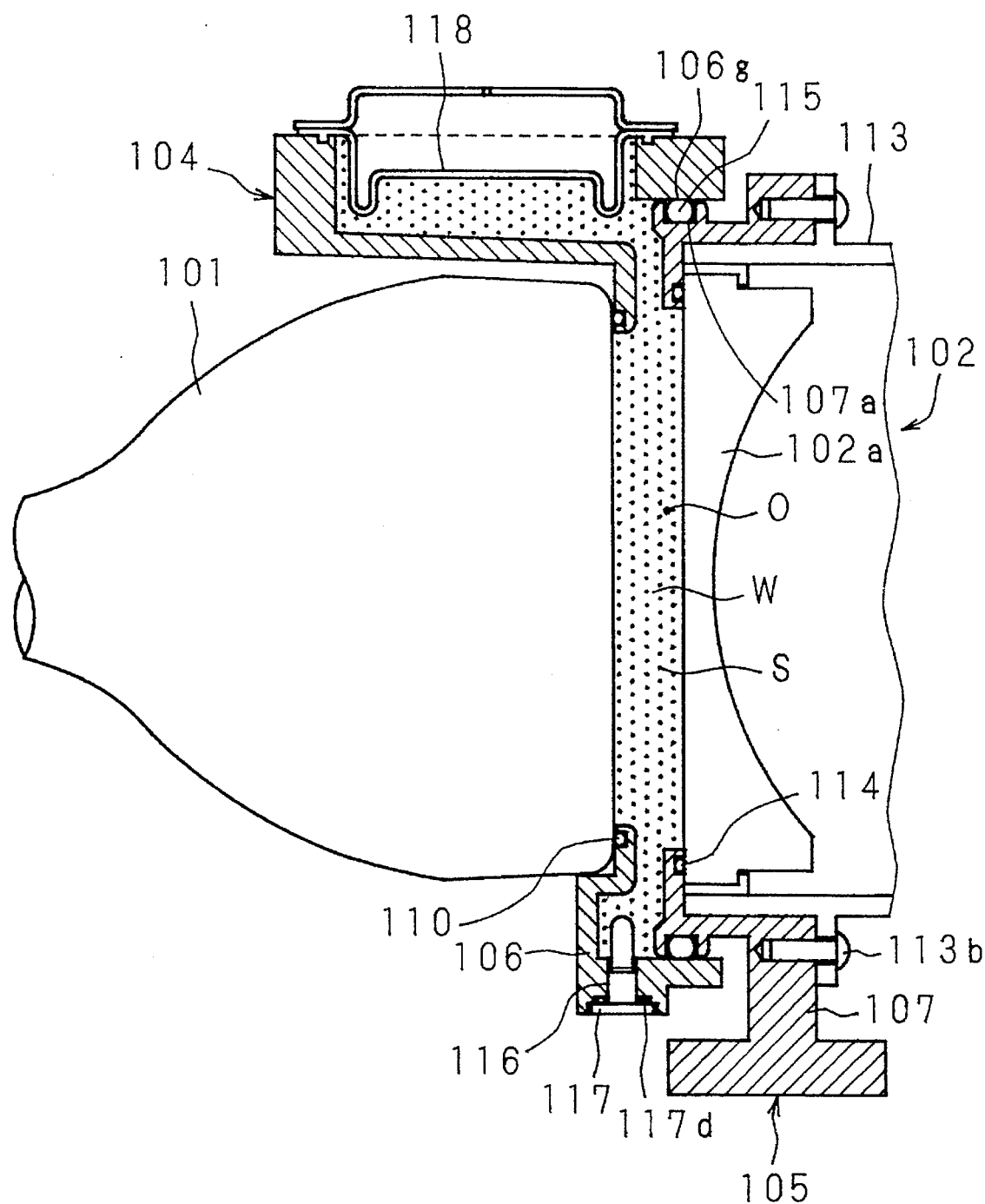
FIG. 49 is a cross sectional drawing illustrative of the first embodiment of one of the projection units composing the projection type display of the eighteenth invention.

FIG. 49 is a cross sectional drawing illustrative of the first embodiment of one of the projection units composing the projection type display of the eighteenth invention. This embodiment has substantially the same constitution as shown in FIG. 41 wherein the spherical guide 106a of arc configuration with a concave cross section is replaced with a cylindrical guide 106g. In this embodiment, the space S is kept liquid-tight by the sliding contact of the cylindrical guide 106g and the O-ring 115, and the relative angle and distance of the CRT 101 and the projection lens 102 are made adjustable within specified ranges. Other constitution and operation are essentially the same as those shown in FIG. 41, and corresponding components are given the same symbols and the description thereof will be omitted.

Figure 50:
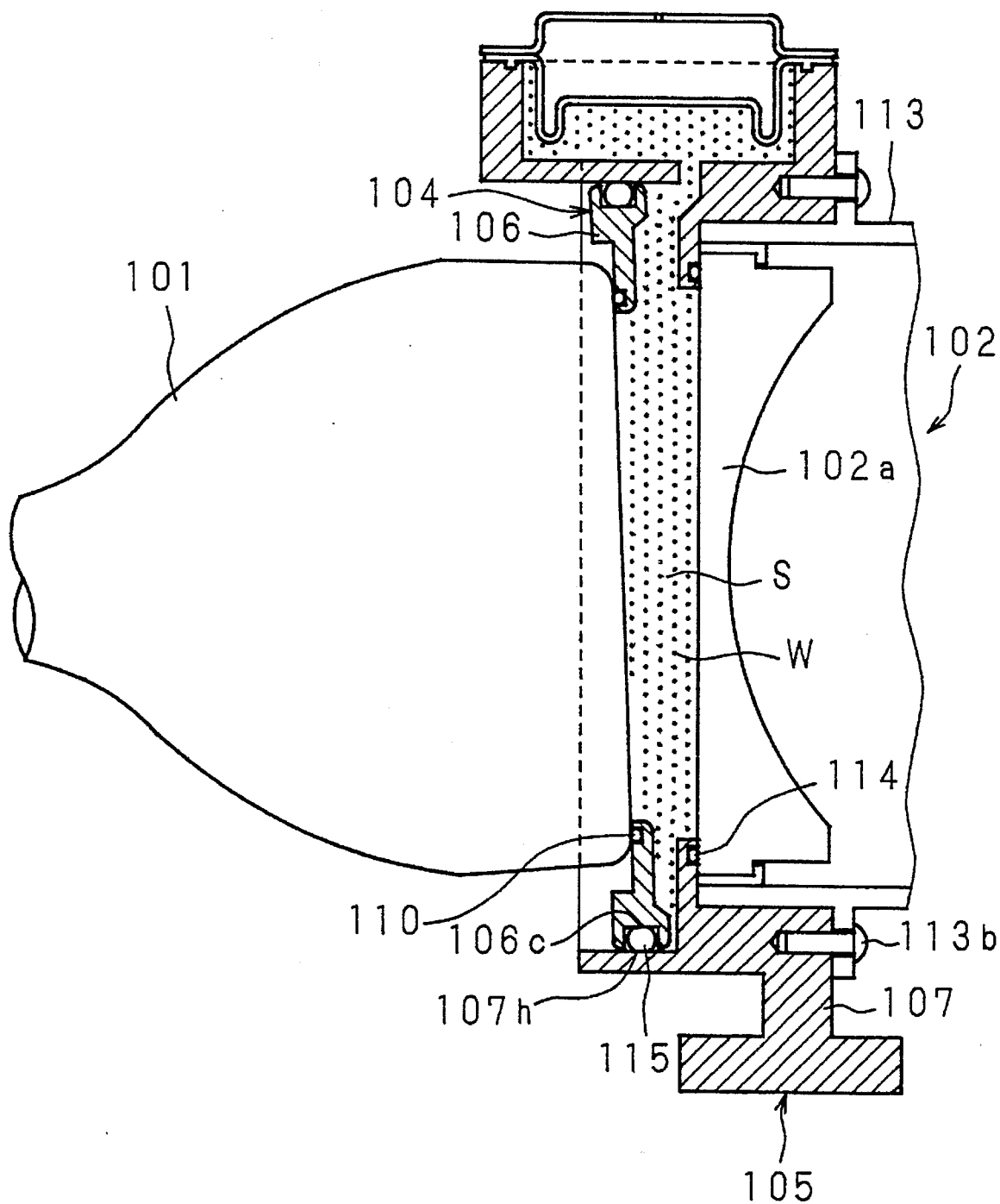
FIG. 50 is a cross sectional drawing illustrative of the second embodiment of one of the projection units composing the projection type display of the eighteenth invention.

FIG. 50 is a cross sectional drawing illustrative of the second embodiment of one of the projection units composing the projection type display of the eighteenth invention. This embodiment has substantially the same constitution as shown in FIG. 43 wherein the spherical guide 107c is replaced with a cylindrical guide 107h. The second embodiment provides similar effect to that of the first embodiment. Other constitution and operation are essentially the same as those shown in FIG. 43, and corresponding components are given the same symbols and the description thereof will be omitted.

Figure 51:
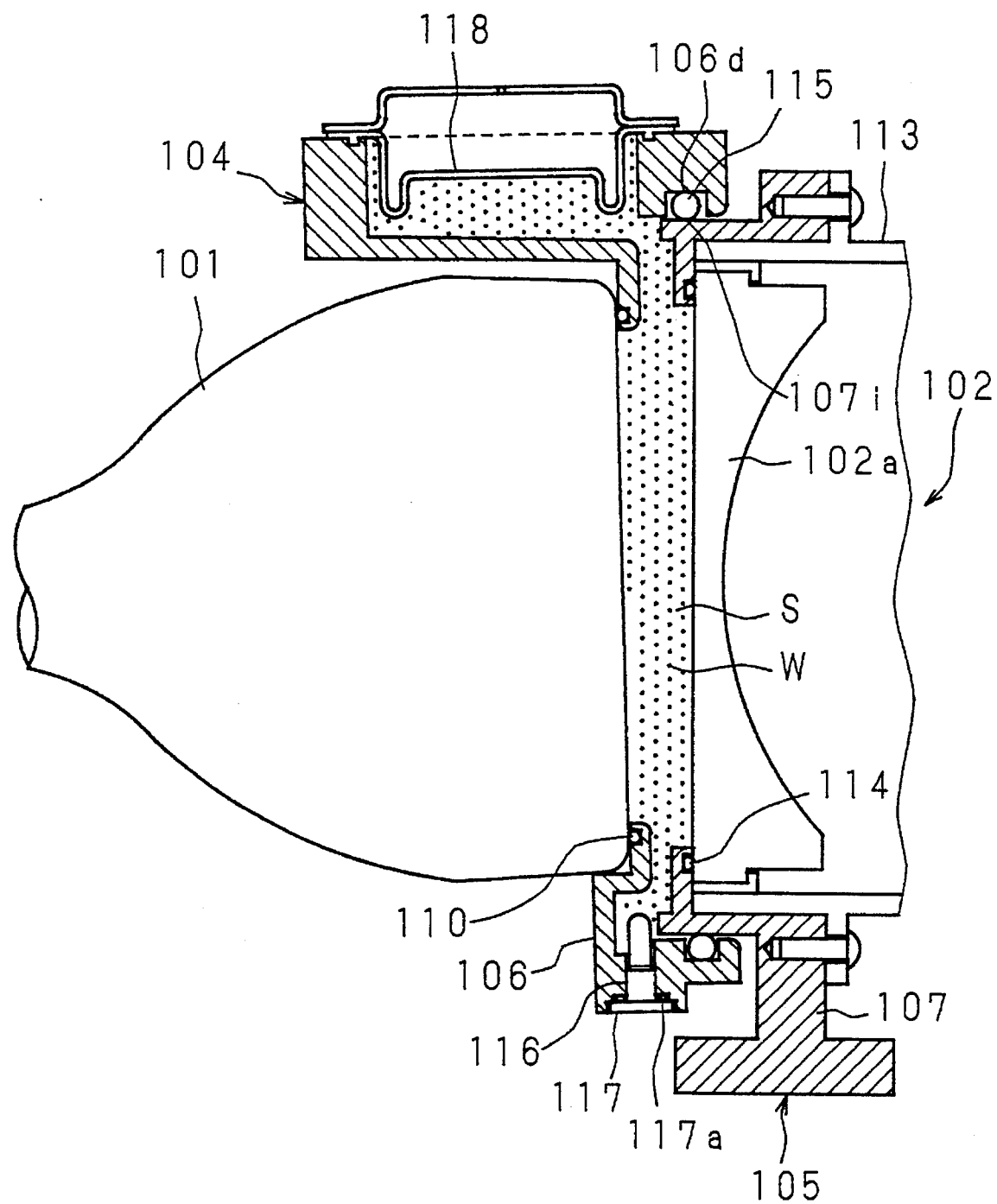
FIG. 51 is a cross sectional drawing illustrative of the third embodiment of one of the projection units composing the projection type display of the eighteenth invention.

FIG. 51 is a cross sectional drawing illustrative of the third embodiment of one of the projection units composing the projection type display of the eighteenth invention. This embodiment has substantially the same constitution as shown in FIG. 44 wherein the spherical guide 107d is replaced with a cylindrical guide 107i. The third embodiment provides similar effect to that of the first embodiment. Other constitution and operation are essentially the same as those shown in FIG. 44, and corresponding components are given the same symbols and the description thereof will be omitted.

Figure 52:
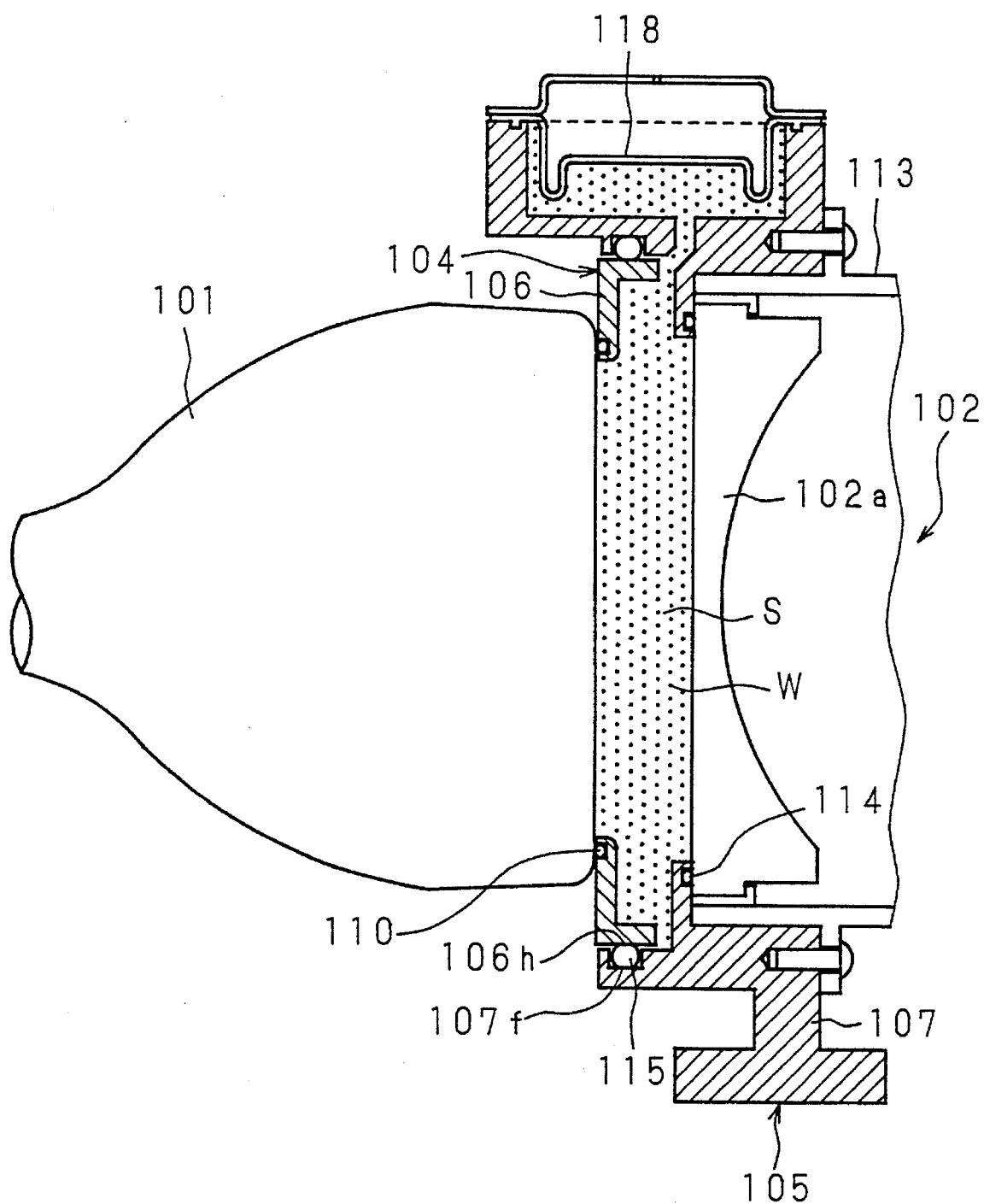
FIG. 52 is a cross sectional drawing illustrative of the fourth embodiment of one of the projection units composing the projection type display of the eighteenth invention.

FIG. 52 is a cross sectional drawing illustrative of the fourth embodiment of one of the projection units composing the projection type display of the eighteenth invention. This embodiment has substantially the same constitution as shown in FIG. 45 wherein the spherical guide 106f is replaced with a cylindrical guide 106h. The fourth embodiment provides similar effect to that of the first embodiment. Other constitution and operation are essentially the same as those shown in FIG. 45, and corresponding components are given the same symbols and the description thereof will be omitted.

Figure 53:
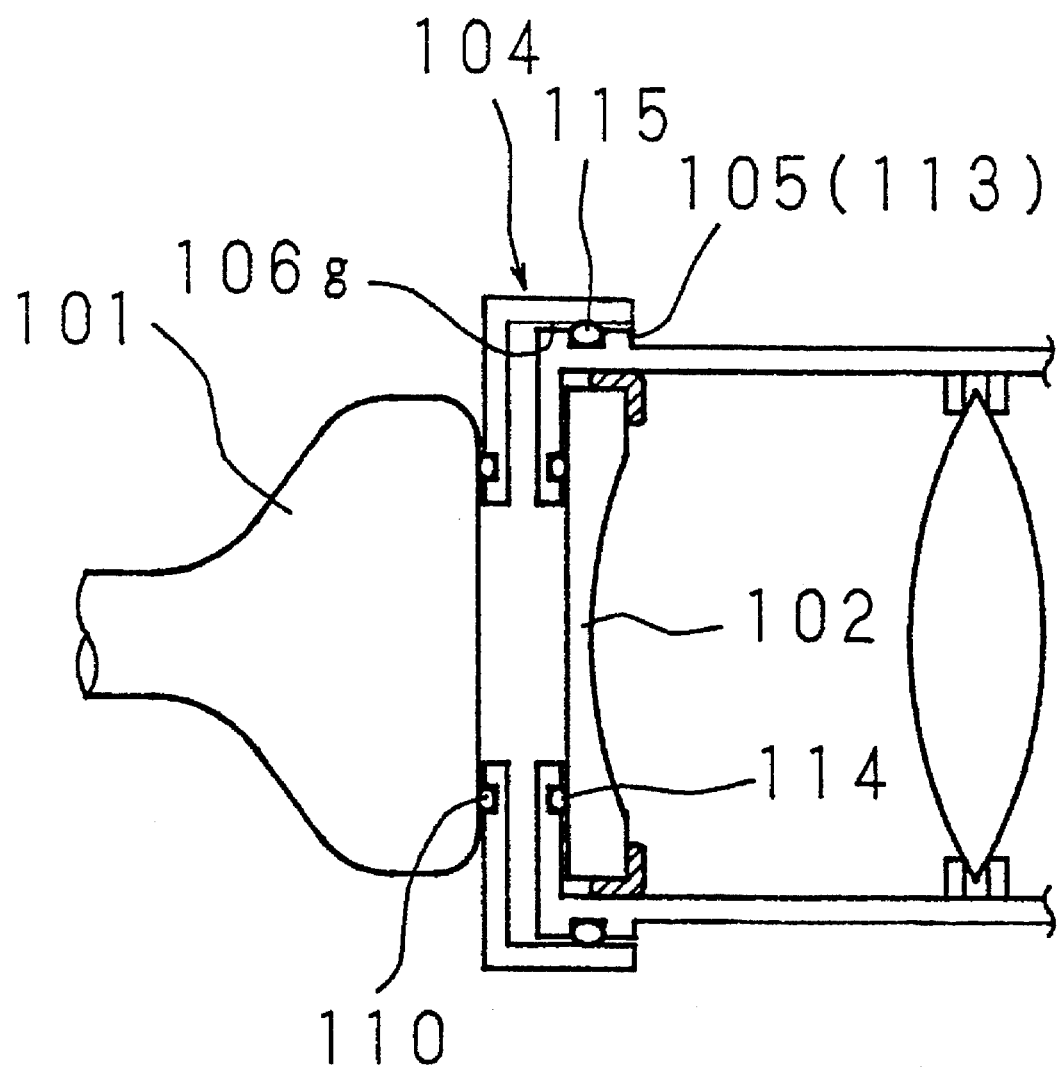
FIG. 53 is a cross sectional drawing illustrative of the fifth embodiment of one of the projection units composing the projection type display of the eighteenth invention.

FIG. 53 is a cross sectional drawing illustrative of the fifth embodiment of one of the projection units composing the projection type display of the eighteenth invention. In this embodiment, the lens holding member 105 is made in an integral structure with the barrel 113 of the projection lens 102, and the constitutions of the lens holding member 105 and the barrel 113 are greatly simplified. Other constitution and operation are substantially the same as those shown in FIG. 49, and corresponding components are given the same symbols and the description thereof will be omitted.

Figure 54:
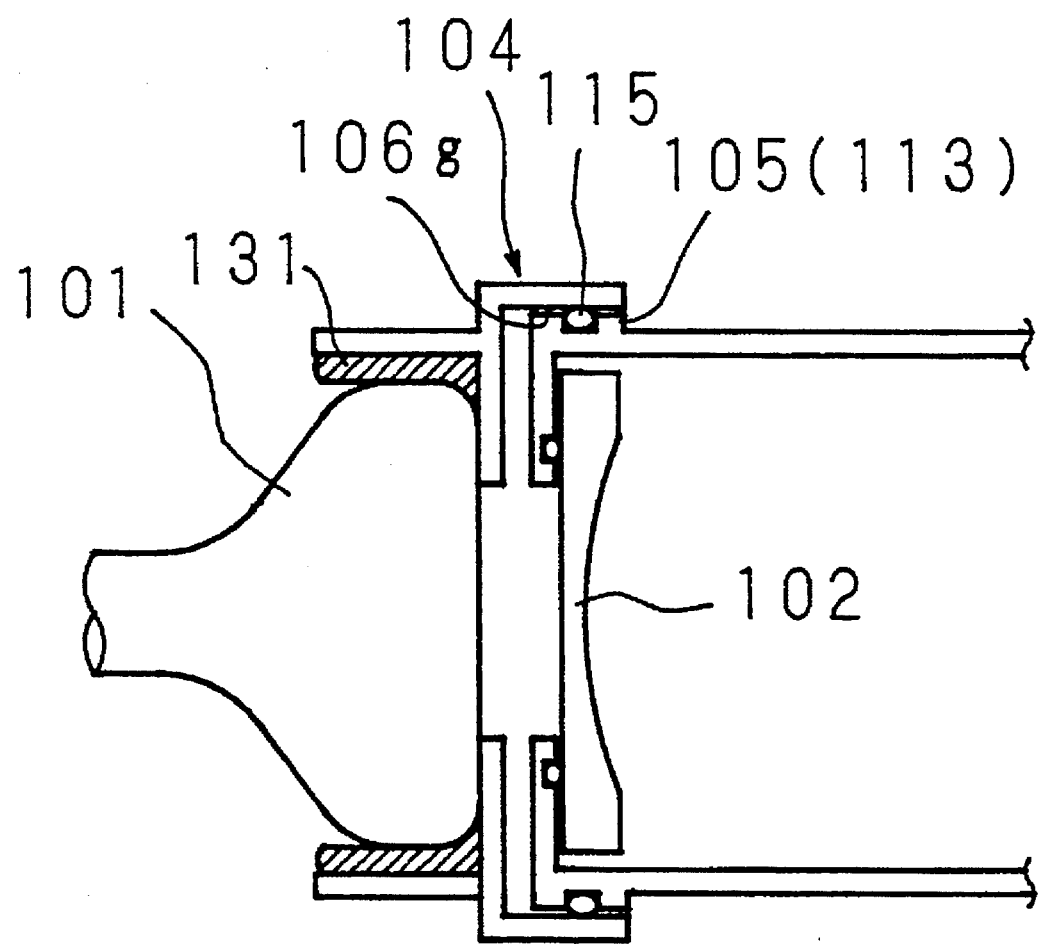
FIG. 54 is a cross sectional drawing illustrative of the sixth embodiment of one of the projection units composing the projection type display of the eighteenth invention.

FIG. 54 is a cross sectional drawing illustrative of the sixth embodiment of one of the projection units composing the projection type display of the eighteenth invention. In this embodiment, the CRT 101 is fitted into a guide cylinder which protrudes on the CRT 101 side of the frame section 106 and is put together with the CRT holding member 104 into an integral structure by means of an adhesive, thereby simplifying the combined structure of the CRT 101 and the CRT holding member 104. Other constitution and operation are substantially the same as those shown in FIG. 53, and corresponding components are given the same symbols and the description thereof will be omitted.

Figure 55:
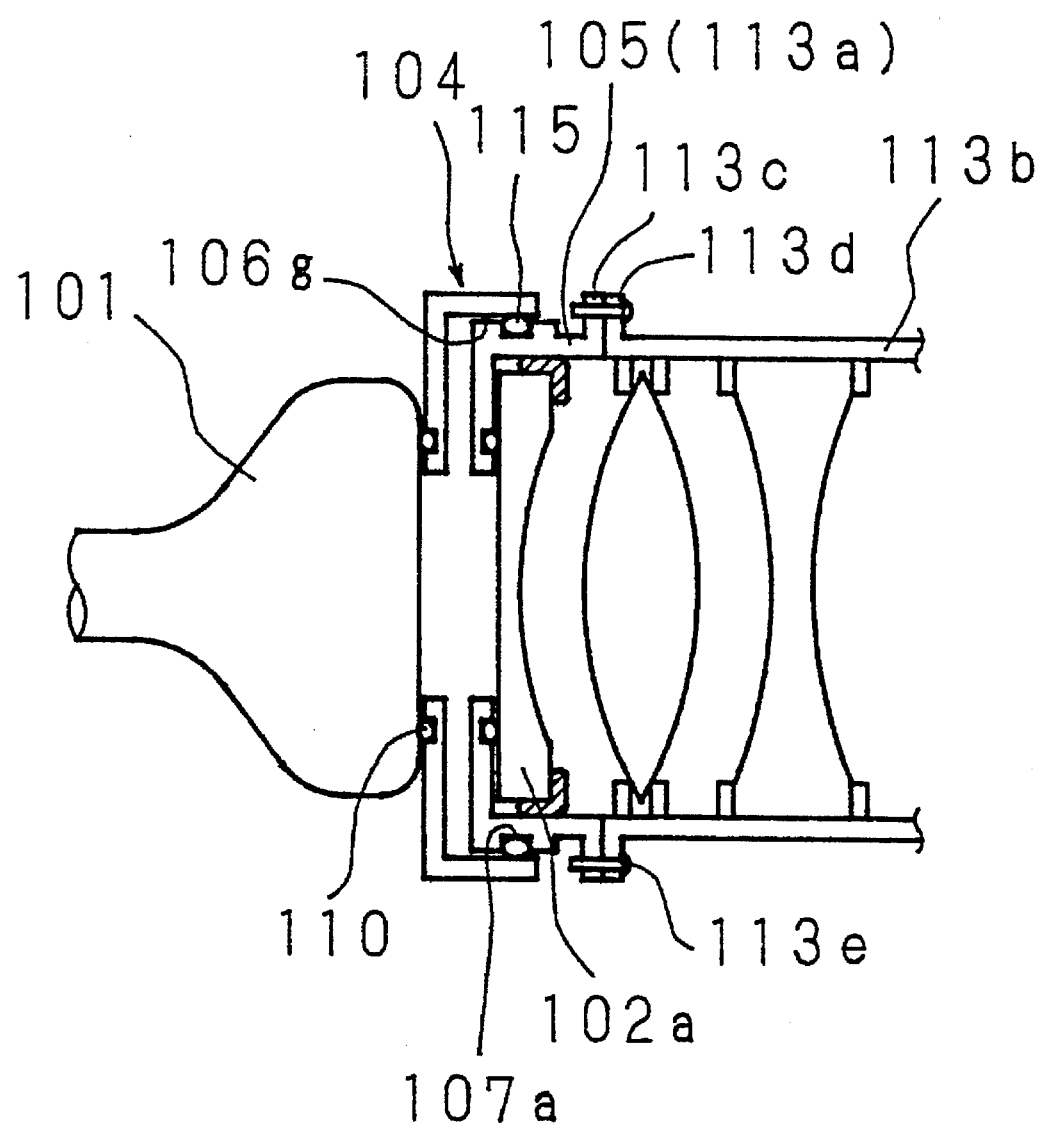
FIG. 55 is a cross sectional drawing illustrative of the seventh embodiment of one of the projection units composing the projection type display of the eighteenth invention.

FIG. 55 is a cross sectional drawing illustrative of the sixth embodiment of one of the projection units composing the projection type display of the eighteenth invention. In this embodiment, the barrel of 113 of the projection lens 102 is divided into two parts along the axis, with barrel section 113a serving as the lens holding member 105 at the same time. The first-stage lens 102a is mounted on the barrel section 113a and the lenses of the second and subsequent stages are mounted on the barrel section 113b, while the barrel sections 113a, 113b being put into an integral structure by connecting the flanges 113c, 113d which provided on the peripheries of respective barrel sections by means of screws 113e. This embodiment has advantages of making lens replacement easier and repair of the CRT 101 easier.

Figure 56:
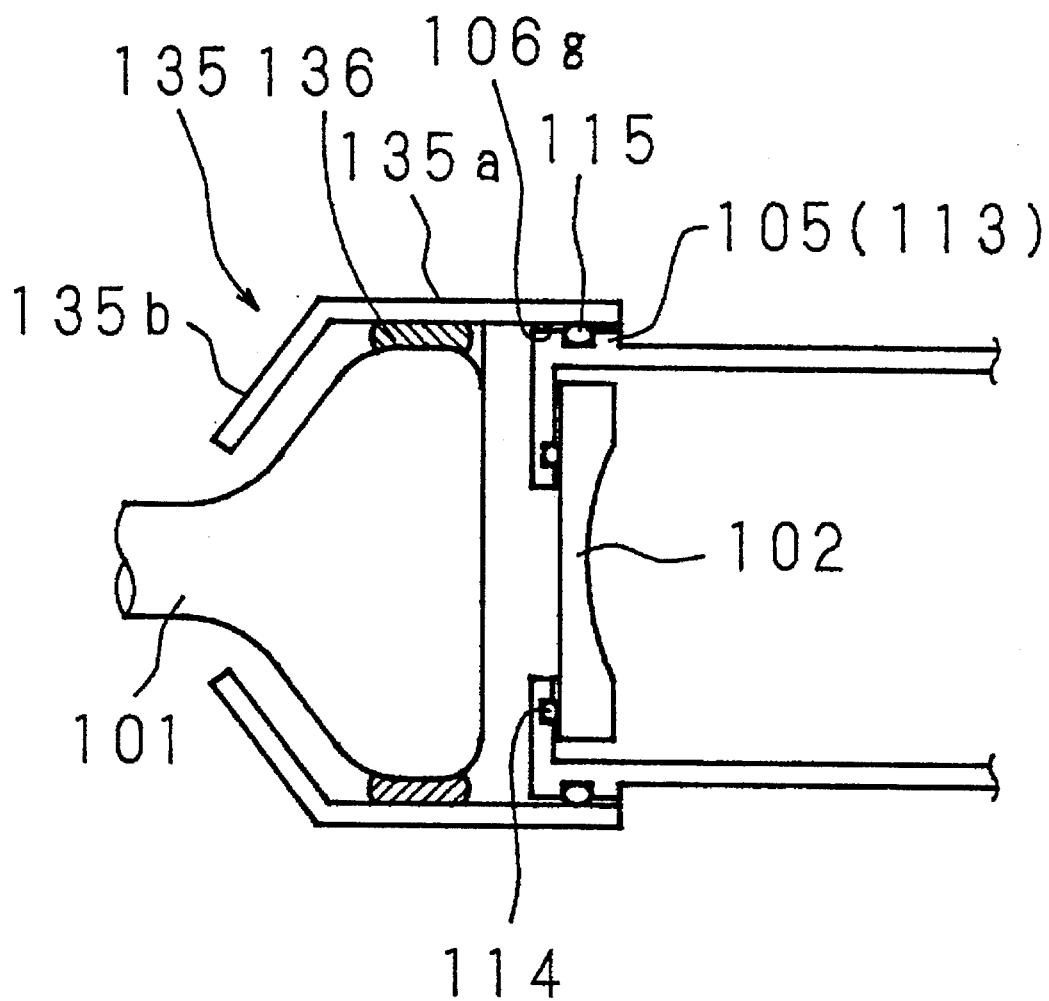
FIG. 56 is a cross sectional drawing illustrative of the eighth embodiment of one of the projection units composing the projection type display of the eighteenth invention.

FIG. 56 is a cross sectional drawing illustrative of the eighth embodiment of one of the projection units composing the projection type display of the eighteenth invention. In this embodiment, the CRT holding member 104 shown in FIG. 54 is replaced with a hood-shaped CRT holding member 135 consisting of a square barrel 135a made of X-ray shielding material such as Fe and Pb and a truncated square cone section 135b which connects to one end of the square barrel in the axial direction. More than half of the CRT 101 on the front is housed in the hood-shaped CRT holding member 135, and the rear of the CRT 101 is fitted into the truncated square cone section 135b to protrude to the back therefrom. The CRT 101 and the square barrel 135a are bonded together with the adhesive 136. In this embodiment, X-ray shielding effect of the CRT holding member 135 reduces the effect of X ray on human bodies without providing specific shield cover.

(Nineteenth invention)

Figure 57:
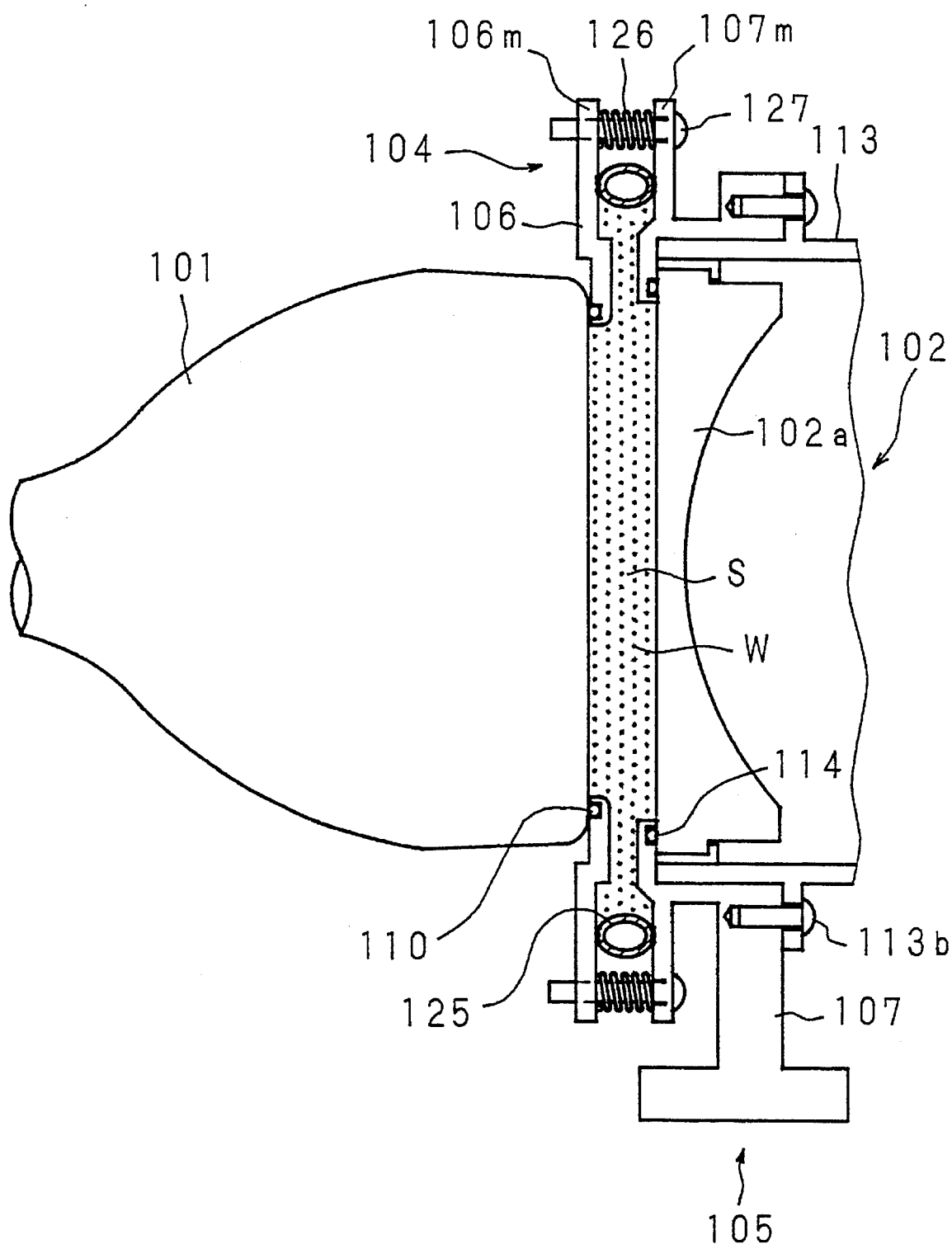
FIG. 57 is a cross sectional drawing illustrative of the first embodiment of one of the projection units composing the projection type display of the nineteenth invention.
Figure 58:
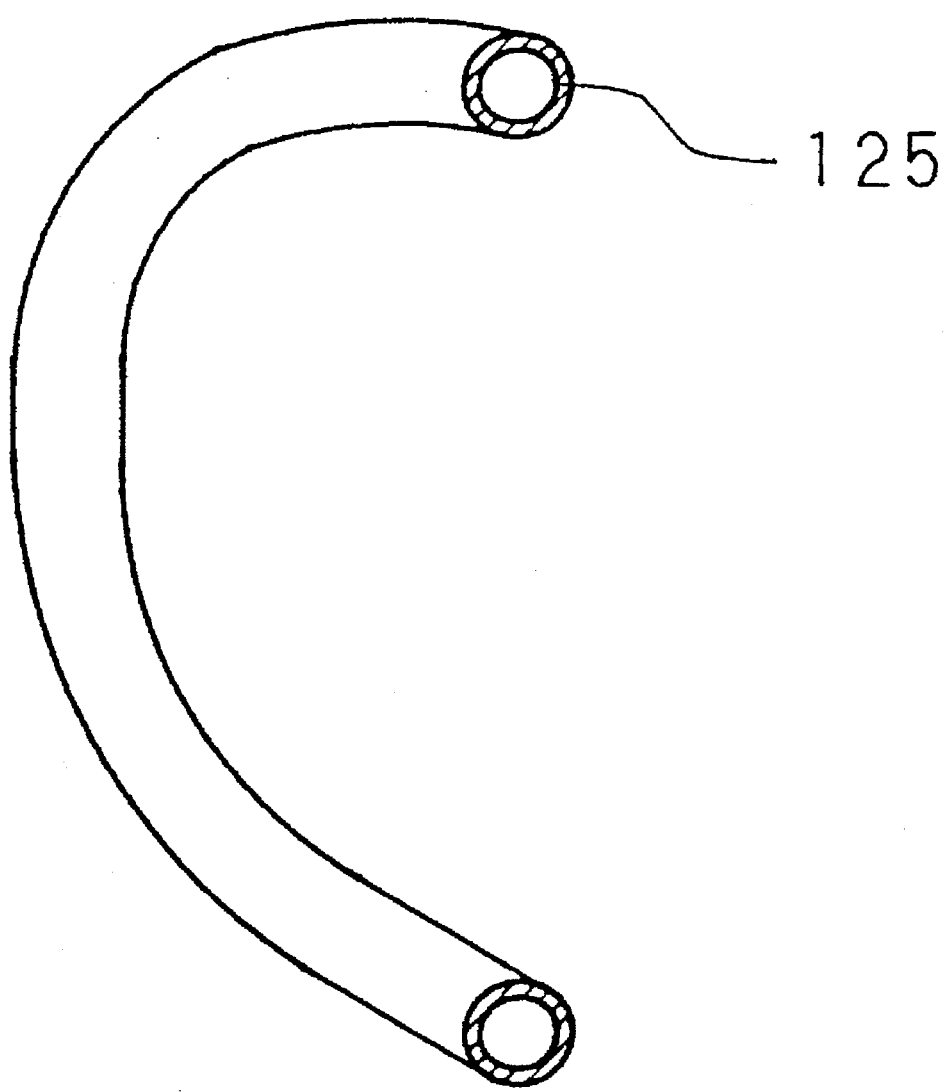
FIG. 58 is a half-broken perspective view of the tube used in the projection unit shown in FIG. 57.

FIG. 57 is a cross sectional drawing illustrative of the first embodiment of one of the projection units composing the projection type display of the nineteenth invention. FIG. 58 is a half-broken perspective view of a tube 125 used in the embodiment. In this embodiment, the frame section 106 of the CRT holding member 104 is made of a hollow rectangular ring with a flange 106m being provided on the periphery thereof. The lens holding member 105 is similarly constituted of the cylindrical-shaped frame section 107 which is hollowed in a round shape at the center with a flange 107m provided on the periphery on the CRT 101 side thereof. The tube 125 as shown in FIG. 58 is bonded along the opposing surfaces of both flanges 106m, 107m near the periphery. The space S formed between the frame sections 106, 107 and between the CRT 101 and the projection lens 102 is kept liquid-tight and is filled with the coolant liquid W, and both flanges 106m, 107m are connected by screws 127 on four corners with springs 126 being interposed between both flanges. The tube 125 self-sustains while keeping its circular cross section by the elasticity thereof, and is bonded to the flanges 106m, 107m on the periphery of the left and right side thereof by means of an adhesive.

In this embodiment, the distance between the CRT 101 and the projection lens and the relative angle thereof can be adjusted by adjusting the depth of engagement of the screws 127 which connect the flanges 106m, 107m on four corners of the frame sections 106, 107. Because the space S is surrounded by the tube 125, thermal expansion of the coolant liquid W can easily be accommodated making the tank 118 shown in FIG. 41 unnecessary. Other constitution and operation are substantially the same as those shown in FIG. 41, and corresponding components are given the same symbols and the description thereof will be omitted.

Figure 59:
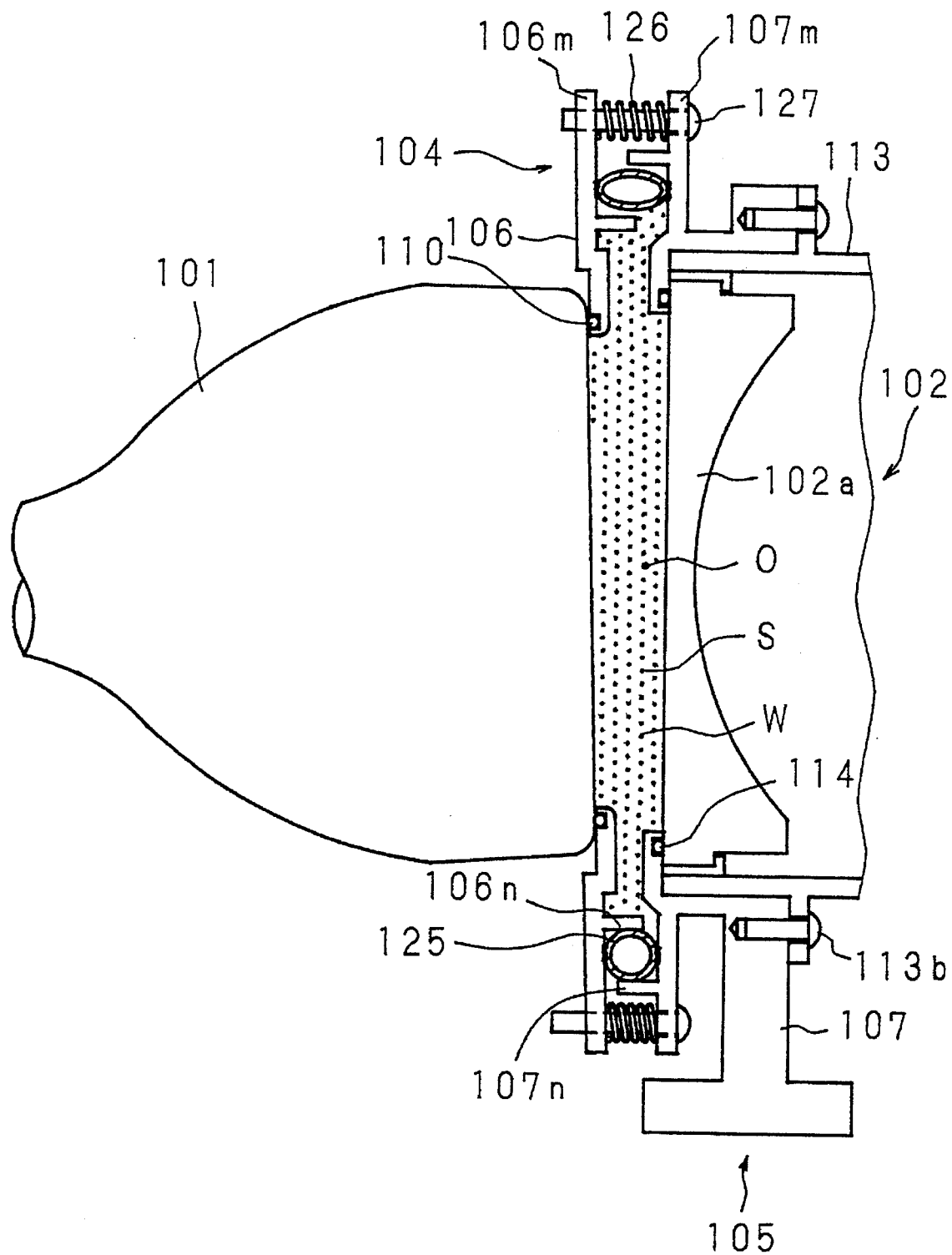
FIG. 59 is a cross sectional drawing illustrative of the second embodiment of one of the projection units composing the projection type display of the nineteenth invention.

FIG. 59 is a cross sectional drawing illustrative of the second embodiment of one of the projection units composing the projection type display of the nineteenth invention. In this embodiment, short cylindrical bodies 106n, 107n are protrudingly installed, to oppose each other with distances thereof from the reference point O made to be different, on the opposing faces of the flanges 106m, 107m of the frame sections 106, 107 in the first embodiment described above. Similarly in the first embodiment, the tube 125 is placed between the short cylindrical bodies 106n, 107n and is bonded on the peripheries of both sides thereof to the faces of the flanges 106m, 107m corresponding to the frame sections 106, 107.

In this embodiment, workability is improved when bonding the peripheries of the tube 125 on the left and right sides thereof onto the opposing faces of the frame sections Q106, 107, respectively, on a concentric circle having the center at the reference point O, and the heat dissipation effect is also improved due to the increased heat dissipation surface. Other constitution and operation are substantially the same as those shown in FIG. 57, and corresponding components are given the same symbols and the description thereof will be omitted.

Figure 60:
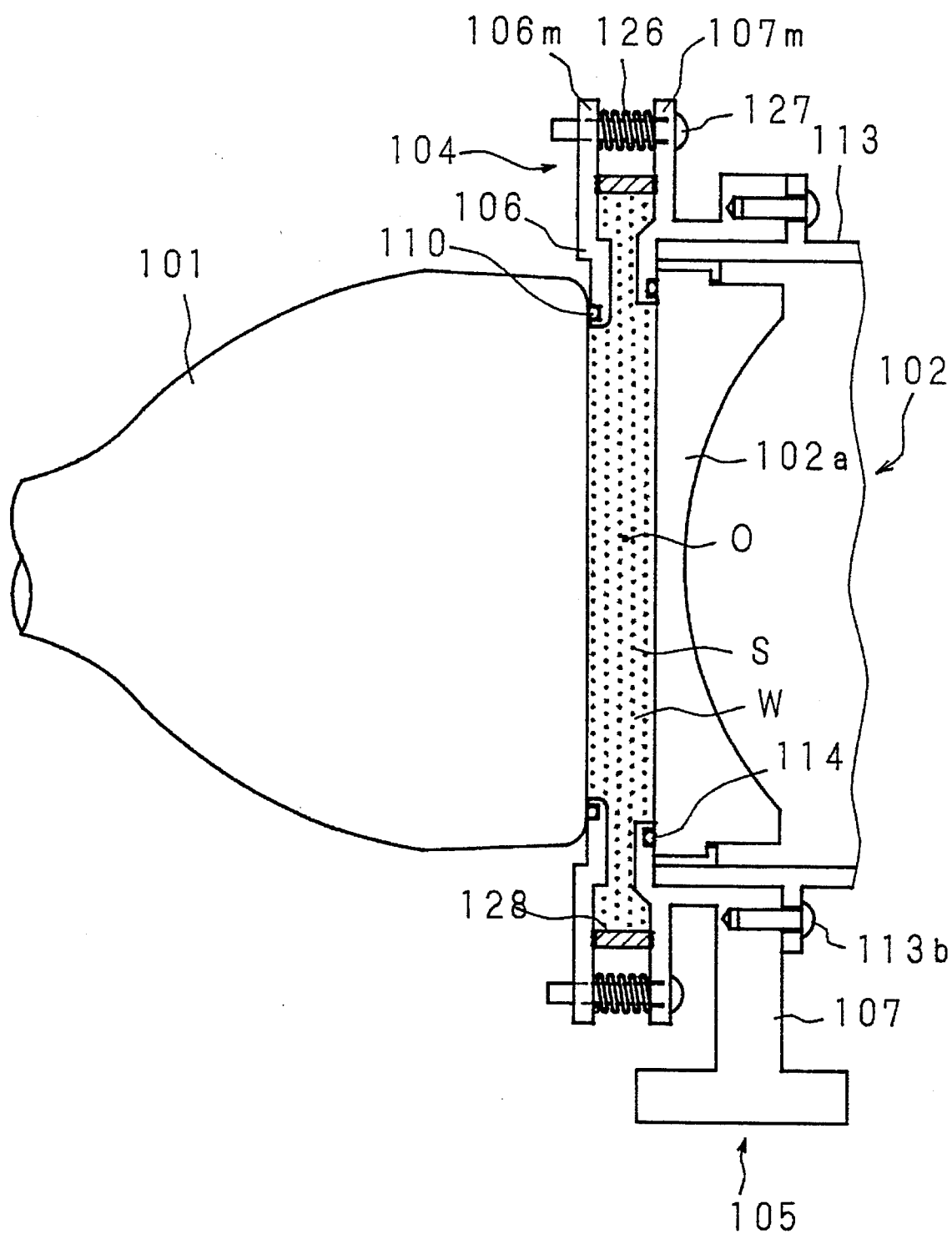
FIG. 60 is a cross sectional drawing illustrative of the third embodiment of one of the projection units composing the projection type display of the nineteenth invention.
Figure 61:
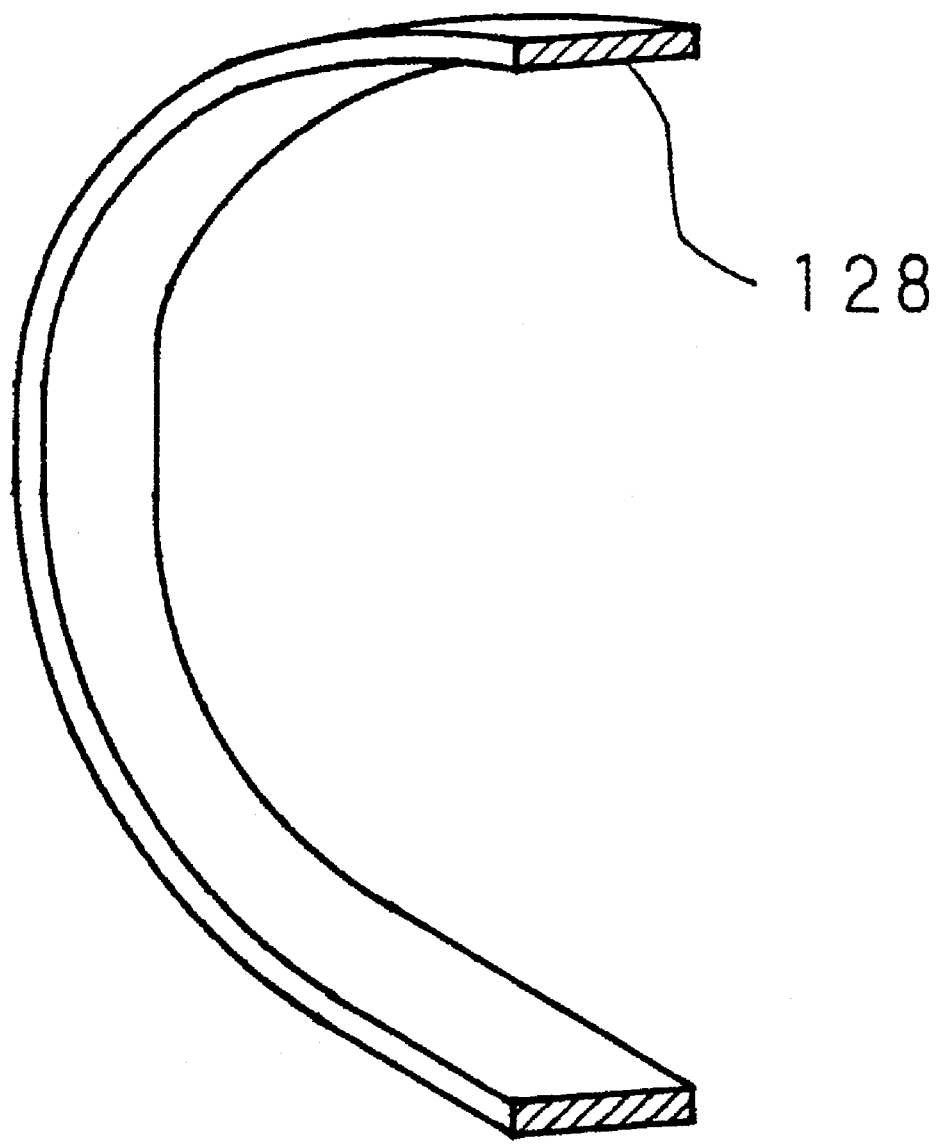
FIG. 61 is a half-broken perspective view of the elastic ring used in the projection unit shown in FIG. 60.

FIG. 60 is a cross sectional drawing illustrative of the third embodiment of one of the projection units composing the projection type display of the nineteenth invention. FIG. 61 is a half-broken perspective view of an elastic ring 128 used in the embodiment. This embodiment has substantially the same constitution as that of he first embodiment with the tube 125 used therein being replaced with the elastic ring 128 having a square cross section as shown in FIG. 61. The elastic ring 125 is fixed by means of an adhesive at one end in the axial direction thereof onto the frame section 106 and at another end onto the frame section 107 on a concentric circle having the center at the reference point O.

In this third embodiment, distance between the CRT 101 and the projection lens 102 and the relative angle thereof can be freely adjusted within specified ranges by adjusting the depth of engagement of the screws 127 while keeping the space S liquid-tight by using the elasticity of the elastic ring 128. Other constitution and operation are substantially the same as those shown in FIG. 57, and corresponding components are given the same symbols and the description thereof will be omitted.

Figure 62:
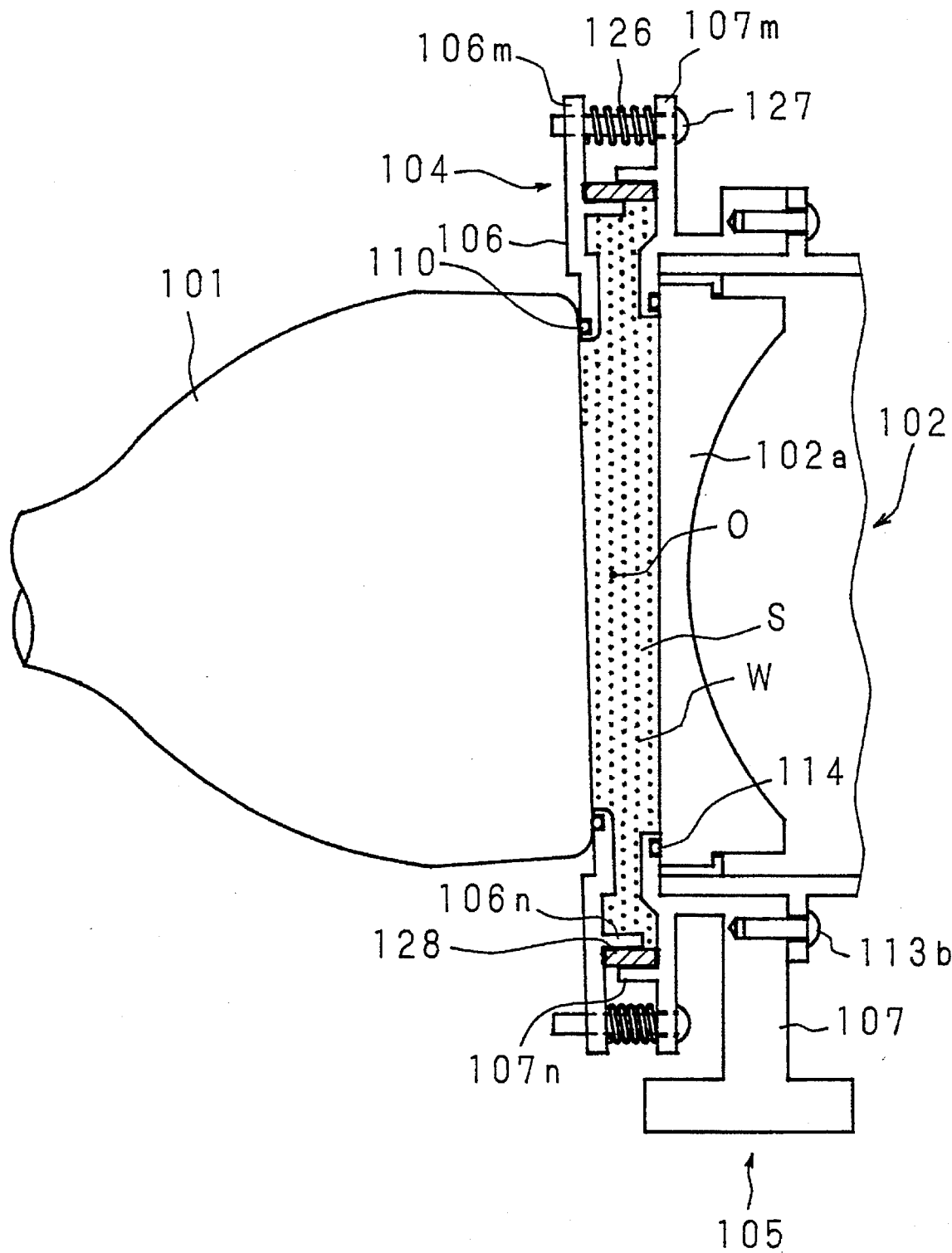
FIG. 62 is a cross sectional drawing illustrative of the fourth embodiment of one of the projection units composing the projection type display of the nineteenth invention.

FIG. 62 is a cross sectional drawing illustrative of the fourth embodiment of one of the projection units composing the projection type display of the nineteenth invention. This embodiment has substantially the same constitution as that shown in FIG. 59 with the tube 125 being replaced with the elastic ring 128 shown in FIG. 60. The short cylindrical bodies 106n, 107n are set so that the distances thereof from the reference point O are nearly equal to or a little greater than the thickness of the elastic ring 128.

In the fourth embodiment, similarly to the third embodiment, the distance between the CRT 101 and the projection lens 102 and the relative angle thereof can be freely adjusted within specified ranges by adjusting the depth of engagement of a plurality of screws 127 which connect the frame sections 106, 107 while keeping the space S liquid-tight by using the elasticity of the elastic ring 128. Moreover, when the elastic ring is subjected to tensile and compressive forces, breakage of bonding between the frames 106, 107 is restrained because the short cylindrical bodies 106n, 107n control the limits of elongation and contraction of the elastic ring 128.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A projection type display apparatus for enlarging and projecting images formed by image forming means onto a screen by means of a projection lens, comprising:

an image forming means block constituted by installing said image forming means on an image forming means frame; and a lens block constituted by installing said projection lens on a lens frame;

wherein an annular packing is interposed between said image forming means and said image forming means frame or between said projection lens and said lens frame to make it liquid-tight, with another being made liquid-tight by interposing one end of a cylindrical packing sheet, while attaching another end of said cylindrical packing sheet to said image forming means block or said lens block whereto said annular packing is attached thereby forming a space surrounded by said image forming means block, said lens block and said cylindrical packing sheet which is filled with a coolant liquid.

2. A projection type display apparatus for enlarging and projecting images formed by image forming means onto a screen by means of a projection lens, comprising:

an image forming means block constituted by installing said image forming means on an image forming means frame via an annular packing liquid-tightly; and a lens block constituted by fitting a bulging part formed on one end of a cylindrical packing sheet into an annular groove formed on the lens frame, thereby installing said projection lens on said lens frame liquid-tightly;

wherein a bulging part formed on another end of said cylindrical packing sheet is fitted into an annular groove formed on said image forming means frame, thereby forming a liquid-tight space surrounded by said lens block, said image forming means block and said cylindrical packing sheet, which is filled with a coolant liquid.

3. A projection type display apparatus for enlarging and projecting images formed by image forming means onto a screen by means of a projection lens, comprising:

an image forming means block constituted by installing said image forming means on an image forming means frame via an annular packing liquid-tightly; and a lens block constituted by fitting a bulging part formed integratedly on one end of a cylindrical packing sheet into an annular groove formed on a lens frame, thereby installing the projection lens on said lens frame liquid-tightly;

wherein a bulging part formed on another end of said cylindrical packing sheet is fitted into and bonded with an annular groove formed on said image forming means block, thereby forming a liquid-tight space surrounded by said lens block, said image forming means block and said cylindrical packing sheet, which is filled with a coolant liquid.

4. A projection type display apparatus for enlarging and projecting images formed by image forming means onto a screen by means of a projection lens, comprising:

an image forming means block constituted by installing said image forming means on an image forming means frame via an annular packing liquid-tightly; and a lens block constituted by fitting a bulging part formed on one end of a cylindrical packing sheet into an annular groove formed on a lens frame, thereby installing said projection lens on said lens frame liquid-tightly;

wherein a bulging part formed on another end of said cylindrical packing sheet is fitted into an annular groove formed on said image forming means frame, and said cylindrical packing sheet in a fitting section is held by an annular plate, thereby forming a liquid-tight space surrounded by said lens block, said image forming means block and said cylindrical packing sheet, which is filled with a coolant liquid.

5. A projection type display apparatus for enlarging and projecting images formed by image forming means onto a screen by means of a projection lens, comprising:

an image forming means block constituted by installing said image forming means on an image forming means frame via an annular packing liquid-tightly; and a lens block constituted by fitting a bulging part formed on one end of a cylindrical packing sheet into an annular groove formed on a lens frame, thereby installing said projection lens on said lens frame liquid-tightly;

wherein a bulging part formed on another end of said cylindrical packing sheet is fitted into an annular groove formed on said image forming means frame, and the cylindrical packing sheet in a fitting section is held by an annular plate, thereby forming a liquid-tight space surrounded by said lens block, said image forming means block and said cylindrical packing sheet, which is filled with a coolant liquid, and a plurality of positioning mechanisms are provided capable of changing and locking the relative angle between said image forming means block and said lens block.

6. A projection type display apparatus for enlarging and projecting images formed by image forming means onto a screen by means of a projection lens, comprising:

an image forming means block constituted by installing said image forming means on an image forming means frame via an annular packing liquid-tightly; and a lens block constituted by fitting a bulging part formed on one end of a cylindrical packing sheet into an annular groove formed on a lens frame, thereby installing said projection lens on said lens frame liquid-tightly;

wherein a bulging part formed on another end of the cylindrical packing sheet is fitted into an annular groove formed on said image forming means frame, and said cylindrical packing sheet in a fitting section is held by an annular plate, thereby forming a liquid-tight space surrounded by said lens block, said image forming means block and said cylindrical packing sheet, which is filled with a coolant liquid, and said image forming means block and said lens block are connected at a specified angle and distance by interposing a detachable spacer having the specified thickness and configuration and clamping thereof.

7. A projection type display apparatus of claim 6, wherein said spacer, said image forming means frame and said lens frame are provided with positioning sections to determine the position to interpose said spacer between said image forming means frame and said lens frame.

8. A projection type display apparatus for enlarging and projecting images formed by image forming means onto a screen by means of a projection lens, comprising:

an image forming means block constituted by installing said image forming means on an image forming means frame via an annular packing liquid-tightly; and a lens block constituted by fitting a bulging part formed on one end of a cylindrical packing sheet into an annular groove formed on a lens frame, thereby installing said projection lens on said lens frame liquid-tightly;

wherein a bulging part formed on another end of the cylindrical packing sheet is fitted into an annular groove formed on said image forming means frame, and said cylindrical packing sheet in a fitting section is held by an annular plate, thereby forming a liquid-tight space surrounded by said lens block, said image forming means block and said cylindrical packing sheet, which is filled with a coolant liquid, and an adjustment mechanism is provided to change the relative angle between said image forming means block and said lens block freely and continuously.

9. A projection type display apparatus for enlarging and projecting images formed by image forming means onto a screen by means of a projection lens, comprising:

an image forming means block constituted by installing said image forming means on an image forming means frame via an annular packing liquid-tightly; and a lens block constituted by fitting a bulging part formed on one end of a cylindrical packing sheet into an annular groove formed on a lens frame, thereby installing said projection lens on said lens frame liquid-tightly;

wherein a bulging part formed on another end of the cylindrical packing sheet is fitted into an annular groove formed on said image forming means frame, and said cylindrical packing sheet in a fitting section is held by an annular plate, thereby forming a liquid-tight space, which is surrounded by said lens block, said image forming means block and said cylindrical packing sheet not including said lens frame, and is filled with a coolant liquid, while said lens frame is constituted of a molded plastic.

10. A projection type display apparatus of claim 9, wherein said lens frame constituted of a molded plastic is provided with said cylindrical packing sheet fitted thereon.

11. A projection type display apparatus for enlarging and projecting images formed by image forming means onto a screen by means of a projection lens, comprising:

an image forming means block constituted by installing said image forming means on an image forming means frame via an annular packing liquid-tightly; and a lens block constituted by fitting a bulging part formed on one end of a cylindrical packing sheet into an annular groove formed on a lens frame, thereby installing said projection lens on said lens frame liquid-tightly;

wherein a bulging part formed on another end of the cylindrical packing sheet is fitted into an annular groove formed on said image forming means frame, and said cylindrical packing sheet in a fitting section is held by an annular plate, thereby forming a liquid-tight space surrounded by said lens block, said image forming means block and said cylindrical packing sheet which is filled with a coolant liquid, while said lens frame and a lens barrel of said projection lens are constituted integrally.

12. A projection type display apparatus for enlarging and projecting images formed by image forming means onto a screen by means of a projection lens, comprising:

an image forming means block constituted by installing said image forming means on an image forming means frame via an annular packing liquid-tightly; and a lens block constituted by fitting a bulging part formed on one end of a cylindrical packing sheet into an annular groove formed on a lens frame, thereby installing the projection lens on said lens frame liquid-tightly; wherein a bulging part formed on another end of said cylindrical packing sheet is fitted into an annular groove formed on the image forming means frame, and said cylindrical packing sheet in a fitting section is held by an annular plate, thereby forming a liquid-tight space surrounded by said lens block, said image forming means block and said cylindrical packing sheet which is filled with a coolant liquid, while a mechanism is provided to support both blocks freely movably.

13. A projection type display apparatus for enlarging and projecting images formed by image forming means onto a screen by means of a projection lens, comprising:

first holding means for holding said image forming means;

second holding means for holding said projection lens; and connecting means for connecting said first holding means and said second holding means so that the relative angle and distance of said image forming means and said projection lens can be adjusted in the presence of a space surrounded by said image forming means, said projection lens, said first holding means and said second holding means;

wherein said space is filled with a coolant liquid, and an annular elastic sealing material is interposed between the opposing surfaces of said first holding means and said second holding means to allow relative movement thereof, with said space being sealed liquid-tight, while said elastic sealing material is fitted in an annular groove formed on either of said first holding means or said second holding means and is slidably set on a spherical guide formed on another of said first holding means and said second holding means.

14. A projection type display apparatus for enlarging and projecting images formed by image forming means onto a screen by means of a projection lens, comprising:

first holding means for holding said image forming means;

second holding means for holding said projection lens; and said connecting means for connecting said first holding means and said second holding means so that the relative angle and distance of said image forming means and said projection lens can be adjusted in the presence of a space surrounded by said image forming means, said projection lens, said first holding means and said second holding means;

wherein said space is filled with a coolant liquid, and an annular elastic sealing material is interposed between the opposing surfaces of said first holding means and said second holding means to allow relative movement thereof, with said space being sealed liquid-tight, while said elastic sealing material is fitted in an annular groove formed on either of said first holding means or said second holding means and is slidably set on a spherical guide formed on another one of said first holding means and said second holding means.

15. A projection type display apparatus for enlarging and projecting images formed by image forming means onto a screen by means of a projection lens, comprising:

first holding means for holding the image forming means; and second holding means for holding the projection lens; wherein a frame of said first holding means and a frame of said second holding means are arranged to oppose to each other, a space between said image forming means and said projection lens is filled with a coolant liquid, an annular elastic sealing material is bonded onto the periphery of the frame of said first holding means and the frame of said second holding means thereby to connect these frames liquid-tightly.

* * * * *